US011449982B2

(12) United States Patent
Widman et al.

(10) Patent No.: US 11,449,982 B2
(45) Date of Patent: *Sep. 20, 2022

(54) SYSTEMS AND METHODS OF USING ABSORPTIVE IMAGING METROLOGY TO MEASURE THE THICKNESS OF OPHTHALMIC LENSES

(71) Applicant: Johnson & Johnson Vision Care, Inc., Jacksonville, FL (US)

(72) Inventors: Michael F. Widman, Jacksonville, FL (US); Peter W. Sites, Jacksonville, FL (US); Jasmin Laferriere, Skillman, NJ (US); D. Scott Dewald, Dallas, TX (US); Bradley W. Walker, Dallas, TX (US)

(73) Assignee: Johnson & Johnson Vision Care, Inc, Jacksonville, FL (US)

( * ) Notice: Subject to any disclaimer, the term of this patent is extended or adjusted under 35 U.S.C. 154(b) by 121 days.

This patent is subject to a terminal disclaimer.

(21) Appl. No.: 16/792,355

(22) Filed: Feb. 17, 2020

(65) Prior Publication Data
US 2020/0184621 A1 Jun. 11, 2020

Related U.S. Application Data

(63) Continuation of application No. 15/627,684, filed on Jun. 20, 2017, now Pat. No. 10,607,335.
(Continued)

(51) Int. Cl.
*G01B 11/06* (2006.01)
*G06K 9/00* (2022.01)
*G06T 7/00* (2017.01)

(52) U.S. Cl.
CPC .............. *G06T 7/001* (2013.01); *G01B 11/06* (2013.01); *G06T 2207/10152* (2013.01)

(58) Field of Classification Search
None
See application file for complete search history.

(56) References Cited

U.S. PATENT DOCUMENTS

| 3,437,811 A | 4/1969 | Willis et al. |
| 4,495,313 A | 1/1985 | Larsen |

(Continued)

OTHER PUBLICATIONS

European Search Report issued in corresponding European Patent Application No. EP 17 17 8231, dated Nov. 16, 2017, 3 pages.

*Primary Examiner* — Randolph I Chu

(57) ABSTRACT

A method of measuring the thickness of an ophthalmic lens includes forming an ophthalmic lens over a convexly curved surface of a forming optic, the ophthalmic lens including a light absorptive component, and with the ophthalmic lens remaining over the convexly curved surface of the forming optic, measuring the thickness of the ophthalmic lens using information about the light absorptive component of the ophthalmic lens and an intensity reference value associated with the forming optic. The method includes passing light having a wavelength through the ophthalmic lens and the forming optic, whereupon the light absorptive component of the ophthalmic lens absorbs some of the light passing through the ophthalmic lens. The light passing through the ophthalmic lens and the forming optic, which is not absorbed by the light absorptive component of the ophthalmic lens, is used to generate an image having pixel intensity data.

19 Claims, 53 Drawing Sheets

Related U.S. Application Data

(60) Provisional application No. 62/355,753, filed on Jun. 28, 2016.

(56) References Cited

U.S. PATENT DOCUMENTS

| | | | | |
|---|---|---|---|---|
| 5,574,554 | A * | 11/1996 | Su | B29C 33/40 356/124 |
| 5,776,381 | A * | 7/1998 | Haase | B29C 45/561 264/2.2 |
| 6,577,387 | B2 | 6/2003 | Ross et al. | |
| 7,905,594 | B2 * | 3/2011 | Widman | B29D 11/00134 351/159.6 |
| 8,157,373 | B2 * | 4/2012 | Widman | B29D 11/00134 351/159.6 |
| 8,318,055 | B2 * | 11/2012 | Widman | B29D 11/00144 264/1.38 |
| 8,634,068 | B2 | 1/2014 | Sites et al. | |
| 8,810,784 | B2 | 8/2014 | Widman et al. | |
| 9,180,633 | B2 * | 11/2015 | Widman | B29D 11/00144 |
| 9,180,634 | B2 * | 11/2015 | Widman | B29D 11/00144 |
| 10,607,335 | B2 | 3/2020 | Widman et al. | |
| 2001/0014704 | A1 * | 8/2001 | Lai | C08F 2/48 523/106 |
| 2002/0122172 | A1 | 9/2002 | Ross, III et al. | |
| 2002/0146161 | A1 * | 10/2002 | Suzuki | G01N 21/6456 382/141 |
| 2006/0132761 | A1 * | 6/2006 | Hall | G01M 11/0214 356/244 |
| 2007/0236657 | A1 * | 10/2007 | Mazoyer | B24B 9/146 351/178 |
| 2009/0174863 | A1 * | 7/2009 | Widman | B29D 11/00134 351/159.6 |
| 2010/0047380 | A1 * | 2/2010 | Widman | G02C 7/04 425/174.4 |
| 2010/0053772 | A1 * | 3/2010 | Oh | G02B 13/003 359/736 |
| 2011/0116036 | A1 * | 5/2011 | Widman | B29D 11/00134 351/159.6 |
| 2012/0080811 | A1 * | 4/2012 | Widman | B29D 11/00442 264/1.38 |
| 2012/0133957 | A1 * | 5/2012 | Widman | G01M 11/02 356/624 |
| 2012/0171388 | A1 * | 7/2012 | Widman | B29D 11/00442 427/510 |
| 2012/0258187 | A1 * | 10/2012 | Widman | B29D 11/00442 425/174.4 |
| 2012/0320366 | A1 * | 12/2012 | Sites et al. | 356/51 |
| 2013/0075577 | A1 * | 3/2013 | Widman | G02C 7/04 249/187.1 |
| 2013/0208265 | A1 * | 8/2013 | Widman | G01M 11/0242 356/124 |
| 2013/0235339 | A1 * | 9/2013 | Widman | G02C 7/02 351/159.73 |
| 2014/0043588 | A1 * | 2/2014 | Grant | G02C 7/04 351/247 |
| 2014/0049745 | A1 * | 2/2014 | Widman | B29D 11/0073 351/159.02 |
| 2014/0063486 | A1 * | 3/2014 | Widman | G01M 11/0214 356/36 |
| 2014/0253907 | A1 * | 9/2014 | Ignatovich | G01M 11/0285 356/73 |
| 2016/0054195 | A1 * | 2/2016 | Greivenkamp, Jr. | G01B 9/02038 356/495 |

* cited by examiner

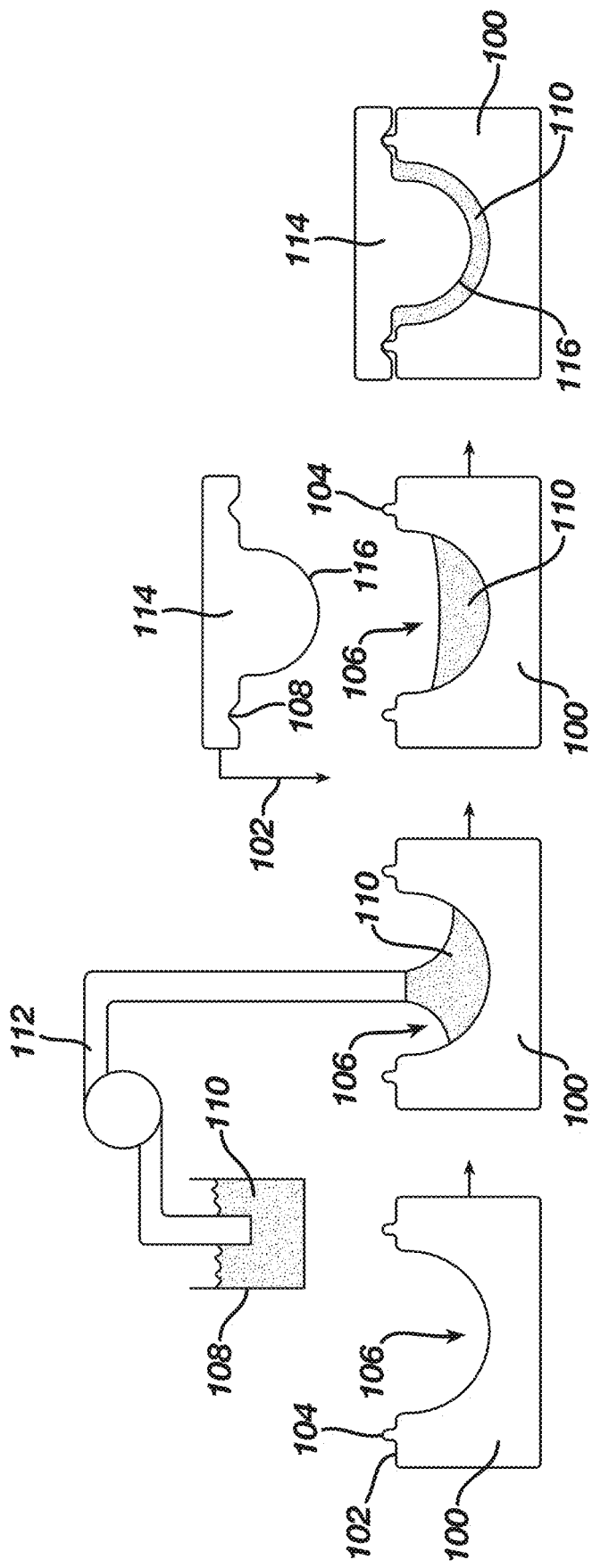

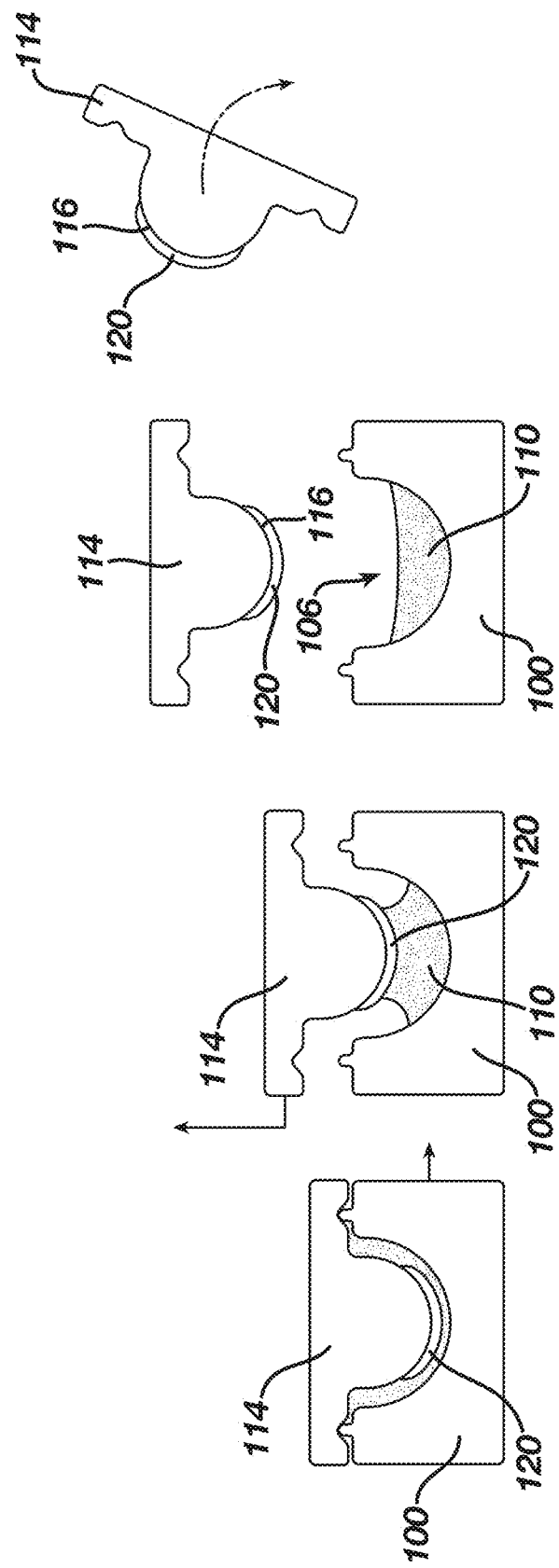

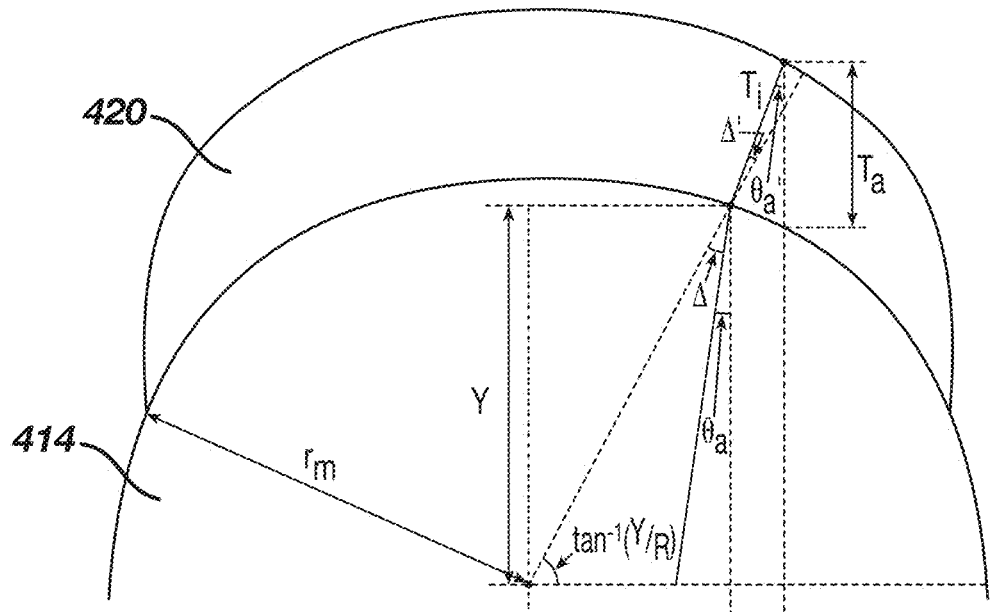

Start with (R, Azimuth, $T_i$)

$Y = \overline{r_m^2, - R^2}$ $\Delta = f(R)$ where $f(R)$ is the Dewald function as a function of R $\theta_a = \frac{\pi}{2} + \tan^{-1}(Y/R) - \Delta$ $\Delta' = \sin^{-1}(\frac{n_{glass} \sin(\Delta)}{n_{lens}})$ $\theta_a' = \Delta + \theta_a - \Delta'$ $\Delta r_{lens} = T_i \sin(\theta_a')$ $R' = R + \Delta r_{lens}$ $T_a = T_i \cos(\theta_a') + (Y - \overline{r_m^2, - R^2})$ End with (R', Azimuth, $T_a$)

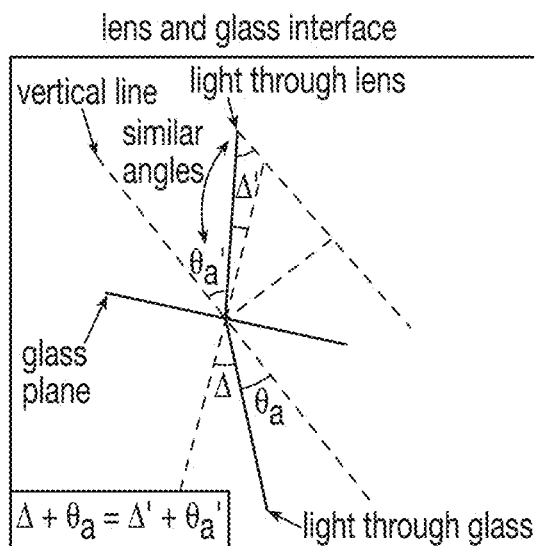

lens and glass interface $\Delta + \theta_a = \Delta' + \theta_a'$

FIG. 15

SYSTEMS AND METHODS OF USING ABSORPTIVE IMAGING METROLOGY TO MEASURE THE THICKNESS OF OPHTHALMIC LENSES

CROSS REFERENCE TO RELATED APPLICATIONS

The present patent application is a continuation of U.S. patent application Ser. No. 15/627,684, filed on Jun. 20, 2017, now allowed U.S. Pat. No. 10,607,335, which claims benefit of U.S. Provisional Application No. 62/355,753, filed on Jun. 28, 2016, the disclosures of which are hereby incorporated by reference herein.

BACKGROUND OF THE INVENTION

Field of the Invention

The present patent application is generally directed to ophthalmic lenses, and is more particularly directed to systems, devices and methods for determining the thickness of ophthalmic lenses.

Description of the Related Art

There have been many advances directed to measuring the thickness of ophthalmic lenses. These efforts typically require the use of complex, multi-station systems, which are expensive, slow, and involve extreme positioning requirements. As such, these systems are not suitable for mass production, and in-line use.

For example, confocal keyence laser displacement sensors have been used to measure lens center thickness. This approach, however, is expensive and requires precisely aligning the components to the sensor's optical axis.

One system uses phase difference techniques for conducting metrology measurements. The system measures wave front power, which is then converted into a thickness surface profile of the lens. This system is not capable of measuring rapid changes in surface topology (i.e., large power changes) and therefore is limited to only optic zone measurement of the lens. The system is also expensive, requires a separate center thickness measurement station, is relatively slow (e.g., 45 seconds per measurement), and requires precise alignment and part placement.

Another system measures lenses using a precise, 3-axis, opto-mechanical profilometer. This system is also expensive, slow (e.g., five minutes per measurement), susceptible to data dropout in steep topologies of the lens, is difficult to maintain, and is not suitable for in-line use.

An interferometer-based system has been developed to measure the optic zone power of a lens. A limitation of this system is that it cannot perform "dry" part measurements and requires lenses to be hydrated prior to measurement and fully immersed in a quiescent pool of liquid during measurement. Due to expensive and rigid environmental controls, the system is typically found in centralized, quality control locations that require cumbersome procedures for submitting samples for testing and obtaining results. As a result, the interferometer-based system is not suitable for in-line use. The interferometer system also has some lens presentation issues. Moreover, it is difficult for the Clover system to measure non-round lenses, and lenses that lay in a package in a tilted or partially curled configuration.

Thus, there remains a need for improved systems and methods for efficiently and accurately measuring the thicknesses of ophthalmic lenses, and using the data to make iterative corrections and improvements to ophthalmic lenses that are subsequently manufactured.

SUMMARY OF THE INVENTION

In one embodiment, an absorptive imaging system uses an imaging arrangement and the known absorptive properties of a given media (e.g., a contact lens) to determine the sample's surface thickness from image pixel intensity. In one embodiment, the media of interest are ophthalmic lenses or contact lenses in various forms including but not limited to a lens precursor or final lens on a forming optic found in custom lens production, a cast molded lens encapsulated in mold pieces, a cast molded lens after de-molding with a single mold half, and hydrated cast molded lens in solution. In one embodiment, other lens media may be utilized.

In one embodiment, an absorptive imaging system uses mathematical formulations and system calibration to convert image intensity data for an ophthalmic lens to media thickness. In one embodiment, the system includes digital imaging devices having pixel elements, typically arranged in an X-Y grid, which makes it possible to use individual pixel intensity values to generate a thickness surface profile for the object being measured (e.g., an ophthalmic lens). The resulting thickness measurements and/or the entire surface profile can be used as part of an iterative process to determine how well a manufactured article matches its intended design. The system may adjust how subsequent lenses are made based upon the thickness measurement feedback data.

In one embodiment, an absorptive imaging system includes an illumination source that contains a region of the spectrum in which the media absorbs incident radiation. In one embodiment, the illumination source is a 365 nm LED, however, other broad band and selective band sources may be utilized. In one embodiment, other illumination sources may include 370 nm LEDs, 375 nm LEDs, Xenon lamps, lasers and other line-spectra sources. The illumination source may be radiated continuously or pulse synchronized for capturing images.

In one embodiment, the absorptive imaging system includes an optical filter that further defines the illuminating spectrum that is used during imaging. In one embodiment, the optical filter may be a band pass filter, a cut-on filter, or a cut-off filter. The actual filter used may depend on the particular illumination source being used, the lens media being measured, and the particular section of the media for which thickness data is being measured.

In one embodiment, the absorptive imaging system includes one or more diffusing components that ensure that the light from the illumination source is uniform, and that the generated light rays strike the lens media at suitable angles to fill the resulting image collection cones. In one embodiment, the illumination source, the optical filter and the one or more light diffusers are assembled together as a unit that may be raised and/or lowered together to allow for a forming optic to be loaded into or unloaded from the system. In one embodiment, the unit including the illumination source, the optical filter and the one or more light diffusers is attached to a dampening component or spring-loaded linear stage, which allows the unit to be raised up and moved away from a kinematic mount to allow the forming optic to be loaded and unloaded, whereupon the unit may be lowered back into position above the forming optic.

In one embodiment, the absorptive imaging system includes a forming optic that holds a fully cured lens or a lens precursor for which thickness measurements are being obtained, a kinematic mount used to place the forming optic and the lens close to the system's optical axis, and a series of optical lenses used to collect and form the image. In one embodiment, the absorptive imaging system includes a camera, such as a digital camera, that captures images of the lens samples being measured. In the resulting image, the thicker areas of the lens will appear darker and the thinner areas of the lens will appear lighter.

When obtaining an intensity image based upon absorption of light by a lens, absorbance by leftover photoinitiator in the lens can cause errors in calculating the thickness of the lens. In one embodiment, an absorptive imaging system is used to measure the thickness of an ophthalmic lens (e.g., a contact lens) based upon the relationship between lens thickness, absorptive constituent concentration (e.g., Norbloc), and light absorption by the lens. Before hydration, the lens material contains an uncontrolled amount of photoinitiator (e.g., Irgacure 1700) that also absorbs light. By using two or more wavelengths (or wavelength bands), the effects of the varying photoinitiator can be removed through calculation.

In one embodiment, an absorptive imaging system has the same components as described above and also includes, in addition, an integrating sphere that houses two different illumination sources that generate light having different wavelengths. An integrating sphere is an optical component including a hollow spherical cavity having its interior covered with a reflective coating (e.g., a diffuse white reflective coating) with small openings for entrance and exit ports. Its relevant property is a uniform scattering or diffusing effect. Light rays incident on any point on the inner surface of the integrating sphere are, by multiple scattering reflections, distributed equally to all other points. As a result, the effects of the original direction of the light are minimized. An integrating sphere may be thought of as a diffuser which preserves power but destroys spatial information. It is typically used with some light source and a detector for optical power measurement. See https://en.wikipedia.org/wiki/Integrating_sphere.

In one embodiment, a first illumination source disposed inside an integrating spehere includes an LED light that generates UV light that covers the absorptive band of the ophthalmic lens material (e.g., light having a wavelength of 365 nm), which may be similar to the LED used in the absoptive imaging device disclosed above. In one embodiment, a second illumination source disposed inside an integrating sphere includes an LED (e.g., a blue LED) that covers a band that is "absorption neutral" with respect to the Norbloc and leftover photoinitiator in the lens' spectrum (e.g., light having a wavelength of 455 nm). In one embodiment, the absorptive imaging system includes control electronics that turn the two LEDs on and off at the appropriate time to collect intensity images that are used by a measuring mechanism. When using absorptive imaging metrology, the surface topology of the lens can act to gather or disperse light based solely on the refractive nature of the lens. If not accounted for this can confuse the algorithm into interpreting these areas as being thicker or thinner than they really are. To mitigate this phenomenon, the image intensity X-Y grid from the first LED (~365 nm) is scaled or baselines against the image intensity X-Y grid from the second LED (~455 nm). In this way intensity data due to refractive effects are removed from the intensity data used to calculate thickness due to absorptive effects. By using two or more wavelengths or wavelength bands, the effects of the refraction or "optical confusion" can be removed through calculation.

In one embodiment, when images of the lens are being captured, only one of the two LEDs will be used at any one time for a given image. In one emboidment, the absorptive imaging system includes a TEC controlled plate and heat sink for maintaining temperature control of the LEDs so as to ensure spectrum stability.

In many instances, newly formed ophthalmic lenses contain photoinitiator material that will bleach over time as the lenses are exposed to light from the illumination sources. In one embodiment, an absorptive imaging system is similar to that described above and includes a third illumination source that generates light having a distinct wavelength to account for the bleaching of the photoinitiator material. In one embodiment, a first illumination source includes a first LED light that generates UV light that covers the absorptive band of the ophthalmic lens material incluidng the Norbloc and leftover photoinitiator (e.g., light having a wavelength of 365 nm), a second illumination source includes a second LED that covers a band that is "absorption neutral" with respect to the Norbloc and leftover photoinitiator in the lens' spectrum (e.g., light having a wavelength of 455 nm), and a third illumination source includes a third LED that generates light that is absorptive largely only to the photoinitiator and isolates the effects from bleaching of the photoinitiator so that the bleaching effect may be accounted for when calculating the intensity of the illumination that passes through the ophthalmic lens. In one embodiment, the third illumination source generates light having a wavelength of about 420 nm. In one embodiment, the absorptive imaging system includes control electronics that turn the three LEDs on and off at the appropriate time to collect images that are used to calculate the thickness of the ophthalmic lens. In one embodiment, when images of the lens are being captured, only one of the three LEDs will be used at any one time for capturing images. By using three or more wavelength bands, the effects of "optical confusion" and varying photoinitiator can be removed through calculation.

In one embodiment, an absorptive imaging system may include three LED integrating spheres that pass light into a forming optic integrating sphere. In one emboidment, a first LED integrating sphere contains a first illumination source that generates UV light that covers the absorptive band of an ophthalmic lens, a second LED integrating sphere contains a second illumination source that generates visible light that covers an "absorption neutral" band of the ophthalmic lens, and a third LED integrating sphere contains a third illumination source that isolates the effects due to bleaching of the photoinitiator material present in the lens. The absorptive imaging system uses formulas and mathmatics to remove the optical power effects and the bleaching effects to more accurately calculate lens thickness based upon intensity variations due solely to the absorptive properties of the lens material.

In one embodiment, the absorptive imaging system may be used to extract an accurate Center Thickness (CT) representation of a lens or lens precursor within ±a couple of micrometers.

In one embodiment, the absorptive imaging system may be used to extract a full lens surface thickness profile.

In one embodiment, the absorptive imaging system may be used to obtain a precise measurement of the optic zone thickness profile to support 1) a custom lens "iteration" convergence process, and 2) a "lens built to intended design target" release criteria.

In one embodiment, the absorptive imaging system is invariant to sample alignment with respect to the system's critical components and optical axis, which is a dramatic improvement over conventional systems and techniques. For example, conventional systems used for thickness measurements have a part alignment tolerance on the order of ±1 μm in the X-Y directions. In one embodiment, the absorptive imaging system disclosed herein has a limit bounded by the images' overfill size or the amount of surrounding background in the images, which is on the order of ±1000 μm. In one embodiment, other factors, such as the system's focus roll-off with part displacement may impose a smaller tolerance limit, which is on the order of 40-100 μm.

In one embodiment, because of the imaging nature of the technique, the center of the sample lens may be extracted regardless of part displacement from a center or optical axis, which is another significant benefit.

In one embodiment, a method of measuring the thickness of an ophthalmic lens includes providing an ophthalmic lens having a light absorptive component, passing light having a wavelength through the ophthalmic lens whereupon the light absorptive component absorbs some of the light as the light passes through the ophthalmic lens, and after the light has passed through the ophthalmic lens, directing the light to generate a digital image for the ophthalmic lens, the digital image having pixel intensity data that corresponds to the shape of the ophthalmic lens. The method includes using information about the light prior to passing through the ophthalmic lens, the light absorptive component of the ophthalmic lens, and the pixel intensity data to calculate a thickness profile for the ophthalmic lens.

In one embodiment, the providing an ophthalmic lens step includes providing a forming optic having a convexly curved top surface, and forming the ophthalmic lens over the convexly curved top surface of the forming optic.

In one embodiment, the method includes providing a light source for the light having the wavelength, and prior to the passing light step, generating, filtering and diffusing the light.

In one embodiment, the method includes directing the light at the ophthalmic lens overlying the convexly curved top surface of the forming optic and passing the light through the ophthalmic lens and the forming optic.

In one embodiment, the method includes providing a digital image capturing device downstream from the forming optic for capturing the digital image, and providing one or more optical lenses between the forming optic and the digital image capturing device for focusing the light onto the digital image capturing device.

In one embodiment, a method of measuring the thickness of an ophthalmic lens includes passing second light having a second wavelength that is different than the first light and that is not absorbed by the light absorptive component of the ophthalmic lens through the ophthalmic lens. In one embodiment, after the second light has passed through the ophthalmic lens, the second light is directed to generate a second digital image for the ophthalmic lens, the second digital image having second pixel intensity data that corresponds to intensity changes due to refractive effects as said second light passes though the ophthalmic lens, and isolating the second pixel intensity data from the first pixel intensity data used to calculate thickness due to the light absorptive component.

In one embodiment, a method includes disposing the first light in a first integrating sphere, disposing the second light in a second integrating sphere that is separate from the first integrating sphere, and disposing the forming optic in a forming optic integrating sphere that is separate from the first and second integrating spheres.

In one embodiment, the ophthalmic lens includes a photoinitiator that is bleached by light passing through the ophthalmic lens. In one embodiment, the method includes passing third light having a third wavelength that is absorbed by the photoinitiator and that is not absorbed by the light absorptive component of the ophthalmic lens through the ophthalmic lens, after passing the third light through the ophthalmic lens, directing the third light to generate a third digital image for the ophthalmic lens, the third digital image having third pixel intensity data that corresponds to the effects of bleaching of the photoinitiator, and using the third pixel intensity data to isolate the effects of bleaching of the photoinitiator from the first pixel intensity data used to calculate thickness due to the light absorptive component.

In one embodiment, the method includes disposing the first light in a first integrating sphere, disposing the second light in a second integrating sphere that is spaced from the first integrating sphere, disposing the third light in a third integrating sphere that is spaced from the first and second integrating spheres, and disposing the forming optic in a forming optic integrating sphere that is spaced from the first, second, and third integrating spheres.

In one embodiment, the first light is absorbed by the light absorptive component and the photoinitiator, the second light is absorbed by neither the light absorptive component nor the photoinitiator, and the third light is absorbed by the photoinitiator and is not absorbed by the light absorptive component.

In one embodiment, the first light is a first LED that generates light having a first wavelength of about 365 nm, the second light is a second LED that generates light having a second wavelength of about 455 nm, and the third light is a third LED that generates light having a third wavelength of about 420 nm.

In one embodiment, the method includes programming a control system to automatically activate only one of the first, second and third LEDs at any one time.

In one embodiment, a method of measuring the thickness of an ophthalmic lens includes providing an ophthalmic lens having a light absorptive component, refractive elements, and a photoinitiator, providing a first LED that generates a first light having a first wavelength that is absorbed by the light absorptive component and the photoinitiator, providing a second LED that generates a second light having a second wavelength that is different than the first wavelength and that is neither absorbed by the light absorptive component nor the photoinitator, and providing a third LED that generates a third light having a third wavelength that is different than the first and second wavelengths, that is not absorbed by the light absorptive component, and that is absorbed by the photoinitator.

In one embodiment, the method includes at different times, passing the first, second and third lights through the ophthalmic lens to isolate light absorption due to the presence of the refractive effects and the photoinitiator in the ophthalmic lens from light absorption due to the presence of the light absorptive component in the ophthalmic lens in order to calculate a thickness profile for the ophthalmic lens.

In one embodiment, after the first light has passed through the ophthalmic lens, the first light is directed to generate a first digital image for the ophthalmic lens, the first digital image having first pixel intensity data that corresponds to the shape of the ophthalmic lens.

In one embodiment, after the second light has passed through the ophthalmic lens, the second light is directed to generate a second digital image for the ophthalmic lens, the second digital image having second pixel intensity data that corresponds to the refractive effects as the second light passes through the ophthalmic lens.

In one embodiment, after passing the third light through the ophthalmic lens, the third light is directed to generate a third digital image for the ophthalmic lens, the third digital image having third pixel intensity data that corresponds to the effects of bleaching of the photoinitiator.

In one embodiment, a method includes using a central processor for isolating the second pixel intensity data and the third pixel intensity data from the first pixel intensity data for generating the thickness profile for the ophthalmic lens.

In one embodiment, a method includes transmitting the thickness profile for the ophthalmic lens to the central processor, comparing the transmitted thickness profile for the ophthalmic lens to a predetermined thickness profile, and if the transmitted thickness profile does not equal the predetermined thickness profile, generating a signal for adjusting the thickness of subsequently manufactured ophthalmic lenses.

In one embodiment, a method includes making iterative changes to subsequently manufactured ophthalmic lenses by repeatedly comparing the generated thickness profile for an ophthalmic lens to the predetermined thickness profile.

In one embodiment, an absorptive imaging system for measuring the thickness of ophthalmic lenses includes an illumination source that generates a first light having a first wavelength, a forming optic having a convexly curved top surface, and an ophthalmic lens overlying the convexly curved top surface of the forming optic, the ophthalmic lens including a light absorptive component that absorbs some of the first light as the first light passes through the ophthalmic lens and the forming optic.

In one embodiment, the system includes a digital image capturing device located downstream from the forming optic for capturing a first digital image of the first light after the first light has passed though the ophthalmic lens and the forming optic. In one embodiment, the first digital image has first pixel intensity data that corresponds to the shape of the ophthalmic lens.

In one embodiment, the system includes a central processing unit having a program that compares the first pixel intensity data to the intensity of the first light prior to passing the first light through the ophthalmic lens and the forming optic to generate a thickness profile for the ophthalmic lens.

In one embodiment, a system includes a second illumination source that generates a second light having a second wavelength that is different than the first wavelength and that is not absorbed by the light absorptive component of the ophthalmic lens.

In one embodiment, the digital image capturing device captures a second digital image of the second light after the second light has passed through the ophthalmic lens and the forming optic, whereby the second digital image has second pixel intensity data that corresponds to intensity changes due to the presence of refractive effects as said second light passes through the ophthalmic lens.

In one embodiment, the program of the central processing unit isolates the second pixel intensity data from the first pixel intensity data for generating the thickness profile for the ophthalmic lens.

In one embodiment, the ophthalmic lens includes a photoinitiator.

In one embodiment, the system has a third illumination source that generates a third light having a third wavelength that is different than the first and second wavelengths, that is absorbed by the photoinitiator, and that is not absorbed by the light absorptive component.

In one embodiment, the digital image capturing device captures a third digital image of the third light after the third light has passed through the ophthalmic lens and the forming optic, whereby the third digital image has third pixel intensity data that corresponds to the effects of bleaching of the photoinitiator.

In one embodiment, the program of the central processing unit isolates the third pixel intensity data from the first pixel intensity data for generating the thickness profile for the ophthalmic lens.

In one embodiment, the system includes a first integrating sphere containing the first illumination source, a second integrating sphere containing the second illumination source, whereby the second integrating sphere is spaced from the first integrating sphere, a third integrating sphere containing the third illumination source, whereby the third integrating sphere is spaced from the first and second integrating spheres, and a forming optic integrating sphere containing the forming optic and the ophthalmic lens, whereby the forming optic integrating sphere is spaced from the first, second and third integrating spheres.

When collecting intensity data for the light passing through an ophthalmic lens, "optical confusion" may result from a number of effects. In one embodiment, these effects are: 1) high frequency surface features that refract light into the aperture of the optical system, which may fool the algorithm into interpreting it as intensity attenuated thickness, and 2) non-Lambertian light (i.e., the light passing through the ophthalmic lens does not have the same intensity at all angles) selectively enters the lens and system aperture based on its angular intensity, which may fool the algorithm into interpreting it as intensity attenuated thickness. In one embodiment, the use of integrating sphere illumination enhances Lambertian light properties (i.e., uniform light).

In one embodiment, an absorptive imaging system for determining the thickness profile of an ophthalmic lens includes a control system that is programmed to compensate for errors in intensity readings that may occur due to refractive effects as the light passes through an ophthalmic lens. As used herein, the terminology "refractive effect" means lens surface profile features that refract light rays into a system aperture from lens surface locations not intended to enter the system aperture.

Perfect Lambertian light is preferred so that all light rays at all angles have the same intensity. Non-uniform illumination occurs when a first light ray entering a lens surface and a system aperture at a first lens surface location and angle has a different intensity than a second light ray entering the lens surface and system aperture at a second lens surface location and angle. The presence of non-uniform light may introduce defects into the intensity data collected for measuring lens thickness. In order to compensate for instances of non-uniform and/or non-Lambertian light, in one embodiment, an absorptive imaging system for determining the thickness profile of an ophthalmic lens includes a control system that is programmed to compensate for errors in intensity readings that may occur due to non-uniform illumination or non-Lambertian light passing through an ophthalmic lens. In one embodiment, the system controller performs calculations to remove errors that may occur due to non-uniform light passing through an ophthalmic lens.

In some instances, the combination of refractive effects and non-uniform illumination may generate still further errors in intensity readings. These further errors are in addition to those described above that are due to refractive effects and non-Lambertian light. In one embodiment, an absorptive imaging system has a control system that is programmed to compensate for errors in intensity readings due to a combination of both refractive effects and non-uniform illumination.

In one embodiment, an absorptive imaging system for determining the thickness profile of an ophthalmic lens includes a control system that is programmed to compensate for errors in intensity readings due to 1) refractive effects, 2) non-uniform illumination effects, and 3) a combination of refractive effects and non-uniform illumination effects.

These and other preferred embodiments of absorptive imaging systems for determining the thicknesses of ophthalmic lenses will be described in more detail below.

BRIEF DESCRIPTION OF THE DRAWING

FIG. 1A shows a method of forming an ophthalmic lens using a reactive monomer mixture and a forming optic.

FIG. 1B shows a method of forming an ophthalmic lens using a reactive monomer mixture and a forming optic.

FIG. 1C shows a method of forming an ophthalmic lens using a reactive monomer mixture and a forming optic.

FIG. 1D shows a method of forming an ophthalmic lens using a reactive monomer mixture and a forming optic.

FIG. 1F shows a method of forming an ophthalmic lens using a reactive monomer mixture and a forming optic.

FIG. 1G shows a method of forming an ophthalmic lens using a reactive monomer mixture and a forming optic.

FIG. 1H shows a method of forming an ophthalmic lens using a reactive monomer mixture and a forming optic.

FIG. 1I shows a method of forming an ophthalmic lens using a reactive monomer mixture and a forming optic.

FIG. 15 shows a method and the mathematics used for converting light entry angle thickness to axial thickness, in accordance with one embodiment of the present invention.

DETAILED DESCRIPTION

Figure 1E:
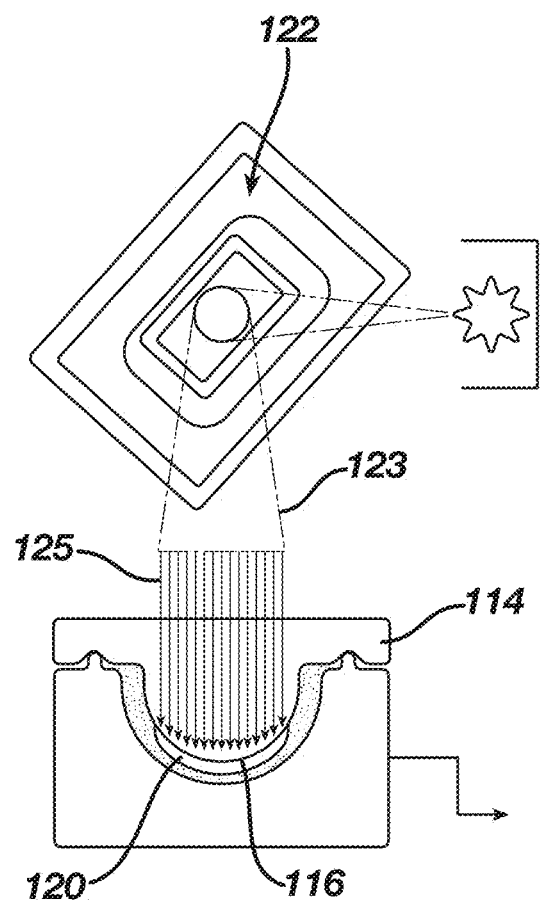
FIG. 1E shows a method of forming an ophthalmic lens using a reactive monomer mixture and a forming optic.

In the specification, various terms may be used for which the following definitions apply:

"Actinic Radiation" as used herein, refers to radiation that is capable of initiating a chemical reaction.

"Arcuate" as used herein, refers to a curve or bend like a bow.

"Beer's Law" as referred to herein and sometimes referred to as "Beers-Lambert Law" is: $I(x)/I0 = \exp(-\alpha c x)$, wherein $I(x)$ is the intensity as a function of distance x from the irradiated surface, I0 is the incident intensity at the surface, a is the absorption coefficient of the absorbing component, and c is the concentration of the absorbing component.

"Collimate" as used herein means to limit the cone angle of radiation, such as light that proceeds as output from an apparatus receiving radiation as an input; in some embodiments the cone angle may be limited such that proceeding light rays are parallel. Accordingly, a "collimator" includes an apparatus that performs this function and "collimated" describes the effect on radiation.

"DMD" as used herein, a digital micromirror device is a bistable spatial light modulator consisting of an array of movable micromirrors functionally mounted over a CMOS SRAM. Each mirror is independently controlled by loading data into the memory cell below the mirror to steer reflected light, spatially mapping a pixel of video data to a pixel on a display. The data electrostatically controls the mirror's tilt angle in a binary fashion, where the mirror states are either +X degrees (on) or −X degrees (off). For current devices, X can be either 10 degrees or 12 degrees (nominal). Light reflected by the on mirrors then is passed through a projection lens and onto a screen. Light is reflected off to create a dark field, and defines the black-level floor for the image. Images are created by gray-scale modulation between on and off levels at a rate fast enough to be integrated by the observer. In one embodiment, the DMD is a Texas Instruments DLP™ (Digital Light Processor), which is a trade name for a commercially available DMD (digital micromirror device).

"DMD Script" as used herein shall refer to a control protocol for a spatial light modulator and also to the control signals of any system component, such as, for example, a light source or filter wheel either of which may include a series of command sequences in time. Use of the acronym DMD is not meant to limit the use of this term to any one particular type or size of spatial light modulator.

"Etafilcon" as used herein refers to an exemplary material that may be used as a Reactive Mixture and can include approximately: ~95% HEMA (2-hydroxyethyl methacrylate) and 1.97% MAA (methacrylic acid) and 0.78% EGDMA (ethyleneglycol dimethacrylate) and 0.10% TMPTMA (trimethylolpropane trimethacrylate)-crosslinker and ~1% NOR-BLOC 7966 (a benzotriazole-type UV blocker) and ~1% photoinitiator CGI 1700 and Diluent-BAGE (boric acid ester of glycerol) (U.S. Pat. No. 4,495,313) in a 52:48 reactive component:diluent ratio.

"Fixing Radiation" as used herein, refers to Actinic Radiation sufficient to one or more of: polymerize and crosslink essentially all Reactive Mixture comprising a Lens Precursor or lens.

"Fluent Lens Reactive Media" as used herein means a Reactive Mixture that is flowable in either its native form, reacted form, or partially reacted form and is formed upon further processing into a part of an ophthalmic lens.

"Free-form" as used herein "free-formed" or "free-form" refers to a surface that is formed by cross linking of a Reactive Mixture and is not shaped according to a cast mold.

"Gel Point" as used herein shall refer to the point at which a gel or insoluble fraction is first observed. Gel point is the extent of conversion at which the liquid polymerization mixture becomes a solid. Gel point can be determined using a soxhlet experiment: Polymer reaction is stopped at different time points and the resulting polymer is analyzed to determine the weight fraction of residual insoluble polymer. The data can be extrapolated to the point where no gel is present. This point where no gel is present is the gel point. The gel point may also be determined by analyzing the viscosity of the reaction mixture during the reaction. The viscosity can be measured using a parallel plate rheometer, with the reaction mixture between the plates. At least one plate should be transparent to radiation at the wavelength used for polymerization. The point at which the viscosity approaches infinity is the gel point. Gel point occurs at the same degree of conversion for a given polymer system and specified reaction conditions.

"Lens" as used herein "lens" refers to any ophthalmic device that resides in or on the eye. These devices can provide optical correction or may be cosmetic. For example, the term lens can refer to a contact lens, intraocular lens, overlay lens, ocular insert, optical insert or other similar device through which vision is corrected or modified, or through which eye physiology is cosmetically enhanced (e.g. iris color) without impeding vision. In some embodiments, the preferred lenses of the invention are soft contact lenses are made from silicone elastomers or hydrogels, which include but are not limited to silicone hydrogels, and fluorohydrogels.

"Lens Precursor" as used herein, means a composite object consisting of a Lens Precursor Form and a Fluent Lens Reactive Mixture in contact with the Lens Precursor Form. For example, in some embodiments Fluent Lens Reactive Media is formed in the course of producing a Lens Precursor Form within a volume of Reactive Mixture. Separating the Lens Precursor Form and adhered Fluent Lens Reactive Media a from the volume of Reactive Mixture used to produce the Lens Precursor Form can generate a Lens Precursor. Additionally, a Lens Precursor can be converted to a different entity by either the removal of significant amounts of Fluent Lens Reactive Mixture or the conversion of a significant amount of Fluent Lens Reactive Media into non-fluent incorporated material.

"Lens Precursor Form" as used herein, means a non-fluent object with at least one optical quality surface which is consistent with being incorporated upon further processing into an ophthalmic lens.

"Lens Forming Mixture" as used herein, the term or "Reactive Mixture" or "RMM" (reactive monomer mixture) refers to a monomer or prepolymer material which can be cured and/or cross linked to form an ophthalmic lens. Various embodiments can include lens forming mixtures with one or more additives such as: UV blockers, tints, photoinitiators or catalysts, and other additives one might desire in an ophthalmic lenses such as, contact or intraocular lenses.

"Mold" as used herein, refers to a rigid or semi-rigid object that may be used to form lenses from uncured formulations. Some preferred molds include two mold parts forming a front curve mold part and a back curve mold part.

"Radiation Absorbing Component" as used herein, the term "refers to radiation-absorbing component which can be combined in a reactive monomer mix formulation and which can absorb radiation in a specific wavelength range.

Reactive Mixture (also sometimes referred to herein as: Lens Forming Mixture or Reactive Monomer Mixture and with same meaning as "Lens Forming Mixture").

"Substrate" as used herein means a physical entity upon which other entities are placed or formed.

"Transient Lens Reactive Media" as used herein means a Reactive Mixture that may remain in fluent or non-fluent form on a Lens Precursor Form. However, Transient Lens Reactive Media is significantly removed by one or more of: cleaning, solvating and hydration steps before it becomes incorporated into an ophthalmic lens. Therefore, for clarity, the combination of a Lens Precursor Form and the transient lens Reactive Mixture does not constitute a Lens Precursor.

"Voxel" as used herein "Voxel" or "Actinic Radiation Voxel" is a volume element, representing a value on a regular grid in three dimensional space. A Voxel can be viewed as a three dimensional pixel, however, wherein a pixel represents 2D image data a Voxel includes a third dimension. In addition, wherein Voxels are frequently used in the visualization and analysis of medical and scientific data, in the present invention, a Voxel is used to define the boundaries of an amount of actinic radiation reaching a particular volume of Reactive Mixture, thereby controlling the rate of cross linking or polymerization of that specific volume of Reactive Mixture. By way of example, Voxels are considered in the present invention as existing in a single layer conformal to a 2-D mold surface wherein the Actinic Radiation may be directed normal to the 2-D surface and in a common axial dimension of each Voxel. As an example, specific volume of Reactive Mixture may be cross linked or polymerized according to 768×768 Voxels.

"Voxel-based Lens Precursor" as used herein "Voxel-based Lens Precursor" means a Lens Precursor where the Lens Precursor Form has been formed by use of a Voxel-based lithographic technique.

In one embodiment, ophthalmic lenses are formed using a Voxel-based lithography optical apparatus as disclosed in commonly assigned U.S. Pat. No. 8,318,055 to Widman et al., the disclosure of which is hereby incorporated by reference herein.

In one embodiment, the voxel-based lithography optical apparatus is incorporated into a system that uses actinic radiation to create lens forms and lens precursors. In one embodiment, the apparatus takes highly uniform intensity radiation and controls irradiation onto the surface of a forming optic at numerous discrete points across the forming optic surface, essentially on a voxel by voxel basis. This control allows the apparatus to control the degree of reaction that occurs in a reactive monomer mixture along the light path of a particular voxel location, which ultimately determines the volume of the reacted material there and thus, the shape of a lens precursor formed thereon.

FIGS. 1A-1M show methods for forming ophthalmic lens precursors and ophthalmic lenses and methods of using an absorptive imaging system for determining the thickness of the lens precursor or a fully cured lens.

Referring to FIG. 1A, in one embodiment, a reservoir 100 is adapted to receive a reactive monomer mixture. The reservoir 100 includes a top surface 102 having an alignment and spacing ring 104. The reservoir 100 includes a well 106 adapted to receive and hold a dose of a reactive monomer mixture used for forming ophthalmic lens precursors and ophthalmic lenses as disclosed in commonly assigned U.S. Pat. No. 8,318,055 to Widman et al., the disclosure of which is hereby incorporated by reference herein.

Referring to FIG. 1B, in one embodiment, a container 108 holds a solution of the reactive monomer mixture 110. A dispensing system 112 dispenses a predetermined volume of the reactive monomer mixture 110 into the well 106 of the reservoir 100.

Referring to FIG. 1C, in one embodiment, a forming optic 114 is juxtaposed with the well 106 of the reservoir 100. The forming optic 114 includes a convexly curved surface 116 that is adapted to be immersed into the monomer dose 110 contained within the well 106 of the reservoir 100. In one embodiment, the forming optic 114 includes a ring-shaped alignment groove 108 that is adapted to engage the alignment and spacing ring 104 at the top surface 102 of the reservoir 100 for aligning the forming optic 114 with the well 106 of the reservoir 100.

Referring to FIG. 1D, in one embodiment, the convexly curved surface 116 of the forming optic 114 is lowered into the reactive monomer mixture 110 disposed within the reservoir 100 so that the reactive monomer mixture 110 is in contact with the convexly curved surface 116 of the forming optic 114.

In one embodiment, the forming optic 114 is a reusable forming optic that is precision molded to reduce cost and to provide for a single piece that may be kinematically located relative to an optical axis. Repeatable positioning of the forming optic during lens forming and metrology steps is critical to effective iterative convergence and process stability. Individual forming optics may be positioned kinematically to +/−200 nm in the x and y directions. In one embodiment, the convexly curved surface 116 of the forming optic 114 may be coated with a hydrophobic self-assembled monolayer (commonly referred to by the acronym SAM) comprised of a fluorosilane to allow for the formation and definition of clean lens edges.

In one embodiment, the well 106 (FIG. 1A) of the reservoir 100 is filled with the reactive monomer mixture 110 before the forming optic 114 is lowered onto the reservoir 100. In other embodiments, the forming optic 114 and the reservoir 100 may be placed inside a containment vessel and subjected to purging with a gas flow (e.g., nitrogen). In one embodiment, the reactive monomer mixture may be filtered prior to being dispensed into the reservoir.

The reactive monomer mixture may be transferred into the reservoir 100 by different methodologies including hand filling, quantitative fluid transfer by automatic means, or filling until a level detector measures the appropriate level of reactive monomer mixture 110 in the reservoir 100.

In embodiments where the level of oxygen is critical to the photo processing steps, oxygen may be present as a dissolved species in the reactive monomer mixture. In such an embodiment, it is necessary to establish an oxygen concentration in the reactive monomer mixture. In one embodiment, the reactive monomer mixture is allowed to dwell in a gaseous environment through which purge gas is flowing. Another embodiment may use vacuum purging of the dissolved gasses in a supply of the monomer mixture and reconstituting a desired amount of oxygen during a dispensing of the mixture through membrane exchange of gas with the liquid to be dispensed. In other embodiments, any device that controls the oxygen concentration may be utilized. Furthermore, in a more general sense, other materials may act as appropriate inhibitors in the presence or absence of the dissolved oxygen.

In one embodiment, a lens precursor forming projection system includes a light source that emits light having a defined band of wavelengths but with some spatial variation in intensity and direction. The system may include a spatial intensity controller or collimator that condenses, diffuses and, in some embodiments, collimates light to create a beam of light that is highly uniform in intensity. In one embodiment, the beam of light impinges on a digital micromirror device (DMD) that divides the beam into pixel elements of intensity, each of which can be assigned a digital on or off value. In one embodiment, the mirror at each pixel merely reflects light in one of two paths. An "on" path is a path that leads to photons proceeding toward a reactive chemical media. An "off" path is a path that is not directed toward the reactive chemical media. In one embodiment, the "off" path directs photons to impinge upon a beam dump that is designed to absorb and entrap any photons directed towards it. In one embodiment, the light in the "on" path may include many different pixel values that have been set to the "on" value and are spatially directed along an appropriate individual path corresponding to their pixel location. A time averaged intensity of each of the pixel elements along their respective paths may be represented as a spatial intensity profile across a spatial grid defined by the DMD. Alternatively, with a constant intensity impinging upon each mirror, item 125 (FIG. 1E) may represent a spatial time exposure profile.

Each pixel element in the on state will have photons directed along path 123. In some embodiments, the beam may be focused by a focusing element. By way of example, FIG. 1E depicts an embodiment where the light paths 123 are imaged so that they impinge in an essentially vertical manner upon the optic surface 116 of the forming optic 114. The imaged light now proceeds through the forming optic 114, and into a volume of space that contains reactive monomer mixture in the reservoir 100. It is the interaction of this light for a given pixel location, that defines an "on" state voxel element in the volume in the reservoir 100, and around the forming optic 114. These photons in this volume may be absorbed and precipitate an actinic reaction in the molecule that absorbs it, leading to a polymerization state change of the monomer in this general vicinity.

Referring to FIG. 1E, in one embodiment, a lens precursor 120 is formed on the convexly curved surface 116 of the forming optic 114 using a DMD 122 that generates light having a wavelength of 365 nm. In one embodiment, the DMD 122 contains 768×124 mirrors. In one embodiment, the mirrors (e.g., 14 micron square mirrors) flip at a rate of 9 kilohertz to provide grayscale/spatial resolution for lens forming. In one embodiment, the DMD 122 utilizes a DMD Script to operate as set forth in commonly assigned U.S. Pat. No. 8,318,055 to Widman et al., the disclosure of which is hereby incorporated by reference herein.

Referring FIGS. 1F and 1G, after the lens precursor 120 has been at least partially formed, the forming optic 114 and the lens precursor 120 are lifted up and away from the reservoir 100 for separating the lens precursor 120 from the reactive monomer mixture 110.

FIG. 1H shows the forming optic 114 after it has been separated from the reservoir 100. The lens precursor 120 overlies the convexly curved surface 116 of the forming optic 114. The unreacted and partially reacted monomer mixture 110 remains within the well 106 of the reservoir 100.

Referring to FIG. 1I, in one embodiment, the forming optic 114 with the lens precursor 120 overlying the convexly curved surface 116 is flipped so that the lens precursor 120 is in an upright configuration.

Figures 1J, 1K:
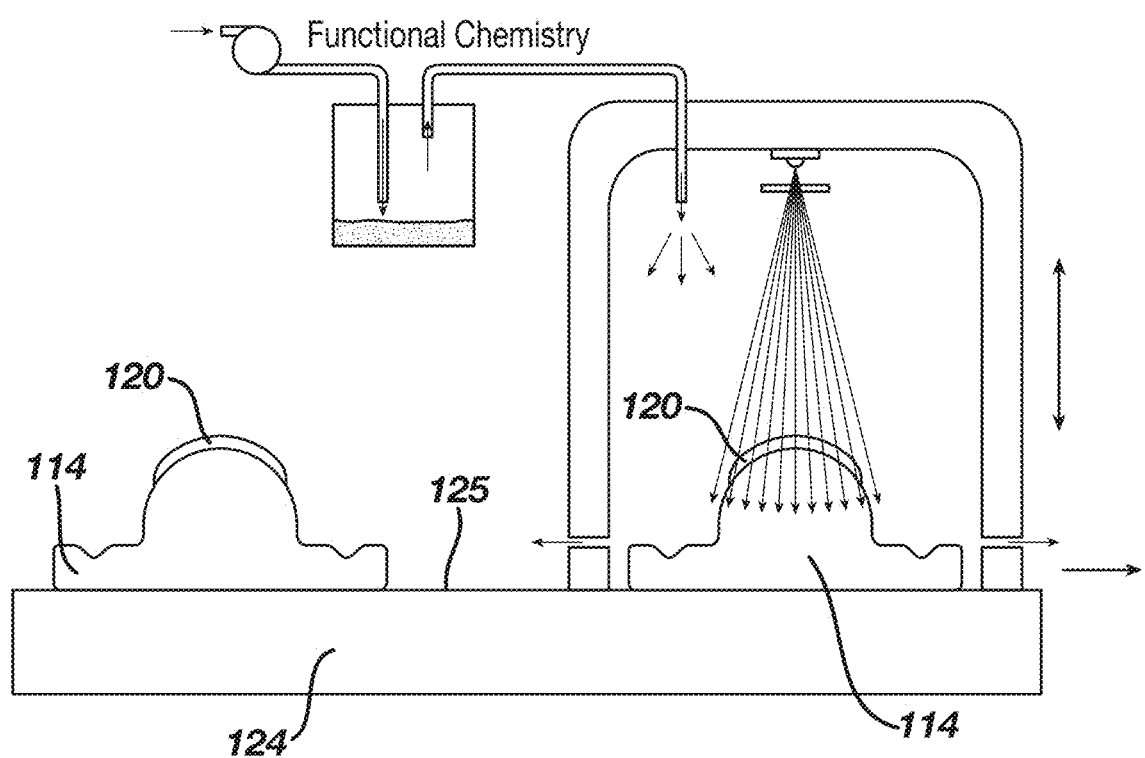
FIG. 1J shows a method of forming an ophthalmic lens using a reactive monomer mixture and a forming optic.
FIG. 1K shows a method of forming an ophthalmic lens using a reactive monomer mixture and a forming optic.

Referring to FIG. 1J, in one embodiment, the flipped forming optic 114 that contains the lens precursor 120 is positioned atop a top surface 125 of a supporting substrate 124.

Referring to FIG. 1K, in one embodiment, the forming optic 114 and the lens precursor 120 are disposed inside a chemical vapor deposition chamber 126. In one embodiment, vapor deposition of functional chemistries is deposited onto the lens precursor 120 and a final cure of the lens precursor 120 is conducted using light, such as 420 nm light.

Figure 1L:
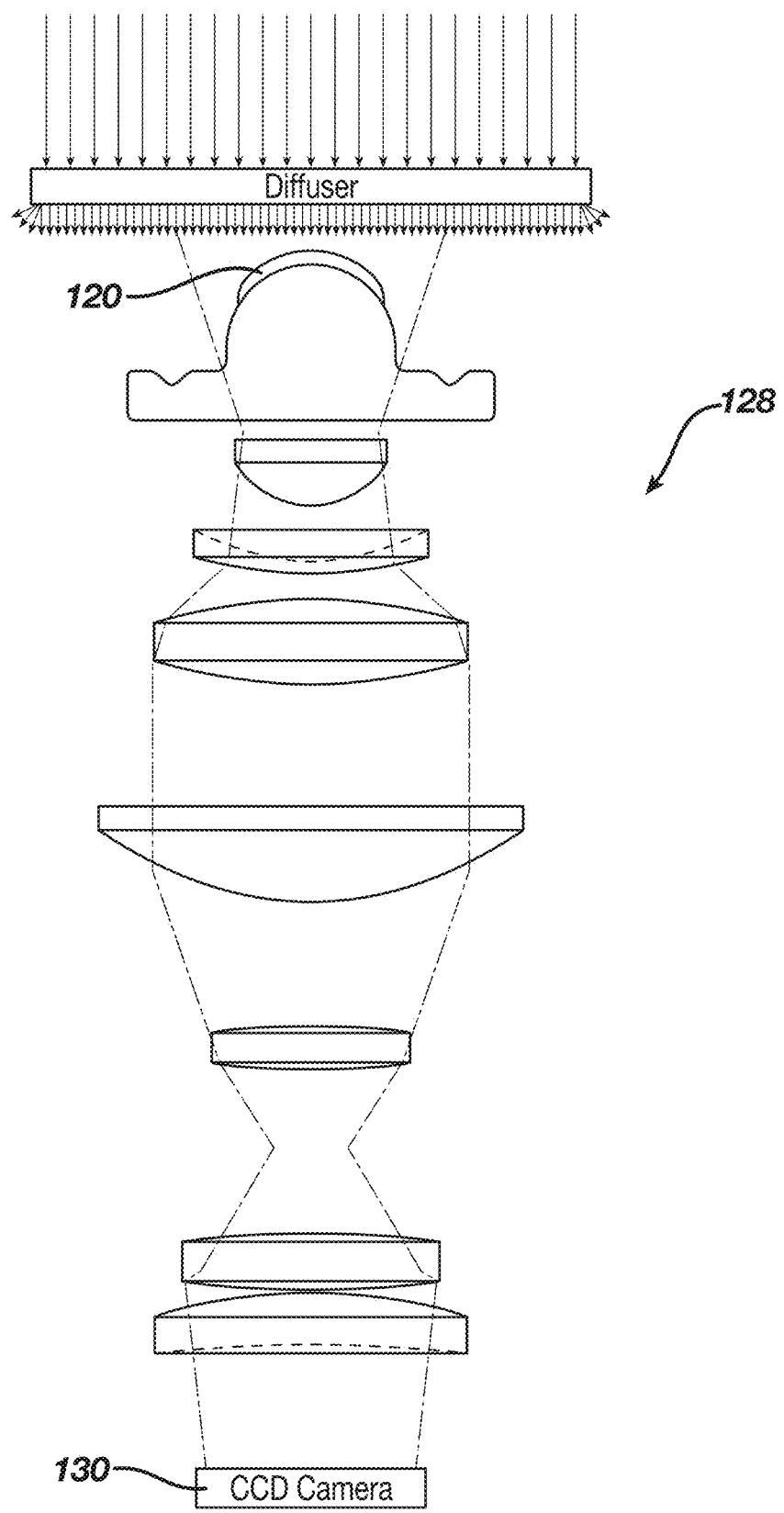
FIG. 1L shows a method of using an absorptive imaging system to determine the thickness of an ophthalmic lens disposed on a forming optic, in accordance with one embodiment of the present invention.

Referring to FIG. 1L, in one embodiment, an absorptive imaging system 128 is utilized for measuring the thickness of an ophthalmic lens 120. In one embodiment, the absorptive imaging system 128 uses an imaging arrangement and the known absorptive properties of a given media (e.g., the reactive monomer mixture) to determine the surface thickness of the lens 120 from image pixel intensity. The system 128 may be utilized to measure the thickness of lenses including but not limited to lens precursors, final lenses, cast molded lenses encapsulated in mold pieces, cast molded lenses after de-molding with a single mold half, and hydrated cast molded lenses in solution.

In one embodiment, mathematical formulations and system calibration make it possible to use the intensity of an image of a lens to calculate the thickness of the lens. In one embodiment, the absorptive imaging system uses digital imaging devices that consist of pixel elements, typically arranged in an x-y grid, making it possible to use individual pixel intensity values to generate a thickness surface profile for the object (e.g., an ophthalmic lens) being measured. The resulting thickness measurements and/or the entire surface profile can be used to determine how well a manufactured article matches its intended design. In one embodiment, the system uses the thickness data to adjust the formation parameters for forming subsequent lenses.

In one embodiment, the reactive monomer mixture used to form the ophthalmic lens 120 has a component that absorbs incident radiation over the spectrum band selected for use. In one embodiment, the reactive monomer mixture contains a UV-absorbing additive, such as Norbloc, and photoinitiators (PI), such as Irgacure 1700.

Figure 1M:
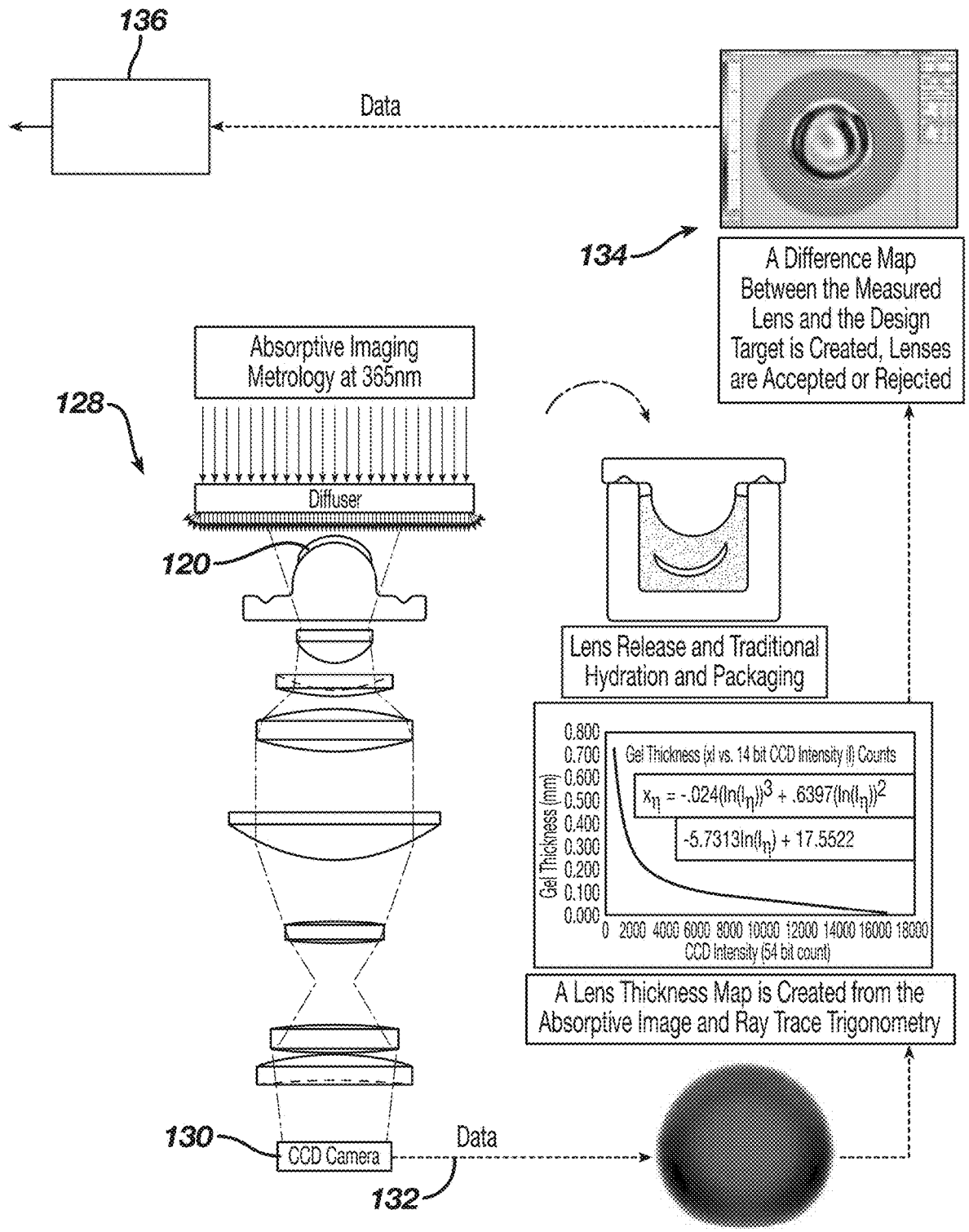
FIG. 1M shows a method of using an absorptive imaging system to determine the thickness of an ophthalmic lens disposed on a forming optic, in accordance with one embodiment of the present invention.
Figure 2:
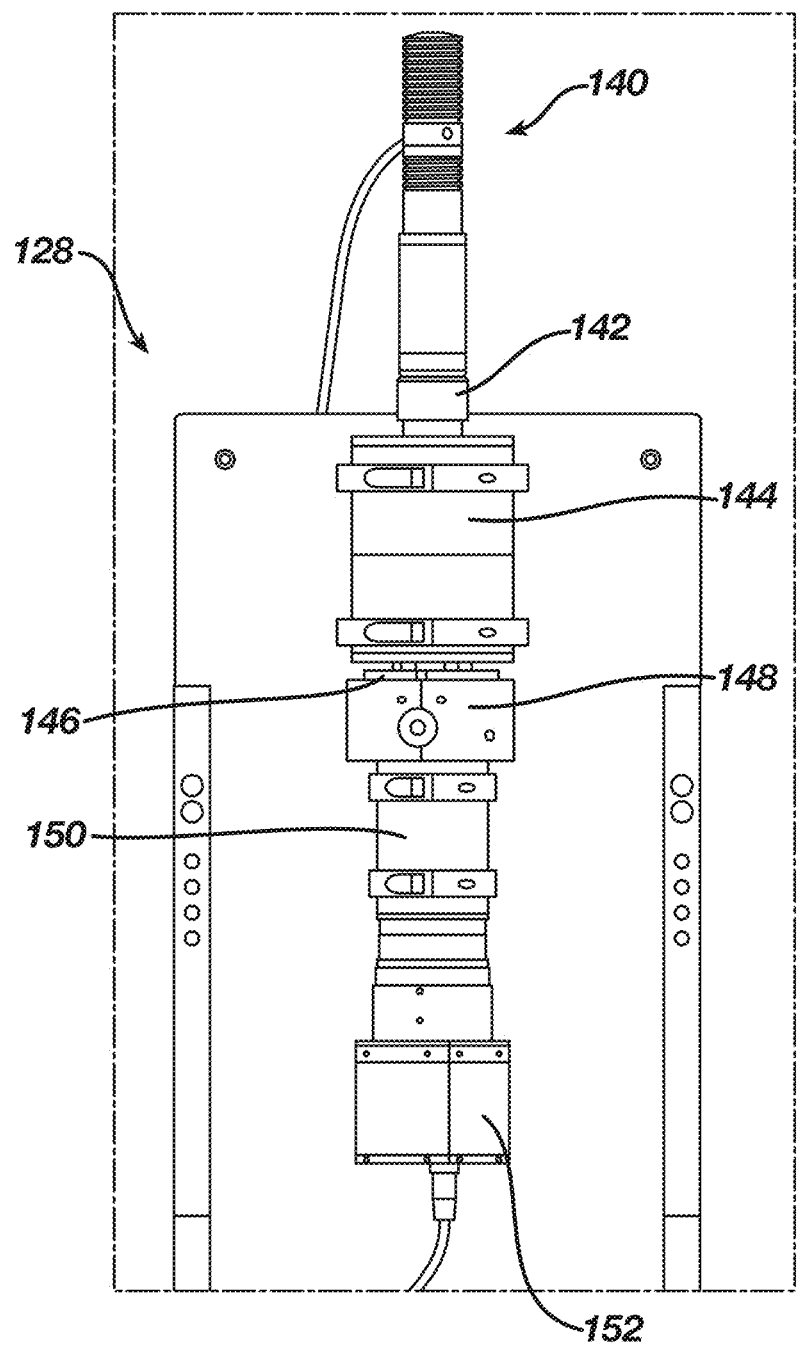
FIG. 2 shows a perspective view of an absorptive imaging system having a single illumination source, in accordance with one embodiment of the present invention.
Figure 3A:
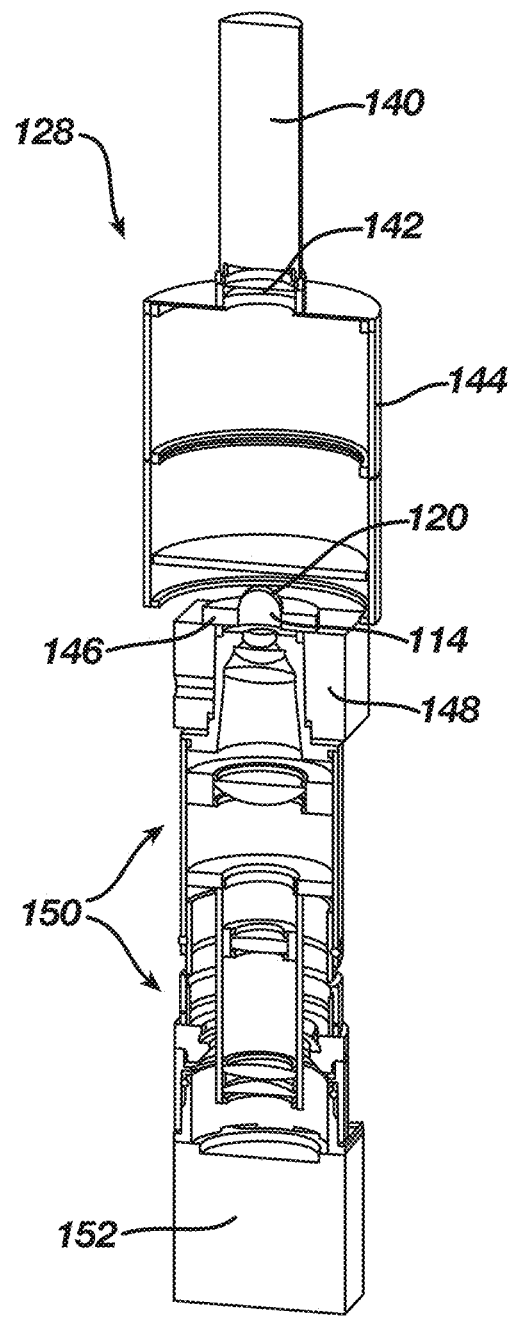
FIGS. 3A-3C show cross sectional and exploded views of the absorptive imaging system shown in FIG. 2.
Figure 3B:
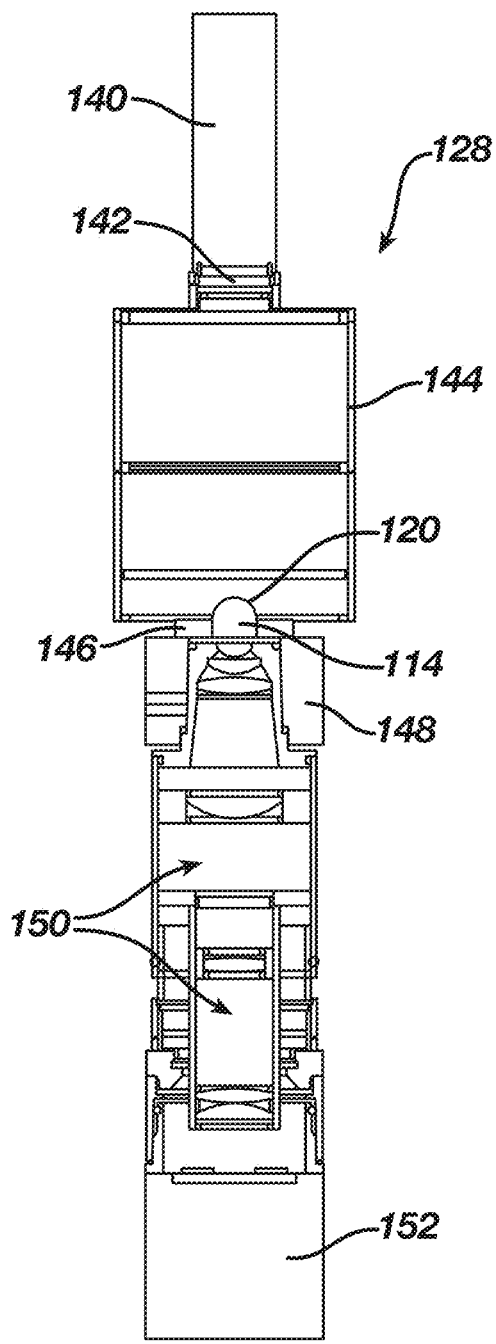
Figure 3C:
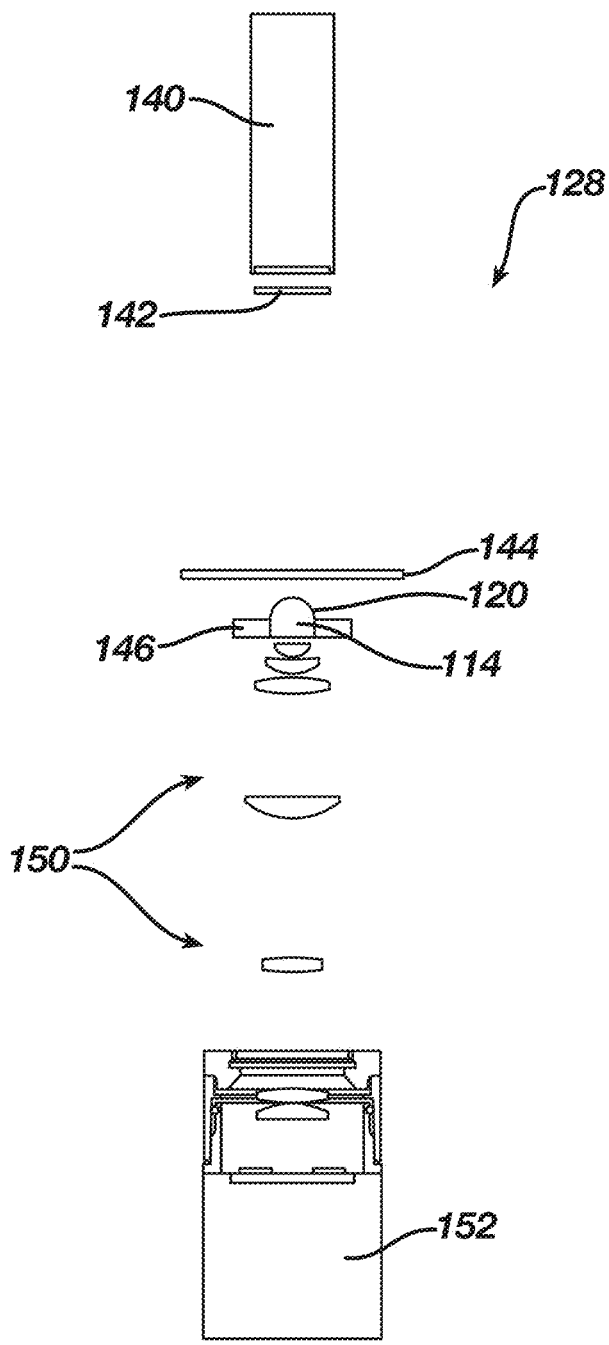

Referring to FIGS. 1L and 1M, in one embodiment, the absorptive imaging system 128 includes a light diffuser, a series of optical lenses, and a camera 130 (e.g., a digital camera) that captures an intensity image to provide data to a thickness and metrology measurement program.

In one embodiment, the light utilized for measuring the thickness of the lens has a wavelength of 365 nm. Referring to FIG. 1M, in one embodiment, after the camera 130 has captured data 132, a lens thickness map is created from the absorptive image data and ray trace trigonometry. At the stage designated 134, a difference map between the measured lens 120 and the design target is created. This difference map is utilized to determine whether the lens 120 is accepted or rejected.

At a stage designated 136, iterative conversion occurs whereby sophisticated gain algorithms are used for adjusting the lens forming exposure image to bring the next lens that will be formed closer to the design target. In one embodiment, a high resolution 16± bit lens forming exposure image is sent to the DMD 122 (FIG. 1E) for forming the next optical lens.

Referring to FIGS. 2 and 3A-3C, in one embodiment, an absorptive imaging system 128 includes an illumination source 140 that generates light, such as ultraviolet light. In one embodiment, the illumination source 140 generates light that contains a region of the spectrum in which the reactive monomer solution absorbs incident radiation. In one embodiment, the illumination source 140 uses a 365 nm LED, although other broad band and selective band sources may be utilized. In other embodiments, alternative illumination sources may include 370 nm LEDs, 375 nm LEDS, and Xenon lamps.

In one embodiment, the illumination source 140 radiates light continuously. In one embodiment, the illumination source may be pulse synchronized to the image capture (e.g., turned on and off). In one embodiment, a shutter may be used to turn the light on and off.

In one embodiment, in order for the absorptive imaging system to perform precise, quality optical measurements in a repeatable manner, it is preferable that the illumination source spectrum remain consistent. In one embodiment, the system controls the LED spectrum by using a thermoelectric controller (TEC) to maintain the LED's junction temperature and a high quality, current regulated power supply to drive the LED. In one embodiment, a spectrometer may be used to monitor the LED spectrum throughout the measurement process and during operation of the system. Changes in the light spectrum, beyond tolerance, will warrant a recalibration of the system.

In one embodiment, the absorptive imaging system preferably includes an optical filter compartment 142 in which an optical filter may be placed to further define the illuminating spectrum used during imaging. In one embodiment, the optical filter may be a band pass filter, a cut-on filter, or a cut-off filter. The actual optical filter selected will preferably depend on the illumination source being used, the media being measured, and the media's thickness range that it is desired to be most sensitive to.

In one embodiment, the absorptive imaging system 128 desirably includes a diffuse illumination compartment 144 containing diffusing components to insure the radiation source is uniform and generates light rays that strike the ophthalmic lens at suitable angles to fill the resulting image collection cones. In one embodiment, the illumination source 140, the optical filter compartment 142, and the diffuse illumination compartment 144 are assembled together as a unit that is attached to a spring-loaded linear stage that allows the unit to be raised up so as to enable a forming optic containing a lens to be loaded into and unloaded from the absorptive imaging system.

In one embodiment, a forming optic mount 146 containing a forming optic 114 and an ophthalmic lens 120 (FIG. 1J) is adapted to be loaded into the absorptive imaging system 128. In one embodiment, the absorptive imaging system 128 desirably includes a kinematic mount 148 that is adapted to receive the forming optic mount 146 for properly aligning the forming optic and the lens with the optical components and/or the optical axis of the system. In one embodiment, the kinematic mount 148 is utilized to place the forming optic and the lens on the forming optic close to the optical axis of the absorptive imaging system 128. The kinematic mount preferably allows for x and y axis adjustments, if necessary to align the forming optic with the optical axis or the critical optical components.

In one embodiment, the absorptive imaging system 128 desirably includes a set of imaging lenses 150 comprising a series of lenses utilized to collect and form an image of the lens that is disposed on the forming optic.

In one embodiment, the absorptive imaging system includes a camera 152, such as a digital camera, that is utilized to capture data and/or images of the lens sample being measured. In one embodiment, the camera preferably captures an intensity image of the lens.

It is well documented that camera noise increases with temperature and to some degree camera response does as well. In one embodiment, the absorptive imaging system includes an environmental temperature control mechanism to ensure that the temperature of the system components is consistent throughout the measurement and during operation of the system.

In one embodiment, it has been observed that small changes to camera response can occur from the temporal profile of radiant energy coming from the illumination source and striking the CCD sensor of the camera during or before the measurement. Camera intensity increases as the sensor's temperature rises. The change in camera response is small and on the order of less than 1% of signal maximum, but for optical grade measurements this is considered significant. In one embodiment, the absorptive imaging system employs techniques that eliminate, minimize or maintain consistency of the radiant energy impinging on the camera sensor just before and during measurement.

In one embodiment, the system captures images, physically, in a 16-bit format, although the camera's ADC circuitry is limited to a 14-bit depth. In one embodiment, the actually useable bit depth is estimated to be between 10 and 11 bits. In one embodiment, a number of techniques for improving camera performance may be utilized including but not limited to multiple image captures and averaging, pixel binning, environmental control and thermal management, high dynamic range imaging techniques, spectrum band optimization for the thickness range expected to be measured, and sensor "slow readout mode."

Referring to Equation 1 below, in one embodiment, during operation of the absorptive imaging system, the propagation of incident radiation through the lens media is calculated using Beer-Lambert's law.

$$I = I_o * e^{-\alpha(\lambda)ct} \qquad \text{Equation 1}$$

where,
I=resulting intensity at some given thickness of penetration ($\mu W/cm^2$)
$I_o$=initial intensity at thickness 0 ($\mu W/cm2$)
$\alpha(\lambda)$=extinction coefficient function with a dependency on wavelength ($\lambda$)
c=concentration within the media
t=thickness of the propagation path In one embodiment, the absorptive imaging system calculates the absorption of the incident radiation in the lens media using Equation 2 below.

$$A = -\log(I/I_0) = \varepsilon l c = \alpha l \qquad \text{Equation 2}$$

where,
I=resulting intensity at some given thickness of penetration ($\mu W/cm^2$)
$I_o$=initial intensity at thickness 0 ($\mu W/cm2$)
$\varepsilon$=molar absorptivity—has a dependency on wavelength
l=path length
c=concentration
$\alpha$=absorption coefficient—has a dependency on wavelength In one embodiment, the lens media has a component that absorbs incident radiation over the spectrum band selected for use. In one embodiment, the formed ophthalmic lenses being measured include the UV-absorbing additive Norbloc and/or initiators such as Irgacure 1700.

In one embodiment, in lens media in which the concentration, c, is considered fixed and homogeneous, the thickness of the lens can be derived from Equation 1 (shown above) as shown below in Equation 3.

$$t = -\ln(I/I_0)/-\alpha(\lambda)c \qquad \text{Equation 3}$$

Since the state of the lens at the measurement station is post formed and cured, but pre-hydrated, it still contains some amount of unreacted photoinitiator. In one embodiment, the photoinitiator will eventually be leached out in a downstream lens hydration process.

The photoinitiator used in the reactive monomer mixture photo bleaches, meaning that its absorptive spectrum changes as it is exposed to activating radiation (i.e., over time, absorption goes down as bleaching occurs). Essentially, the 365 nm light used to measure the thickness of the lens is reacting with left over photoinitiator and causing the absorptive properties of the lens to slowly change over time in addition to the stable absorptive properties of the UV blocker (e.g., Norbloc). In one embodiment, techniques have been employed to account for this phenomenon, which include using shuttering or LED on/off control to prevent radiation from striking the lens, except during the short measurement period.

Figure 4:
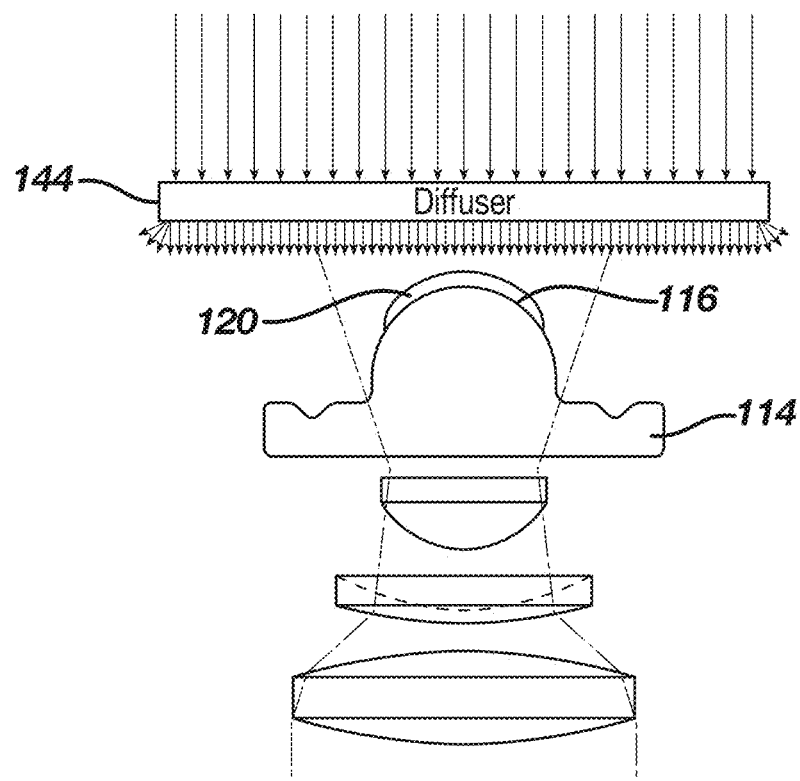
FIG. 4 shows a diffusing element, a forming optic and imaging optics of an absorptive imaging system, in accordance with one embodiment of the present invention.

In one embodiment, an imaging arrangement has been devised that contains back-light illumination, imaging optics and a camera. In one embodiment, the absorptive imaging system provides uniform incident radiation to the curved surface of a contact lens. Referring to FIG. 4, in one embodiment, the diffuse illumination compartment 144 insures that the uniform incident radiation is directed onto the convexly curved surface of the formed lens 120, which, in turn, overlies the convexly curved surface 116 of the forming optic 114.

Figure 5:
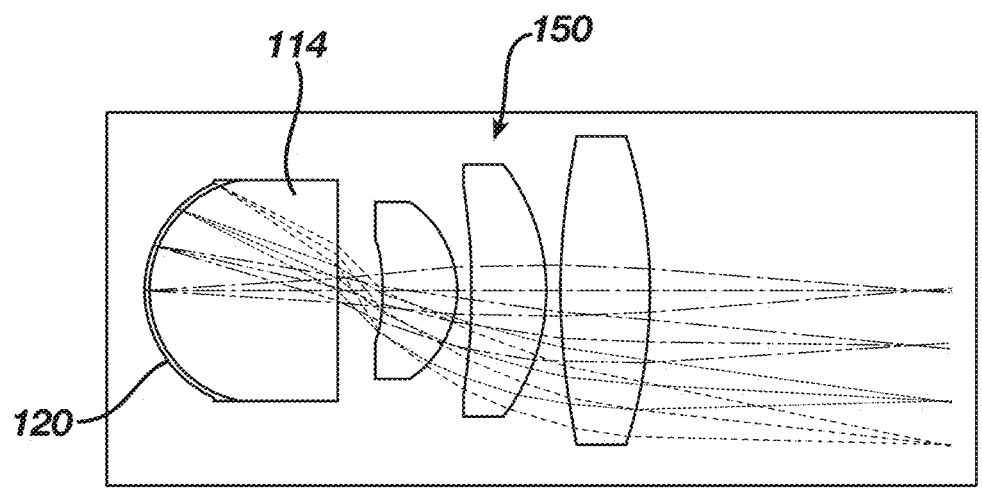
FIG. 5 shows the primary incident angles and cone angles across the surface of a forming optic created by illumination and an imaging optic design, in accordance with one embodiment of the present invention.

In one embodiment, the illumination and optics design collects the propagated radiation at cone angles that are roughly equivalent across the surface area and at roughly the same perpendicular to surface, angle of incidence. Referring to FIG. 5, in one embodiment, after the uniform incident radiation passes through the convexly curved surface of the lens 120 (FIG. 4) and Forming Optic 114, the imaging lens set 150 is configured and designed to collect the propagated radiation at cone angles that are roughly equivalent across the surface area and at roughly the same perpendicularity to the surface, angle of incidence.

Figure 6A:
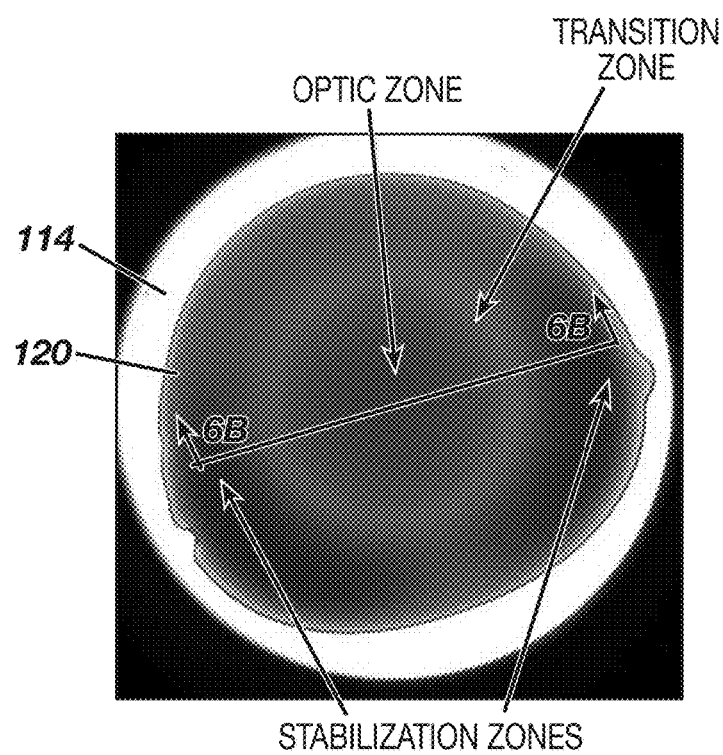
FIG. 6A shows an absorptive image of an ophthalmic lens, in accordance with one embodiment of the present invention.

Referring to FIG. 6A, in one embodiment, the image of the formed lens 120 is shown atop its forming optic 114. The lens 120 has regions of various thicknesses. In one embodiment, the lens 120 includes a centrally located optic zone, a transition zone that surrounds the optic zone, and thicker stabilization zones located at the outer periphery of the lens 120. The same image used for thickness measurement is also suitable for performing automated quality inspection, which includes the detection of traditional edge and surface type defects found within the contact lens industry.

Figure 6B:
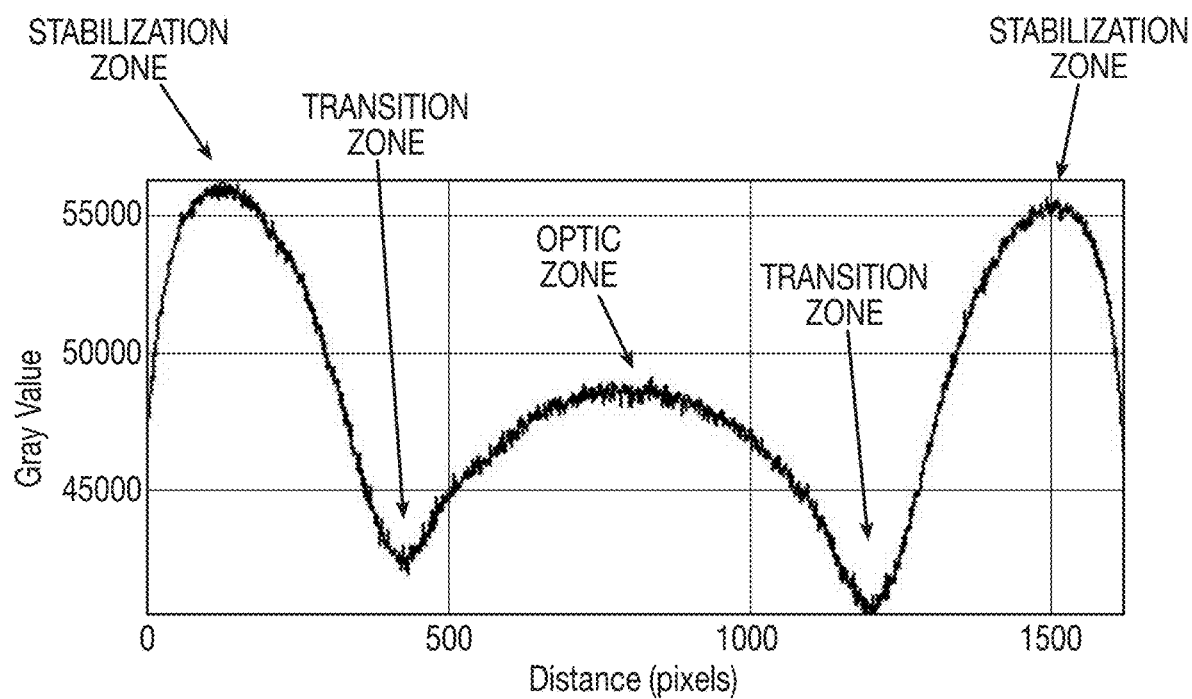
FIG. 6B shows a thickness profile across section 6B-6B of FIG. 6A based upon image intensity where darker intensity represents greater thickness, in accordance with one embodiment of the present invention.

FIG. 6B shows the thickness profile of the lens 120 in FIG. 6A. Comparing FIGS. 6A and 6B, the darker intensity areas of the lens 120 represent areas of greater thickness. The lighter intensity areas of the lens represent areas that are relatively thinner.

In one embodiment, the absorptive imaging system includes one or more components for controlling the ambient environment, the temperature, and the humidity level.

In one embodiment, the ambient gaseous environment may be controlled through the use of purging gas (e.g., nitrogen gas). Purging may be performed to increase or reduce oxygen partial pressure to predetermined levels. Humidity may also be maintained at predetermined levels, such as at lower humidity levels than an office environment.

In one embodiment, the level of vibrational energy that is allowed to interact with the system components may be controlled. In one embodiment, support structures define a relatively low vibrational environment. In other embodiments, the absorptive imaging system may be supported upon one or more active vibrational supports. In one embodiment, air bladder support pistons or other conventional components for minimizing the effects of vibration may be used.

Particulates in the environment of the system may introduce undesirable defect modes of various types including obtaining incorrect thickness data. In one embodiment, the absorptive imaging system may include one or more components for limiting particulate levels in and around the system components. In one embodiment, the absorptive imaging system may include one or more high efficiency particulate air (HEPA) filters for controlling and/or limiting particulate matter in the environment.

In one embodiment, the absorptive imaging system may be enclosed in opaque material to limit stray sources of light or photon energy. In one embodiment, the system uses filtered light sources in the environment of the system, which may be environmental lighting.

Figure 7:
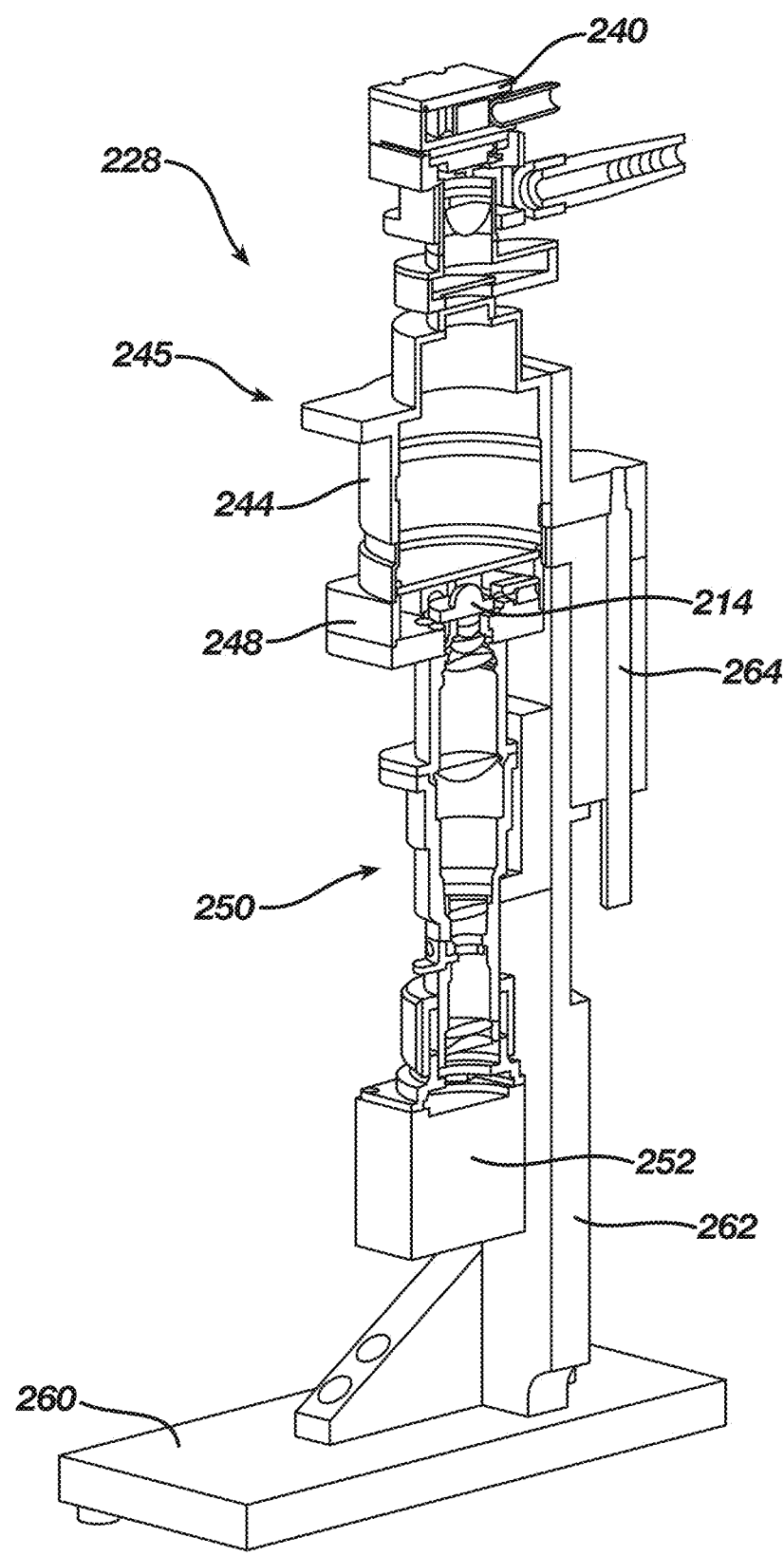
FIGS. 7 and 8A-8B show an absorptive imaging system for measuring the thickness of ophthalmic lenses, in accordance with another embodiment of the present invention.

Referring to FIG. 7, in one embodiment, an absorptive imaging system 228 includes a unit 245 at the upper end that may be lifted up and rotated out of the way for exposing the kinematic mount and the forming optic to allow for easy replacement of the forming optic 214. In the embodiment shown in FIG. 7, the illumination source 240 and the diffuse illumination compartment 244 comprise a moveable unit 245 at the upper end of the absorptive imaging system 228 that may be lifted up and rotated or pivoted away from the kinematic mount 248 that contains the forming optic 214.

In one embodiment, the absorptive imaging system 228 includes a base plate 260 and a vertical support 262 extending upwardly from the base plate 260. The absorptive imaging system 228 desirably includes a lifting and pivoting element 264 that interconnects the vertical support 262 and the moveable unit 245.

Figure 8A:
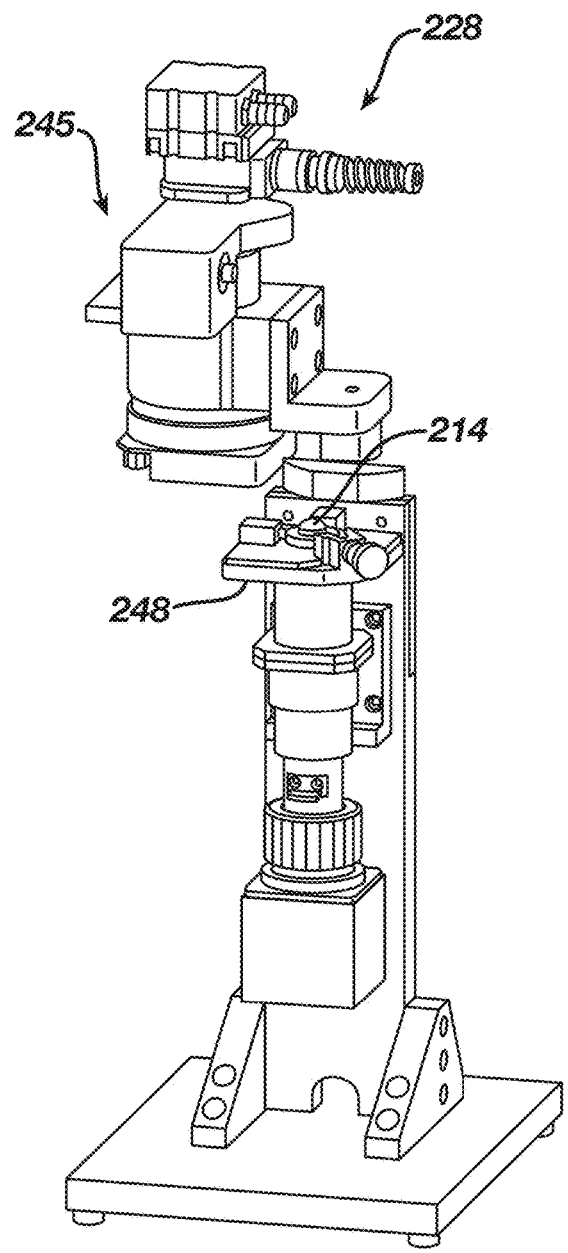

FIG. 8A shows a first configuration in which the moveable unit 245 of the absorptive imaging system 228 is lifted up and rotated out of the way of the kinematic mount 248. In this configuration, the forming optic 214 on the kinematic mount 248 may be accessed, removed from, and/or replaced on the kinematic mount.

Figure 8B:
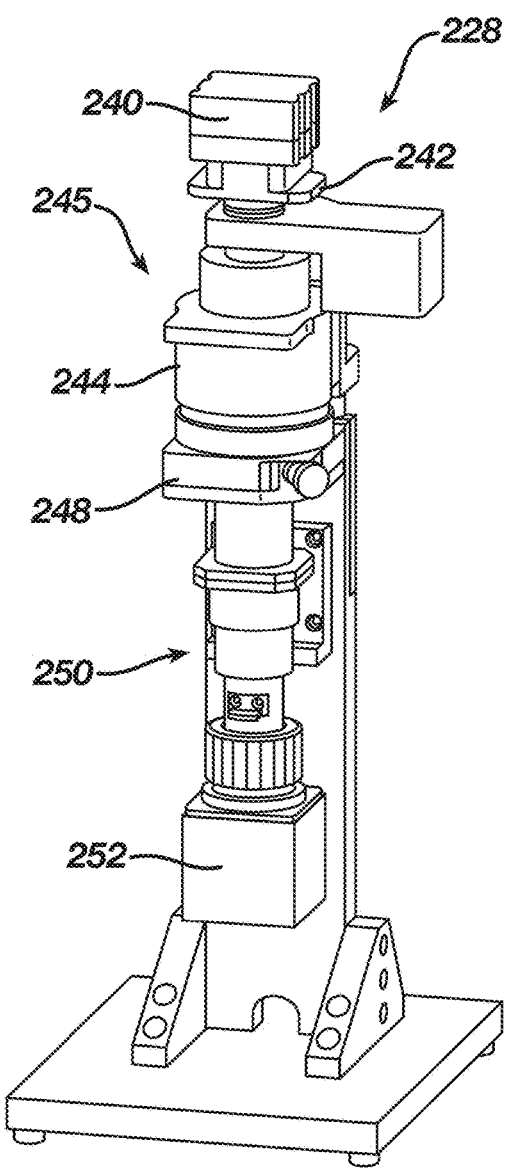

FIG. 8B shows the moveable unit 245 of the absorptive imaging system 228 after it has been rotated back over the top of the kinematic mount 248. As a result, the illumination source 240, the mechanical shutter 242 and the diffuse illumination compartment 244 of the moveable unit 245 are in axial alignment with the forming optic 214 provided on the kinematic mount 246 and/or the optical axis of the system. Moreover, the moveable unit 245 of the absorptive imaging system 228 is desirably in alignment with the imaging lens set 250 and the camera 252.

Figure 9:
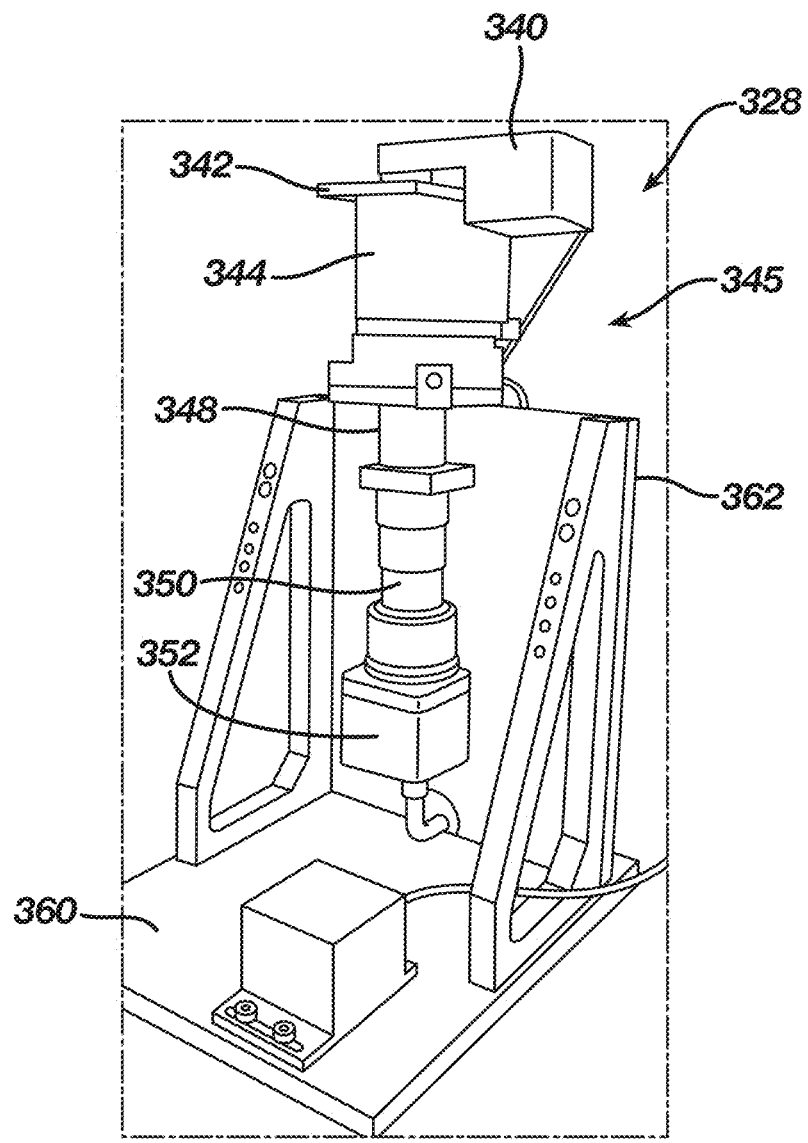
FIGS. 9 and 10A-10B show an absorptive imaging system for measuring the thickness of ophthalmic lenses, in accordance with yet another embodiment of the present invention.

Referring to FIG. 9, in one embodiment, an absorptive imaging system 328 includes an illumination source 340, an optical filter compartment 342, and a diffuse illumination compartment 344 that define a moveable unit 345 of the absorptive imaging system. The absorptive imaging system 328 also includes a kinematic mount 348 adapted to receive a forming optic, an imaging lens set 350, and a camera 352. The absorptive imaging system 328 includes a base 360 and a vertical support 362.

Figure 10A:
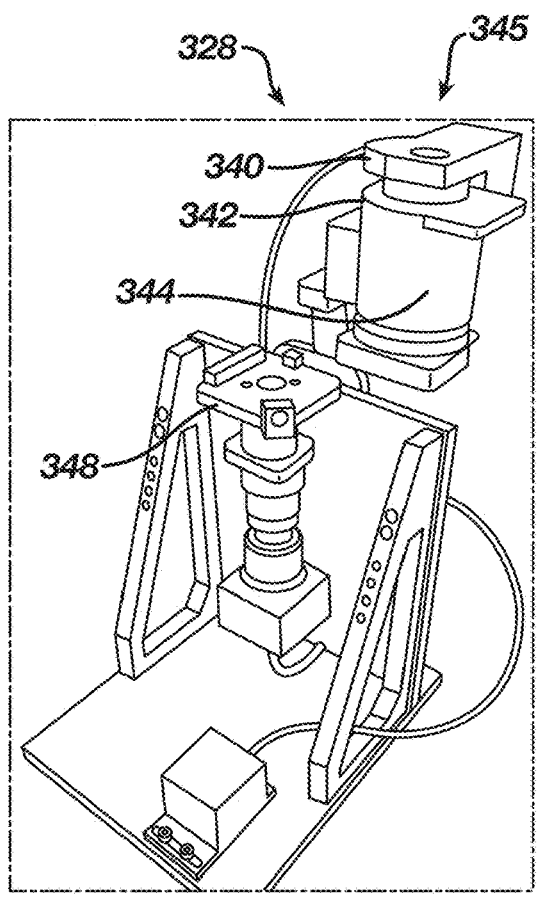
Figure 10B:
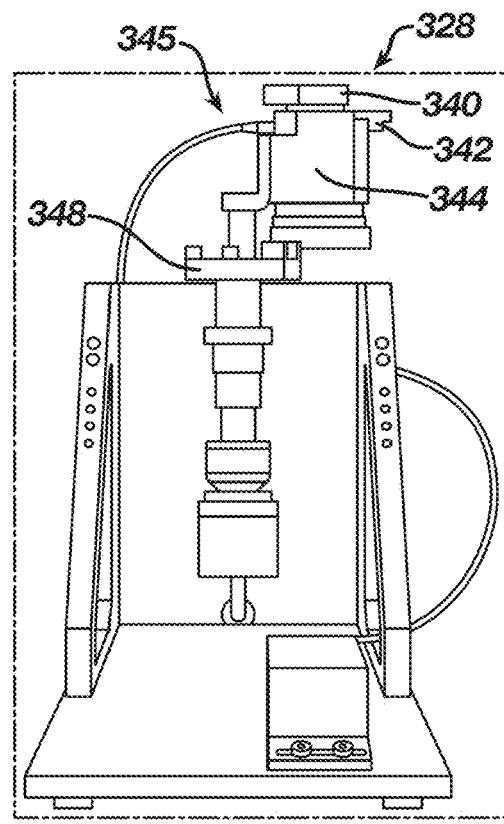

Referring to FIGS. 9 and 10A-10B, in one embodiment, the moveable unit 345 of the absorptive imaging system 328 is adapted to be lifted up and rotated or pivoted out of the way of the kinematic mount 348 so that a forming optic may be placed onto or removed from the kinematic mount. FIGS. 10A and 10B show the moveable unit 345 including the illumination source 340, the mechanical shutter 342, and the diffuse illumination compartment 344 rotated away from the kinematic mount 348. After a forming optic has been placed atop the kinematic mount 348, the moveable unit 345 may be rotated back into the aligned position shown in FIG. 9.

Figure 11:
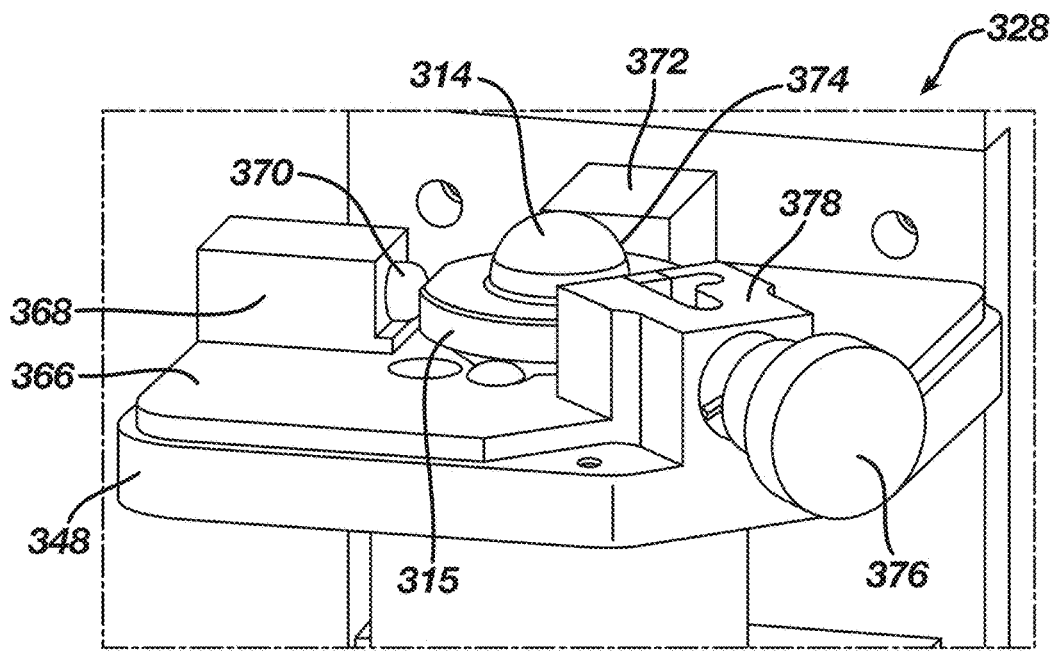
FIGS. 11 and 12 show a kinematic mount for an absorptive imaging system that is adapted to receive a forming optic, in accordance with one embodiment of the present invention.

Referring to FIG. 11, in one embodiment, a kinematic mount 348 for an absorptive imaging system 328 desirably includes a flat surface 366 adapted to receive a base 315 of a forming optic 314. In one embodiment, the kinematic mount 348 includes a first fixed stop 368 having a first knob 370 and a second fixed stop 372 having a second knob 374. The knobs may be adjustable to move toward and away from the base 315 of the forming optic 314. The kinematic mount 348 desirably includes a retractable plunger 376 that is associated with a plunger support 378 affixed over the flat surface 366. In one embodiment, the retractable plunger 376 is retracted so that the base 315 of the forming optic 314 may be positioned between the first knob 370 of the first fixed stop 368, the second knob 374 of the second fixed stop 372, and the distal end of the plunger 376. The distal end of the plunger 376 may be advanced toward the forming optic base 315 to hold the forming optic 314 in a stationary position over the flat surface 366 of the kinematic mount 348. In one embodiment, the plunger 376 is spring loaded and is normally biased into an extended position. In one embodiment, the plunger 376 is threaded and engages threads on the plunger support base 378 for moving the distal end of the plunger in and out relative to the base 315 of the forming optic 314.

Figure 12:
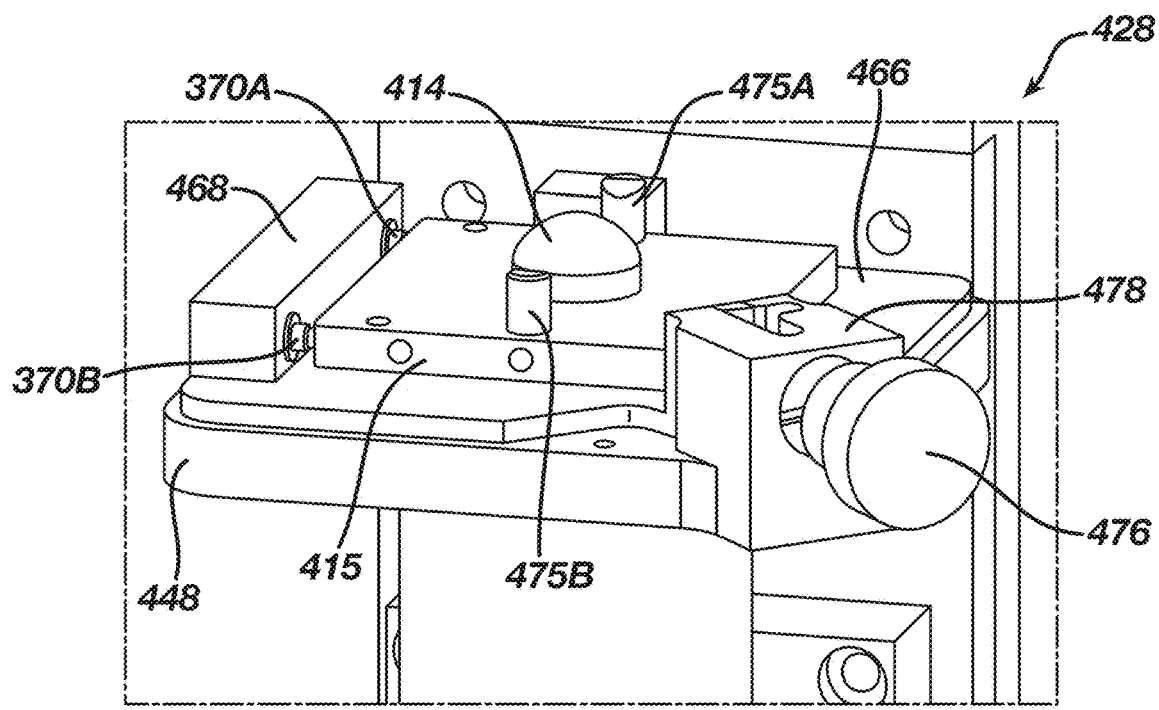

Referring to FIG. 12, in one embodiment, a kinematic mount 448 of an absorptive imaging system 428 includes a flat surface 466 adapted to receive the base 415 of a forming optic 414. The kinematic mount is adapted to hold the forming optic in a stable position and allow fine x-y axis adjustment of the position of the forming optic. In one embodiment, the base 415 of the forming optic 414 is a square base.

In one embodiment, the kinematic mount 448 includes a first fixed stop 468 having stop pins 370A, 370B that are adapted to abut against one of the sides of the base 415 of the forming optic 414. The kinematic mount 448 also includes a second stop 472 adapted to abut against another side of the base 415.

In one embodiment, the kinematic mount 448 includes a pair of vertically extending alignment pins 475A, 475B that pass through openings in the base 415 for aligning the base 415 of the forming optic 414 over the flat surface 466 of the kinematic mount 448.

In one embodiment, the kinematic mount 448 includes a plunger 476 mounted on a plunger support base 478. The plunger 476 may be retracted so that the forming optic 414 may be positioned atop the flat surface 466. The distal end of the plunger 476 may then be extended to lock the position of the forming optic base 415 over the flat surface 466 of the kinematic mount 448. The plunger 476 may be spring-loaded on use threads for moving in and out relative to the plunger base 478.

Figure 13:
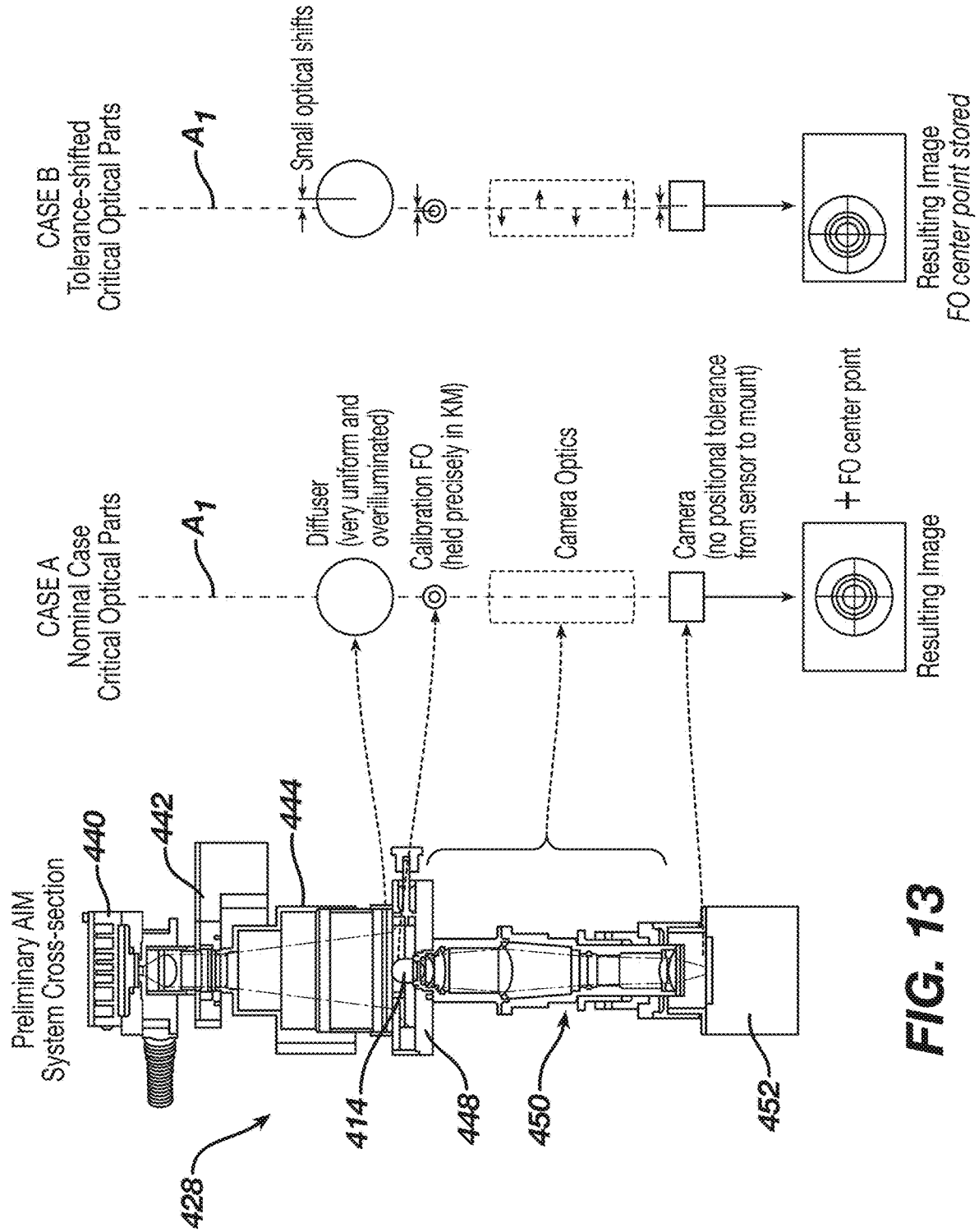
FIG. 13 shows an absorptive imaging system including a first case in which the critical optical components are in physical alignment with an optical axis and a second case in which the critical optical components are not in physical alignment with an optical axis, in accordance with one embodiment of the present invention.

Referring to FIG. 13, in one embodiment, an absorptive imaging system 428 preferably includes an illumination source 440 that generates ultraviolet light at 365 nm. The light rays are passed through a mechanical shutter compartment 442 and a diffuser 444 that generates very uniform and highly illuminated light (e.g., Lambertian) that is directed at an ophthalmic lens that sits atop a forming optic 414, which, in turn, is secured on the kinematic mount 448. The absorptive imaging system 428 includes a set of imaging lenses 450 that serves as the optics for a camera 452, which is designed to capture digital images of the ophthalmic lens positioned on the forming optic 414. In one embodiment, any small shifts in the critical components of the absorptive imaging system 428 may be compensated for digitally rather than mechanically. In case A, all of the critical components including the diffuser 444, the forming optic 414, and the camera optics 450 are aligned along an optical axis $A_1$ so that the resulting image is aligned with the FO center point. In case B, some of the components of the absorptive imaging system 428 are not aligned with the optical axis $A_1$. In this latter case, the position of the true forming optic center on the camera sensor is stored, and thereafter the kinematic mount insures highly repeatable position from forming optic to forming optic to the center point. No mechanical adjustment is necessary.

Figure 14:
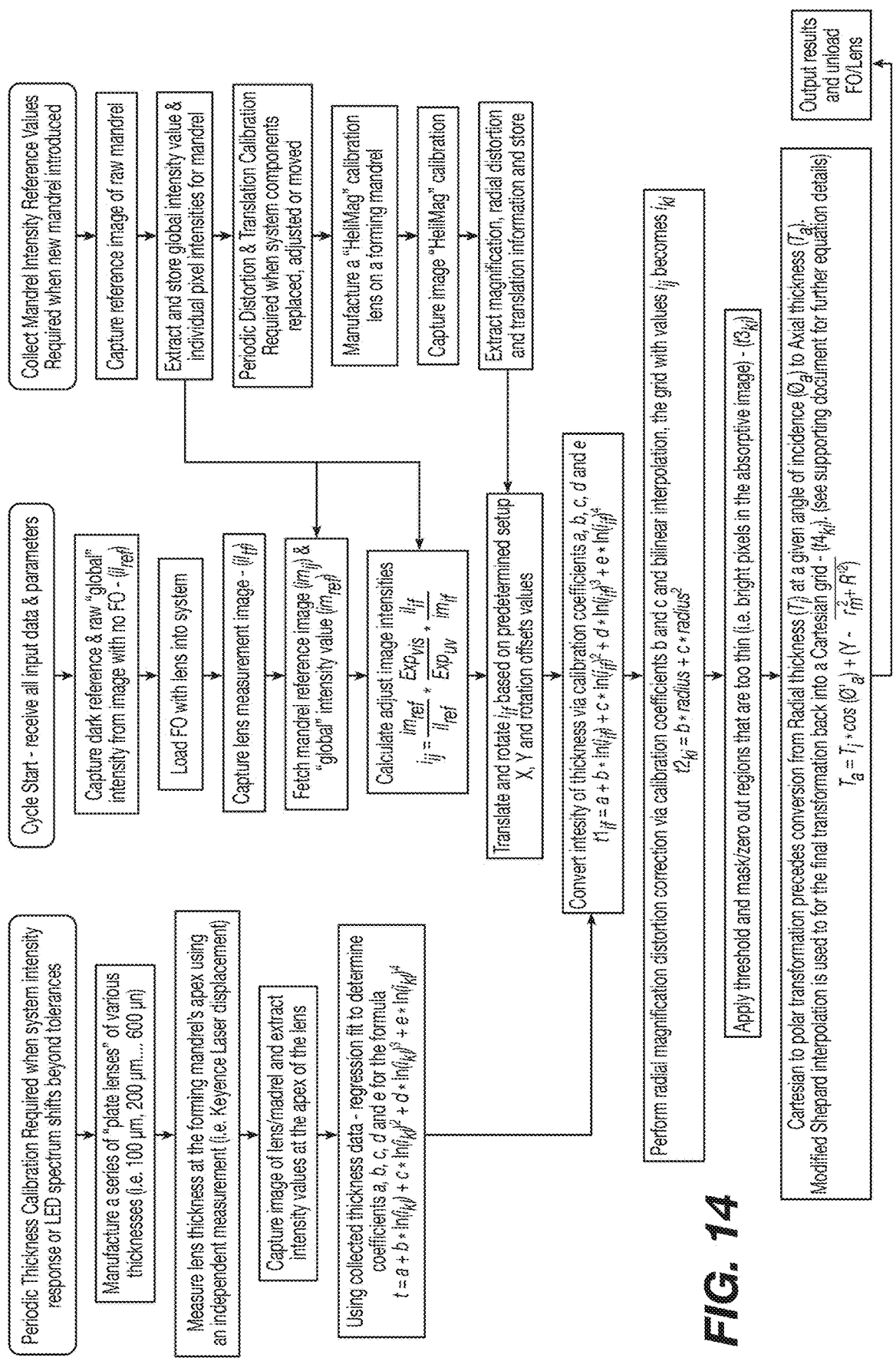
FIG. 14 is a flowchart showing the process steps used for extracting thickness information for an ophthalmic lens from an intensity-based image formed using a single illumination source having a single spectral band.

FIG. 14 shows a flowchart of the process utilized for extracting thickness information from an intensity-based image. The FIG. 14 flowchart shows the process for the absorptive imaging system disclosed herein that uses ultraviolet light at a single spectral band. For the variables shown in the flow chart in FIG. 14, the following definitions apply:

$il_{ref}$—Raw scene, global intensity with no FO in place. This value is associated with the lens measurement that is about to take place. The value is obtained by looking at a raw camera image and averaging a circle of intensity values. It provides good feedback about how the camera is viewing the light at that particular instance in time.

$il_{ij}$—The intensity values contained in the camera image of the lens on the mandrel. The amount of values is dependent on the resolution of the camera. Currently the size of the image is 1024×1030. The image is taken at the lens exposure time setting.

$im_{ij}$—The intensity values contained in the camera image of the mandrel. This image is obtained from storage as it was taken and stored previously.

$im_{ref}$—Raw scene, global intensity with no FO in place. This value is associated with the mandrel reference file at the time it was obtained and stored. The value is obtained by looking at a raw camera image and averaging a circle of intensity values. It provides good feedback about how the camera is viewing the light at that particular instance in time.

$i_{ij}$—The result of intensity ratio adjustment that accounts for global intensity variations and intensity attributed to the mandrel. This represents normalized intensity values across the image. Resolution is still 1024×1030.

$t1_{ij}$—Grid resulting from the initial transformation from image intensity values to thickness values. The image thickness values are along the incident angle at which the light passed through the lens and accepted by the imaging optics. This is the state after application of the X, Y and rotation offset, but before radial magnification is applied. This angle is not in the axial direction and therefore a final compensation must be made to obtain the finalized output.

$t2_{kl}$—Grid resulting from the application of radial magnification distortion correction. As part of this process the grid is converted to the 1001×1001 format which is native to measurement and DMD show files—hence the change to subscript notation (k, l).

$t3_{kl}$—Resulting grid after application of a masking pass that zeros out thickness values that are considered too thin.

$t4_{kl}$—Final lens measurement grid in Axial thickness. See supporting document for equation variable descriptions.

Referring to FIG. 15, in one embodiment, an optical lens 420 is positioned atop a forming optic 414. The absorptive imaging system disclosed herein is utilized for determining the axial thickness of the lens 420. In one embodiment, the light entry angle as the light passes through the lens 420 is converted to axial thickness. FIG. 15 includes the mathematical formulas utilized for converting the light entry angle thickness to axial thickness.

In one embodiment, an absorptive imaging system includes a dual illumination arrangement to account for optical power characteristics of a lens that can be created from surface topology changes and which, in turn, can induce image intensity changes that are not due to the absorptive properties of the lens. In one embodiment, the absorptive imaging system captures two separate images of the lens that is being evaluated, a first image in the absorptive region and a second image in the neutral absorptive region. The neutral absorptive image will not have any intensity variations due to the absorptive properties of the lens material, but will exhibit intensity changes due to optical power effects. These latter intensity changes, therefore, can be used to characterize the intensity component due to optical power as well as non-uniform imaging effects. In one embodiment, the two spectral bands are generated using LED sources. In one embodiment, the absorptive band has a peak wavelength of about 365 nm, and the neutral absorptive band has a peak wavelength of about 455 nm.

Figure 16A:
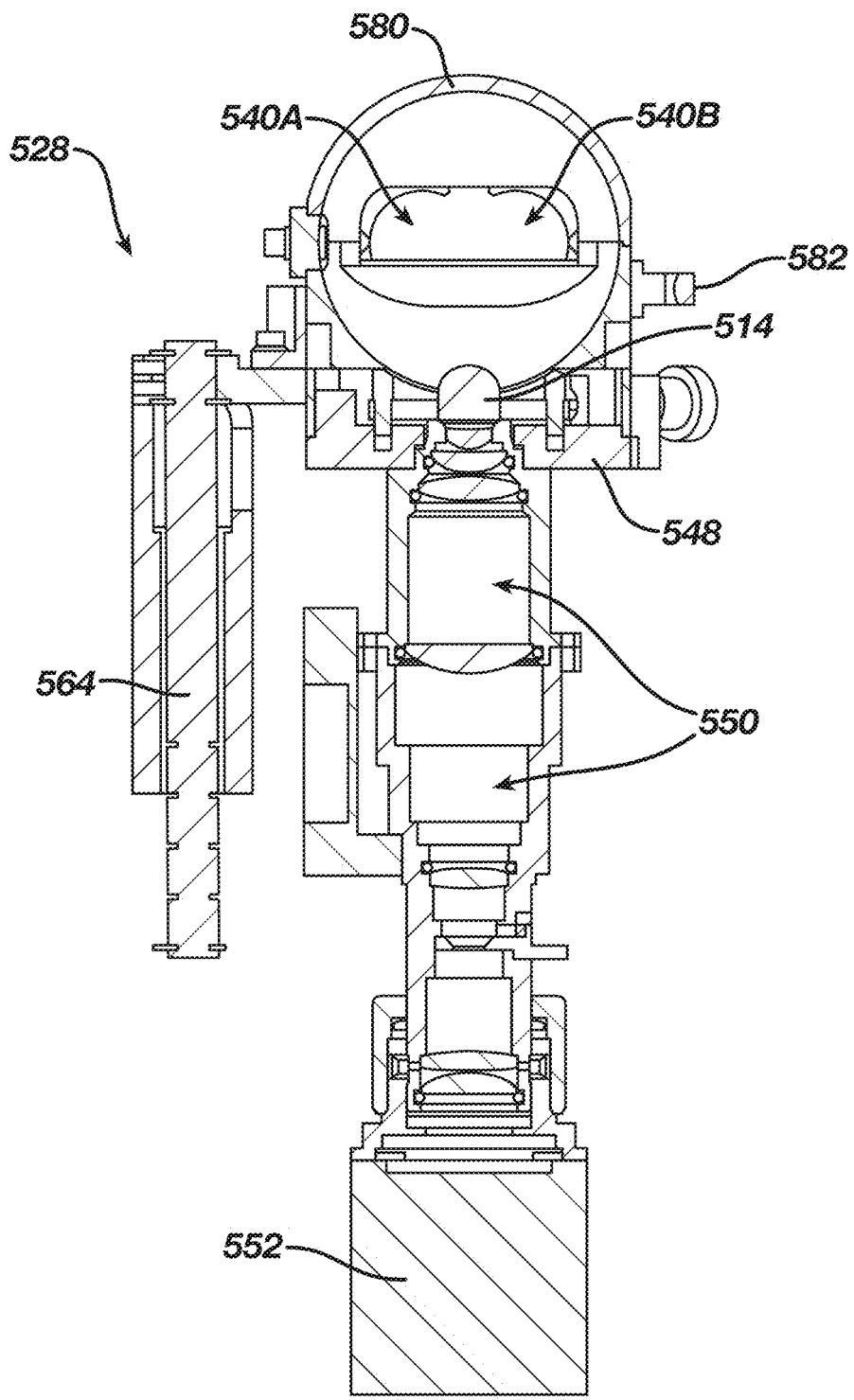
FIGS. 16A-16C show an absorptive imaging system having two illumination sources including a first light source that generates light having a first wavelength that covers the absorptive band of an ophthalmic lens and a second light source that generates light having a second wavelength that is absorption neutral in the lens' spectrum, in accordance with one embodiment of the present invention.
Figure 16B:
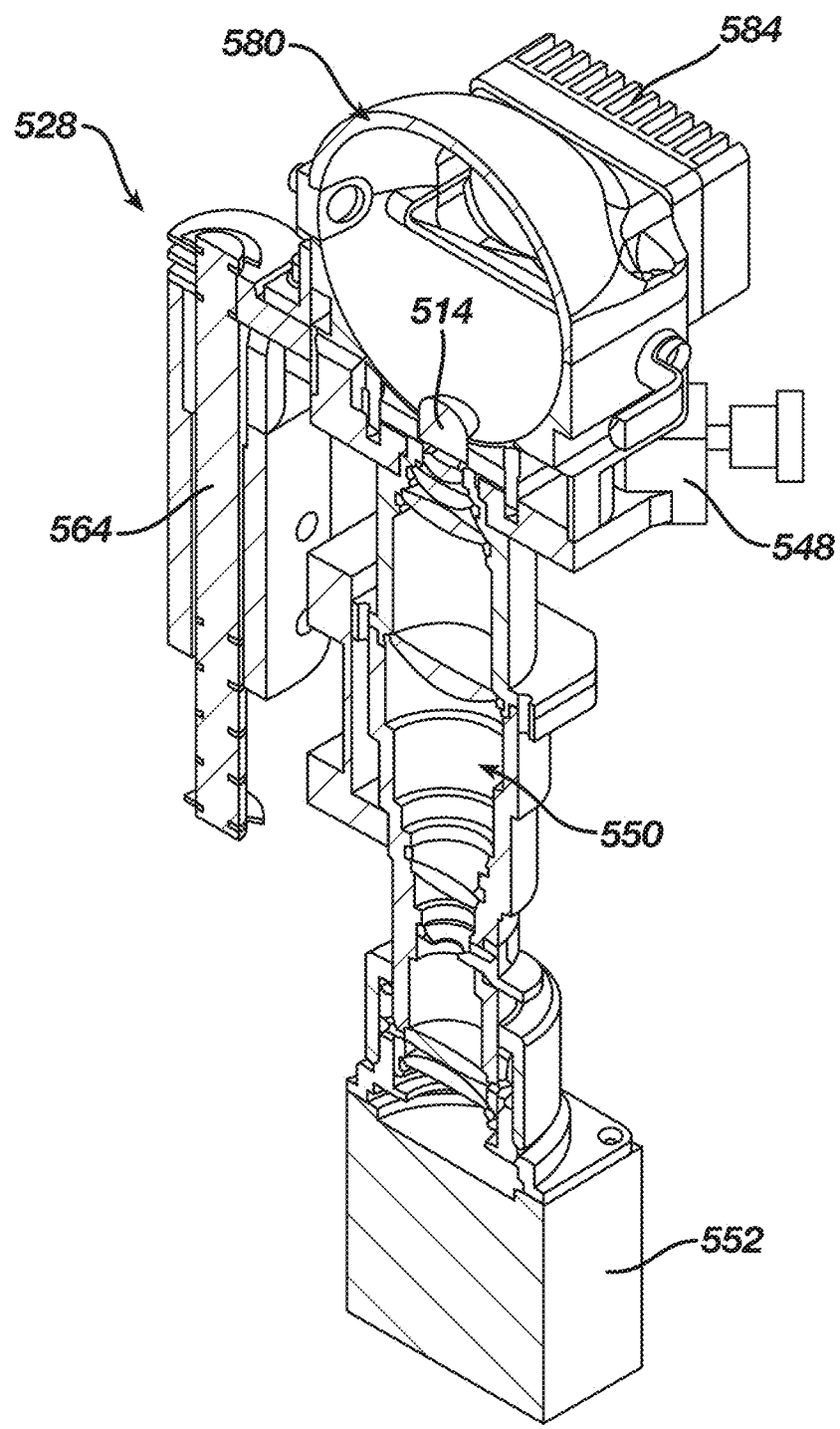
Figure 16C:
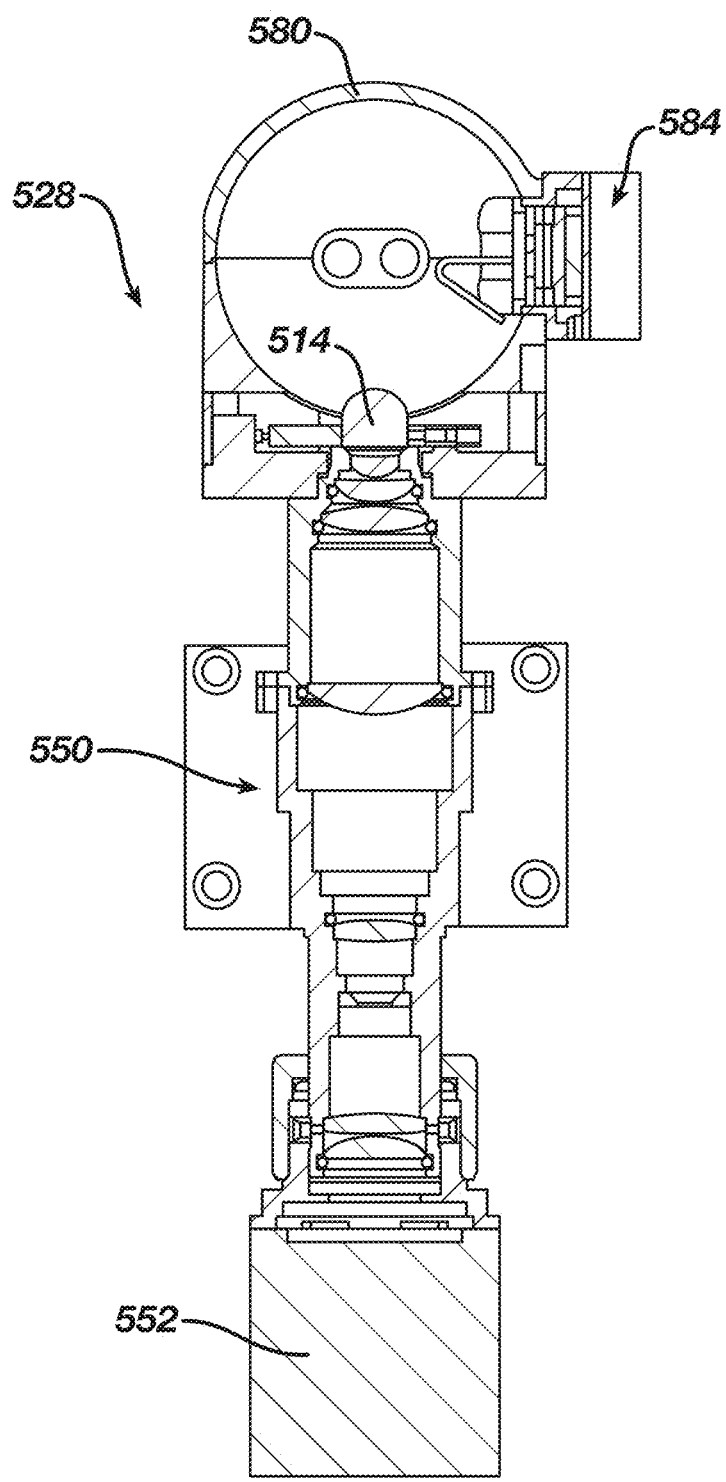

Referring to FIGS. 16A-16C, in one embodiment, an absorptive imaging system 528 utilizes light at two different wavelengths, one being in the absorptive band and one being within a band that is absorption neutral. In one embodiment, the absorptive imaging system 528 includes a kinematic mount 548 that is adapted to receive and hold a forming optic 514, which, in turn, has an ophthalmic lens sitting atop the forming optic. The system includes a set of imaging lenses 550 and a camera 552 that captures images of the ophthalmic lens disposed atop the convexly curved surface of the forming optic.

In one embodiment, the absorptive imaging system 528 includes a lifting and pivoting assembly 564 that enables an integrating sphere 580 containing a first illumination source 540A and second illumination source 540B to be lifted and pivoted up and away from the forming optic 514 and the kinematic mount 548.

In one embodiment, the first illumination source 540 within the integrating sphere 580 generates UV radiation that covers the absorptive band of the lens material. The wavelength generated by the first illumination source is preferably 365 nm, which is similar to the LED light generated in the first embodiment. The second illumination source 540B generates LED light that covers a band that is "absorption neutral" within the spectrum of the lens. In one embodiment, the second illumination source 540B generates visible radiation having a wavelength of about 455 nm.

The absorptive imaging system 528 includes a handle 582 secured to the integrating sphere 580 that enables the integrating sphere 580 to be lifted up and pivoted away from the forming optic 514 and the kinematic mount 548.

Referring to FIGS. 16B and 16C, in one embodiment, the absorptive imaging system 528 includes a thermo electric controlled (TEC) plate and heat sink 548 for maintaining temperature control of the LEDs for insuring the stability of the light generated by the first and second illumination sources 540A, 540B.

Figure 17:
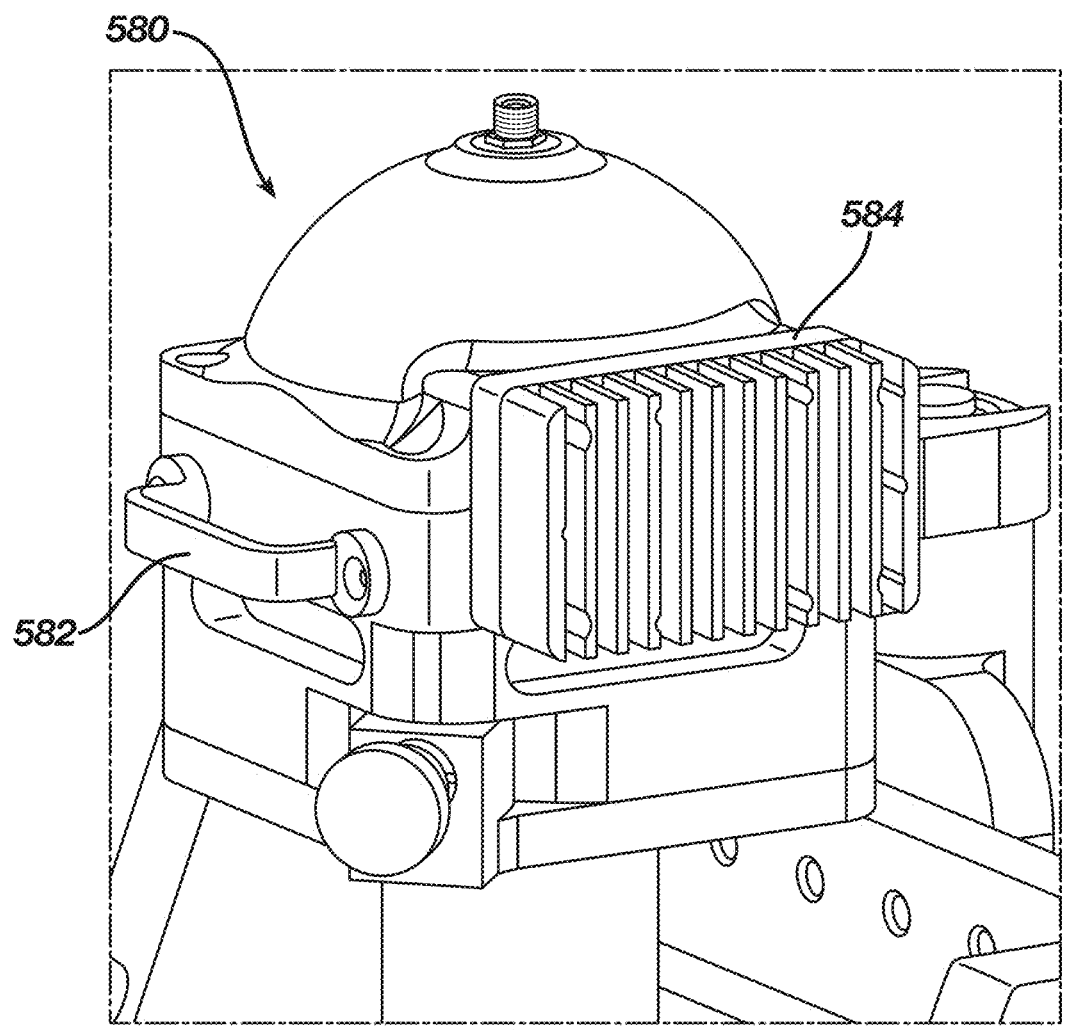
FIG. 17 shows an integrating sphere and a cooling plate at an upper end of the absorptive imaging system shown in FIGS. 16A-16C.

FIG. 17 shows a perspective view of the integrating sphere 580 including the handle 582 and the TEC plate 584 that includes heat dissipating fins.

Figure 18A:
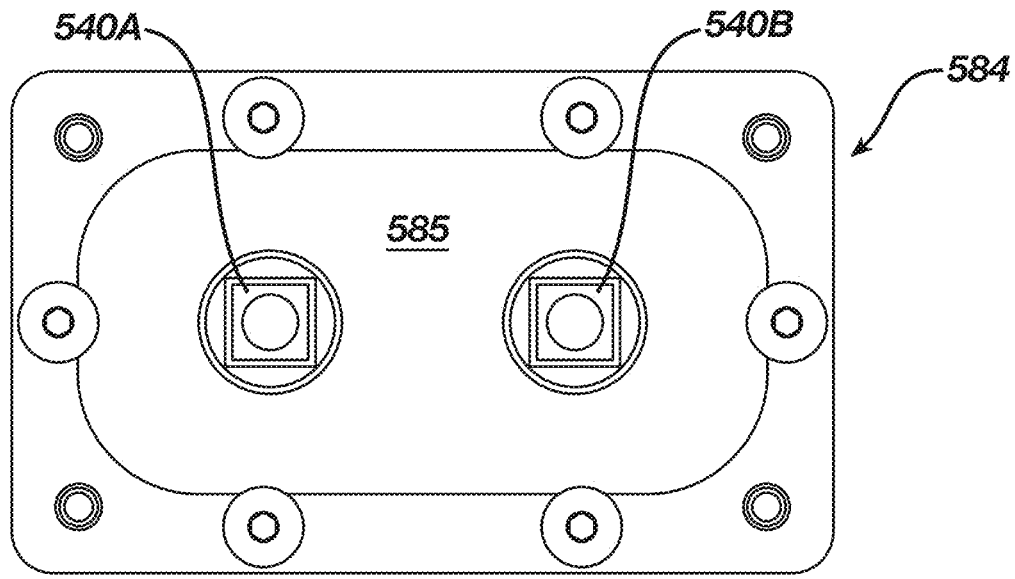
FIGS. 18A and 18B show the cooling plate for the absorptive imaging system shown in FIG. 17.
Figure 18B:
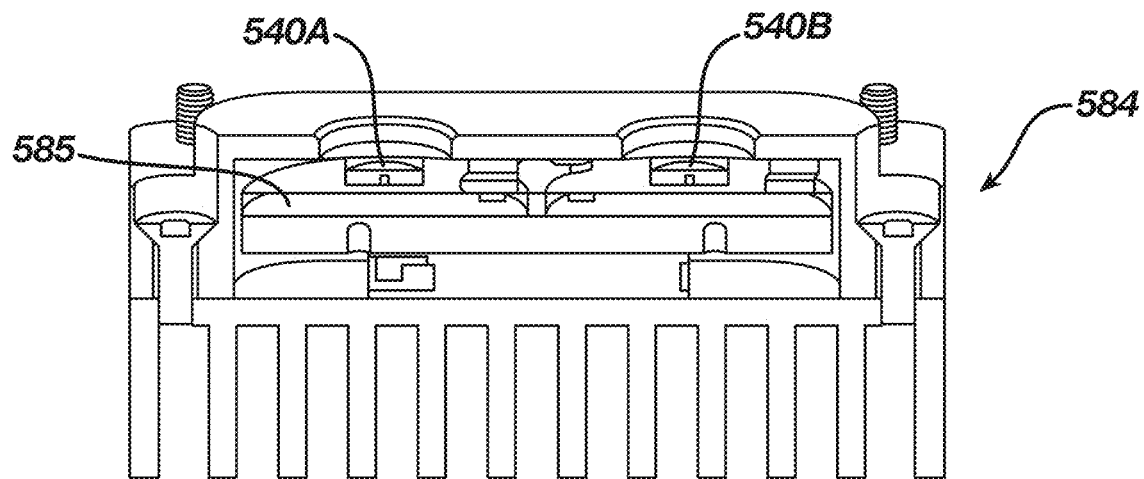

FIGS. 18A and 18B show the TEC plate 584 including the first illumination source 540A that generates light at 365 nm and the second illumination source 540B that generates light at 420 nm. The TEC plate 584 provides an air-cooled design with a common cold plate for both LEDs 540A, 540B. The temperature of the common cold plate 585 is regulated via the integrated TEC plate 584 and an external controller.

Figure 19:
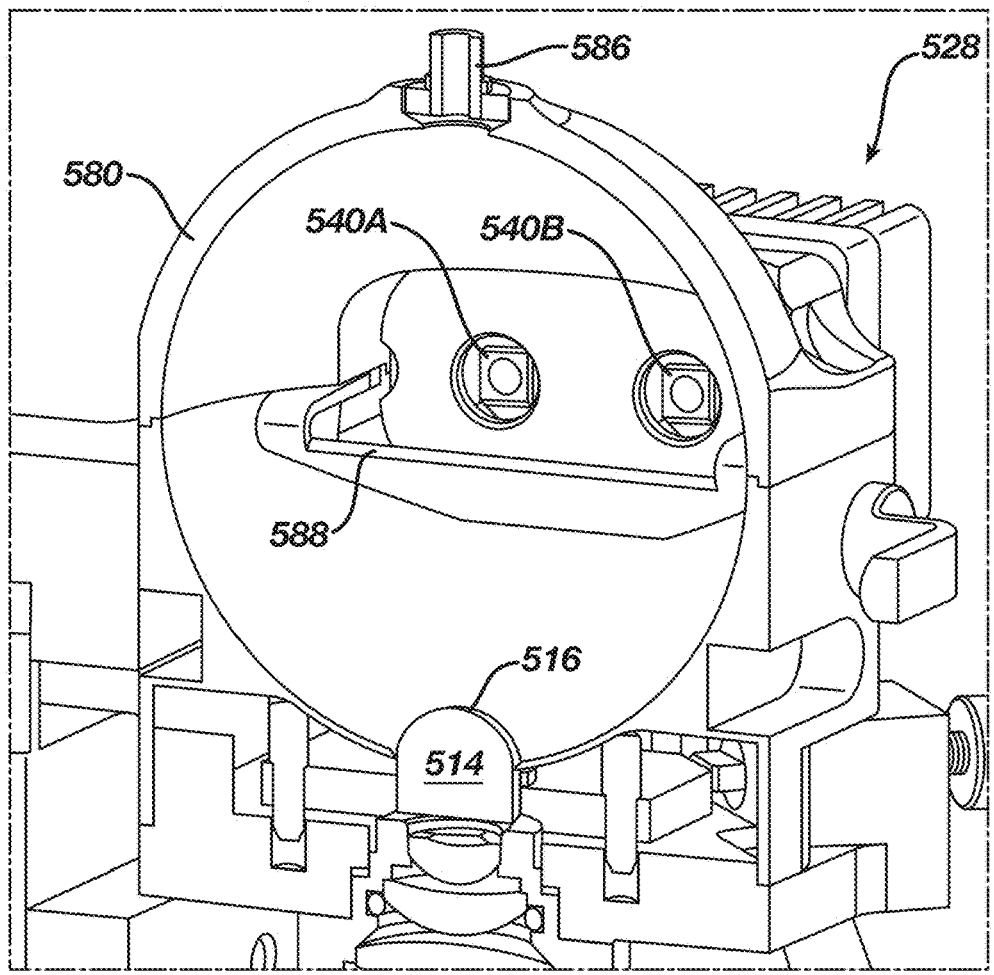
FIG. 19 shows a cross-sectional view of an integrating sphere of an absorptive imaging system, in accordance with one embodiment of the present invention.

Referring to FIG. 19, in one embodiment, the integrated sphere 580 includes a spectrometer port 586 to provide access for obtaining spectrometer readings of the light generated by the first LED 540A and the second LED 540B.

In one embodiment, the integrating sphere 580 includes a baffle 588 that prevents direct illumination of the forming optic 514. In one embodiment, the first and second LEDs 540A, 540B are shrouded to provide for consistent internal reflection of the light generated by the two illuminating sources.

In one embodiment, the lower portion of the integrating sphere 580 extends below the outer peripheral edges of the convexly curved surface 516 of the forming optic 514.

The internal surface of the integrating sphere is designed to reflect the light generated by the two LEDs. In one embodiment, the internal surface of the integrating sphere 580 is bead-blasted. In one embodiment, the internal surface of the integrating sphere may be painted.

Referring to FIG. 19, in one embodiment, using a baffle 588 improves the irradiance of the intensity-based image.

Figure 20:
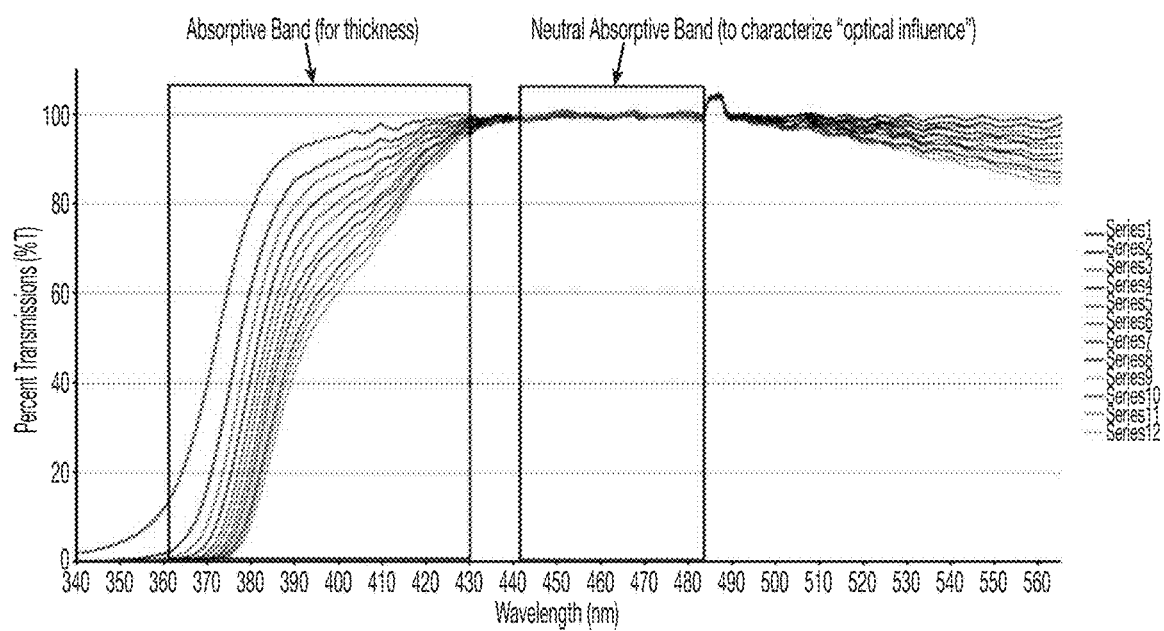
FIG. 20 shows a graph that plots the absorptive and non-absorptive bands used for isolating image intensity from optical effects and absorptive effects, in accordance with one embodiment of the present invention.
Figure 21A:
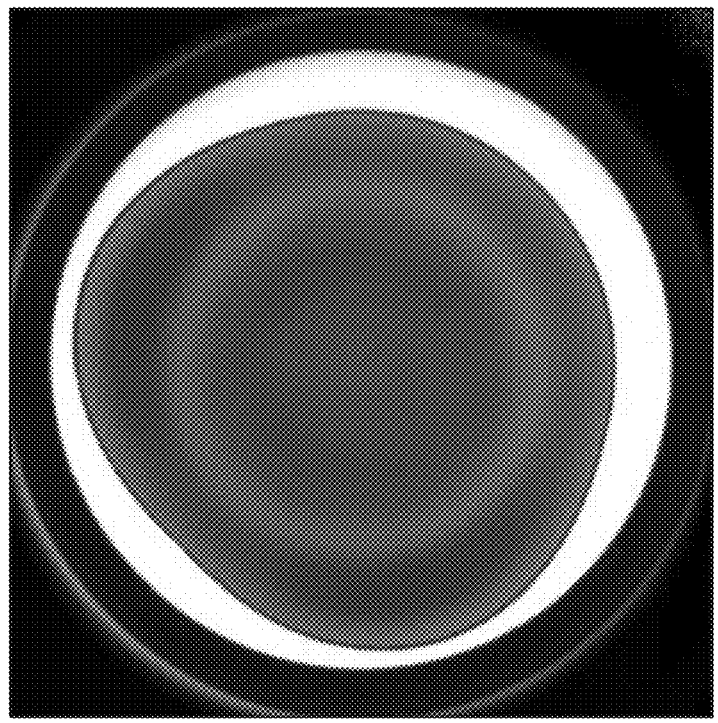
FIG. 21A shows an image of an ophthalmic lens using light having an absorptive band.
Figure 21B:
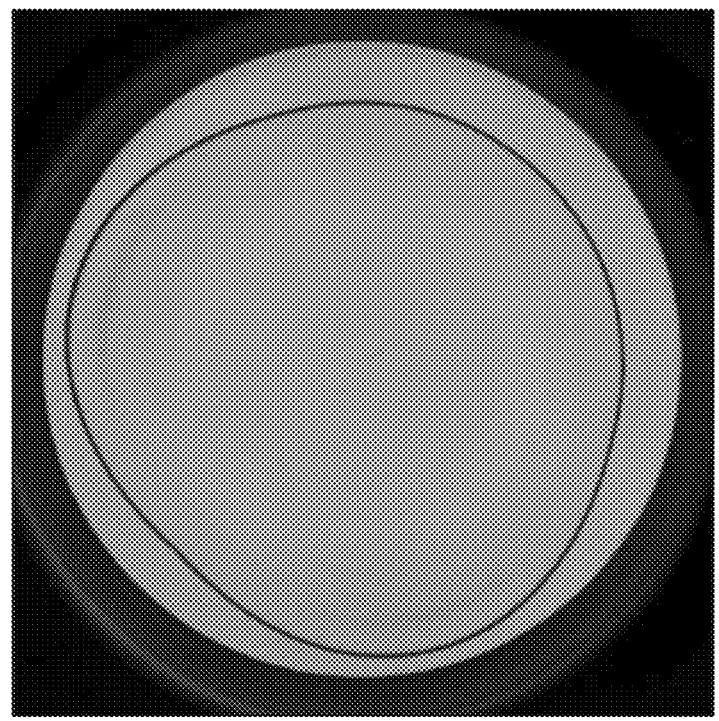
FIG. 21B shows an image of an ophthalmic lens using light having a non-absorptive band.

As noted above, in one embodiment, an absorptive imaging system includes a dual illumination arrangement that accounts for optical power characteristics of a lens that may result from surface topology changes and which, in turn, can induce image intensity changes that are not associated with the absorptive properties of the lens due to lens thickness alone. FIG. 20 shows spectral bands for the reactive monomer mix used to form a lens. As shown in FIGS. 21A and 21B, two separate images are captured of the lens being measured, one in the absorptive region, and the other in a neutral absorptive region. The neutral absorptive image will not have any intensity variations due to the absorptive properties of the lens material, but will exhibit intensity changes due to optical power effects. Thus, those intensity changes can be used to characterize the intensity component due to optical power as well as non-uniform imaging effects. The actual bands selected are from LED sources, with the absorptive band having a peak wavelength of about 365 nm and the neutral absorptive band having a peak wavelength of about 455 nm.

FIG. 21A shows an image of a lens taken using the absorptive band having a peak wavelength of about 365 nm. FIG. 21B shows an image of a formed lens taken using the non-absorptive band having a peak wavelength of about 455 nm. In one embodiment, the optical effects shown in FIG. 21B may be removed to calculate the lens thickness.

Figure 22:
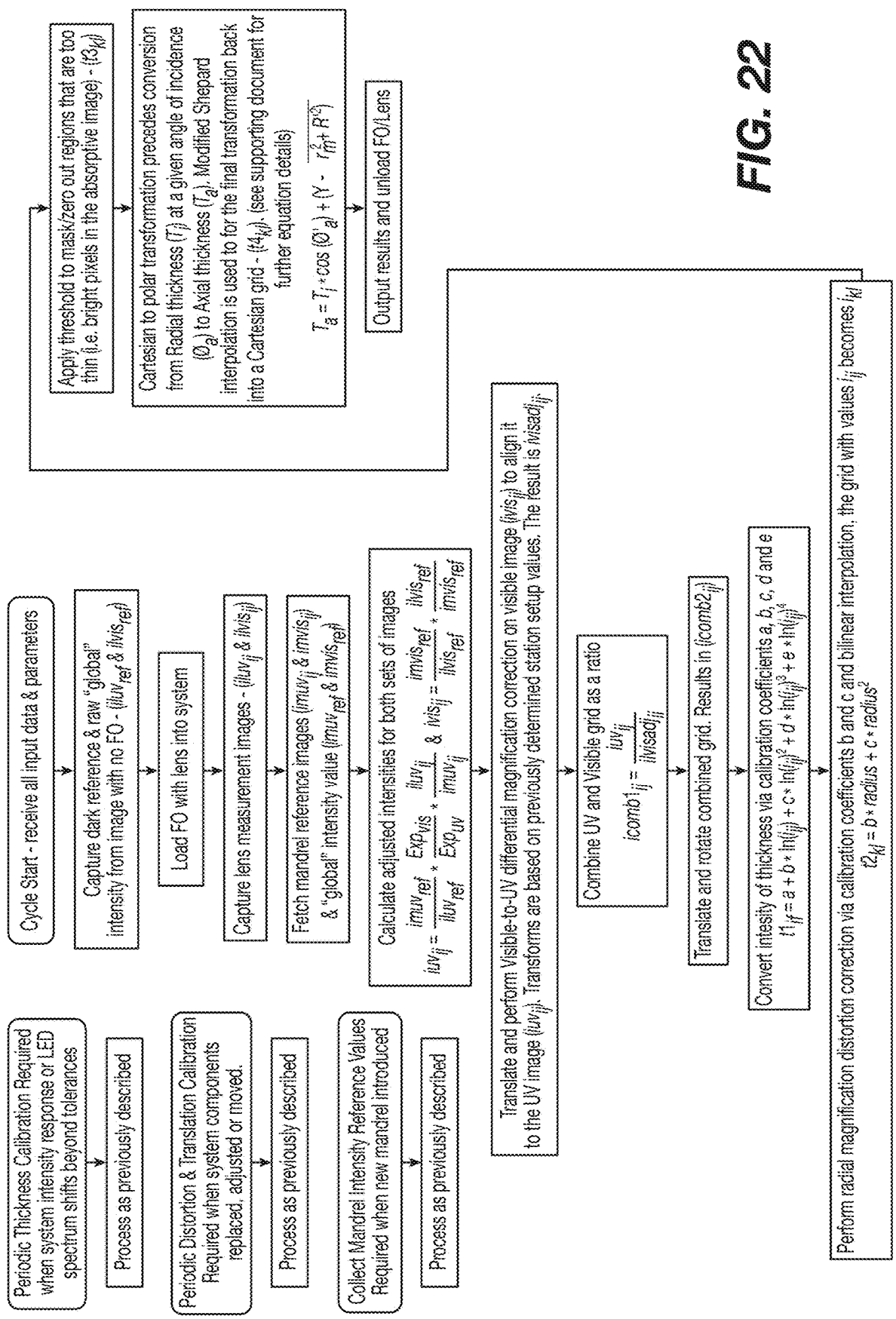
FIG. 22 is a flowchart showing the process steps used for extracting thickness information from an intensity-based image using dual absorptive-neutral absorptive spectral bands, in accordance with one embodiment of the present invention.

FIG. 22 shows a flowchart of the process involved with extracting thickness information using two spectral bands having different wavelengths. For the variables shown in FIG. 22, the definitions for the variables shown in FIG. 14 apply, as well as the following new variable definitions:

$iluv_{ref}$—UV raw scene, global intensity with no FO in place. This value is associated with the lens measurement that is about to take place. The value is obtained by looking at a raw camera image and averaging a circle of intensity values. It provides good feedback about how the camera is viewing the light at that particular instance in time.

$ilvis_{ref}$—Visible raw scene, global intensity with no FO in place. This value is associated with the lens measurement that is about to take place. The value is obtained by looking at a raw camera image and averaging a circle of intensity values. It provides good feedback about how the camera is viewing the light at that particular instance in time.

$iluv_{ij}$—The UV intensity values contained in the camera image of the lens on the mandrel. The amount of values is dependent on the resolution of the camera. Currently the size of the image is 1024×1030. The image is taken at the lens exposure time setting.

$ilvis_{ij}$—The Visible intensity values contained in the camera image of the lens on the mandrel. The amount of values is dependent on the resolution of the camera. Currently the size of the image is 1024×1030. The image is taken at the lens exposure time setting.

$imuv_{ij}$—The UV intensity values contained in the camera image of the mandrel. This image is obtained from storage as it was taken and stored previously.

$imvis_{ij}$—The UV intensity values contained in the camera image of the mandrel. This image is obtained from storage as it was taken and stored previously.

$imuv_{ref}$—UV raw scene, global intensity with no FO in place. This value is associated with the mandrel reference file at the time it was obtained and stored. The value is obtained by looking at a raw camera image and averaging a circle of intensity values. It provides good feedback about how the camera is viewing the light at that particular instance in time.

$imvis_{ref}$—Visible raw scene, global intensity with no FO in place. This value is associated with the mandrel reference file at the time it was obtained and stored. The value is obtained by looking at a raw camera image and averaging a circle of intensity values. It provides good feedback about how the camera is viewing the light at that particular instance in time.

$iuv_{ij}$—The result of UV intensity ratio adjustment that accounts for global intensity variations and intensity attributed to the mandrel. This represents normalized intensity values across the image. Resolution is still 1024×1030.

$ivis_{ij}$—The result of Visible intensity ratio adjustment that accounts for global intensity variations and intensity attributed to the mandrel. This represents normalized intensity values across the image. Resolution is still 1024×1030.

$icomb1_{ij}$—A grid resulting from the ratio of the UV over the Visible grids ($iuv_{ij}/ivis_{ij}$). This operation is removes "optically" generated detail that influences grip cell intensities and might otherwise confound thickness-only intensity values.

$icomb2_{ij}$—The "combined" ($icomb1_{ij}$) grid after applying a translation and rotation operation that matches it to the DMD lens forming station's coordinate system.

$t1_{ij}$—Grid resulting from the initial transformation from image intensity values to thickness values. The image thickness values are along the incident angle at which the light passed through the lens and accepted by the imaging optics. This is the state after application of the X, Y and rotation offset, but before radial magnification is applied. This angle is not in the axial direction and therefore a final compensation must be made to obtain the finalized output.

$t2_{kl}$—Grid resulting from the application of radial magnification distortion correction. As part of this process the grid is converted to the 1001×1001 format which is native to measurement and DMD show files—hence the change to subscript notation (k, l).

$t3_{kl}$—Resulting grid after application of a masking pass that zeros out thickness values that are considered too thin.

$t4_{kl}$—Final lens measurement grid in "axial" thickness. See supporting document for equation variable descriptions.

Image pixel intensity values of the lens/mandrel obtained in the absorptive region of the spectrum (i.e. 365 nm).

$ib2_{ij}$—Image pixel intensity values of the lens/mandrel obtained in the flat absorptive region of the spectrum (i.e. 455 nm).

$ib1n_{ij}$—Image pixel intensity values of the lens/mandrel obtained in the Norbloc absorptive region of the spectrum (i.e. 365 nm) after an intensity adjustment to account for mandrel to mandrel intensity difference and any changes in overall system intensity response over time.

$ib2n_{ij}$—Image pixel intensity values of the lens/mandrel obtained in the neutral absorptive region of the spectrum (i.e. 455 nm) after an intensity adjustment to account for mandrel to mandrel intensity difference and any changes in overall system intensity response over time.

$G_f$—A global intensity measure of the absorptive region (i.e. 365 nm) obtained from an image without a mandrel in place at the time of the metrology measurement.

$G_m$—A global intensity measure of the absorptive region (i.e. 365 nm) obtained from an image without a mandrel in place at the time of the reference mandrel measurement was taken.

$R_2$—A global intensity measure of the neutral absorptive region (i.e. 455 nm) obtained from an image without a mandrel in place at the time of the metrology measurement.

$R_{2r}$—A global intensity measure of the neutral absorptive region (i.e. 455 nm) obtained from an image without a mandrel in place at the time of the reference mandrel measurement was taken.

$E_{vis}$—Visible image capture exposure period.

$E_{uv}$—UV image capture exposure period.

In one embodiment, absorbance by left over photoinitiator can cause errors in thickness measurements when using absorptive imaging metrology. In one embodiment, an absorptive imaging system uses two or more wavelengths (or wavelength bands), whereby the effects of the varying photoinitiator can be removed through calculation.

In one embodiment, the absorptive imaging system measures the thickness of an ophthalmic lens (e.g., a contact lens) based on the relationship between lens thickness, dye concentration (Norbloc), and light absorption by the lens. Before hydration, the lens material contains an uncontrolled amount of photoinitiator (e.g., Irgacure 1700) that also absorbs light. Using more than one wavelength to test the absorption of the lens provides the ability to discount, or correct for, the unwanted absorption by the photoinitiator (PI).

The Beer-Lambert Law relates the absorbance of a material sample to the thickness of the sample and to the concentration of attenuating species (e.g. Norbloc and Irgacure). For uniform attenuation:

$$A = \sum_{i=1}^{N} \varepsilon_i(\lambda) c_i \ell$$

where
A is the absorbance of the sample;
$\varepsilon_i(\lambda)$ is the spectral attenuation coefficient of the attenuating species i in the sample;
$(\lambda)$ is the wavelength (or wavelengths) of light used in the measurement
$c_i$ is the concentration of the attenuating species i in the sample;
l is the path length of the beam of light through the sample.

Figure 23:
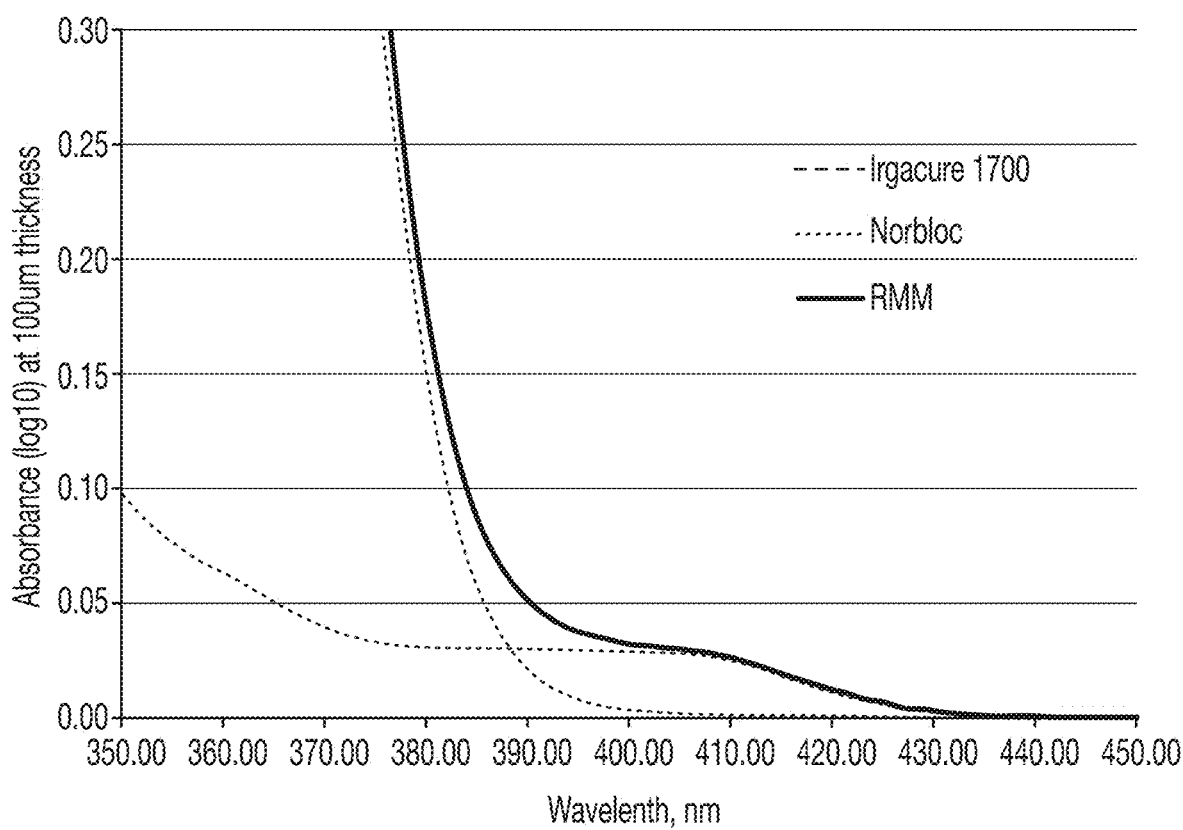
FIG. 23 is a graph showing that the absorbance of an uncured reactive monomer mix is the sum of the absorbances of Norbloc and Irgacure 1700.

Absorbance is related to transmittance by:

$$T = \frac{\Phi_e^t}{\Phi_e^i} = 10^{-A}$$

where
T is the transmittance of the sample
$\Phi_e^t$ is the radiant flux transmitted by the sample
$\Phi_e^i$ is the radiant flux incident on the sample
A is the absorbance of the sample Referring to FIG. 23, in the wavelength range from 350 nm to 450 nm, the absorbance of the uncured reactive monomer mix (RMM) results from two primary absorbing species, namely Norbloc and Irgacure 1700.

Figure 24:
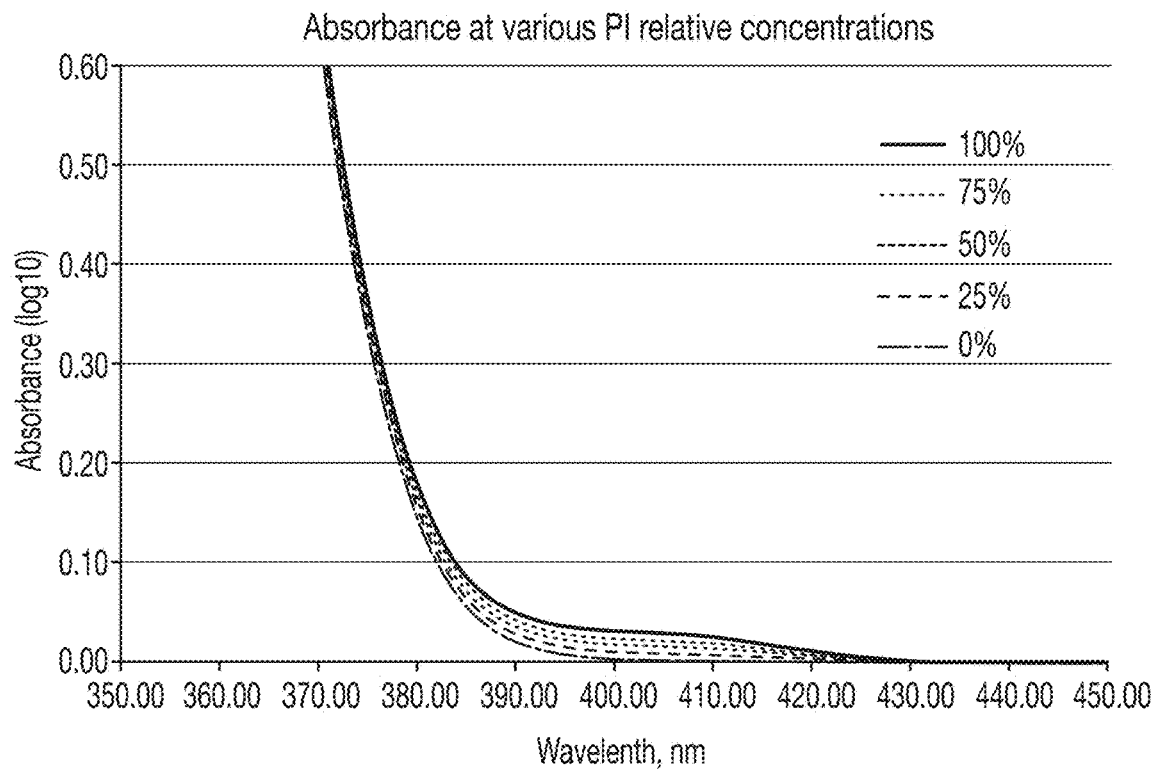
FIG. 24 is a graph showing absorbance at various photoinitiator concentration levels.

Referring to FIG. 24, in the wavelength range from 350 nm to 450 nm, the absorbance of the cured polymer (i.e. the contact lens) also results from Norbloc and photoinitiator (PI). The concentration of the PI is variable, depending on contact prescription and design, as well as exposure to ultraviolet (UV) and blue light during the measurement process. Photoinitiator concentration can also increase over time (seconds) due to recombination of consumed photoinitiator photo products.

Figure 25:
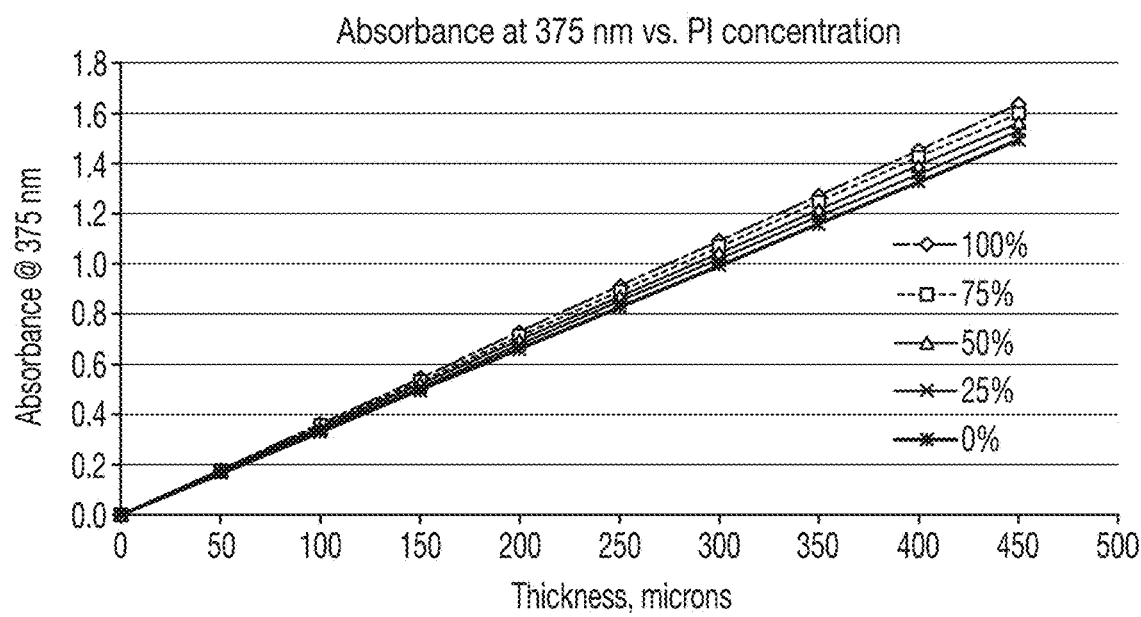
FIG. 25 is a graph showing monochromatic absorbance at 375 nm for varying photoinitiator concentration levels.
Figure 26:
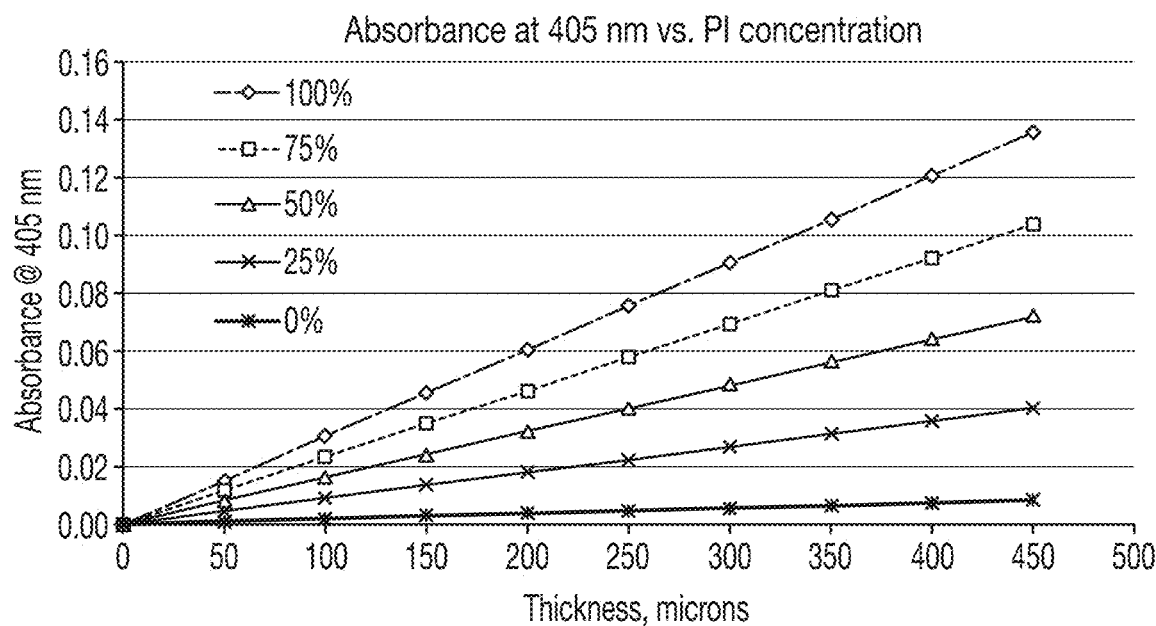
FIG. 26 is a graph showing monochromatic absorbance at 405 nm for varying photoinitiator concentration levels.

Referring to FIGS. 25 and 26, if the light used to measure absorbance is monochromatic (or at least fairly narrow in bandwidth), the absorbance will be directly proportional to thickness and concentration as indicated by the straightness of the lines shown in FIGS. 25 and 26. However, there is still interaction between measure thickness and photoinitiator concentration.

Figure 27:
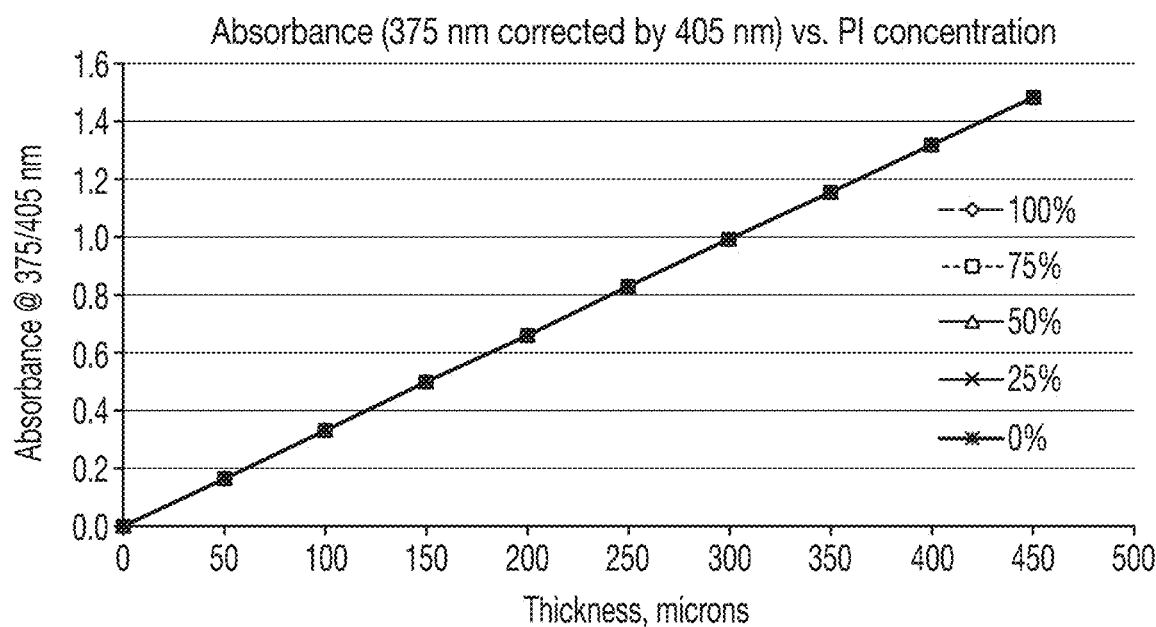
FIG. 27 is a graph showing corrected absorbance with photoinitiator effects removed.

Referring to FIG. 27, but subtracting a portion of the 405 nm absorbance from the 375 nm absorbance, the dependence on photoinitiator concentration can be removed. The corrected absorbance is calculated by:

$$A_{corr} = A(375 \text{ nm}) - k \cdot A(405 \text{ nm})$$

where
A(375 nm) is the absorbance at 375 nm;
A(405 nm) is the absorbance at 405 nm;
k is a constant given by:

$$k = \frac{A(375 \text{ nm}, 450 \text{ }\mu\text{m}, PI(100\%)) - A(375 \text{ nm}, 450 \text{ }\mu\text{m}, PI(0\%))}{A(405 \text{ nm}, 450 \text{ }\mu\text{m}, PI(100\%)) - A(405 \text{ nm}, 450 \text{ }\mu\text{m}, PI(0\%))}$$

where
A(Xnm, Yum, PI(Z)) is the absorbance of X nm light by Y μm thickness of polymer with a relative concentration of Z photoinitiator.

Figure 28:
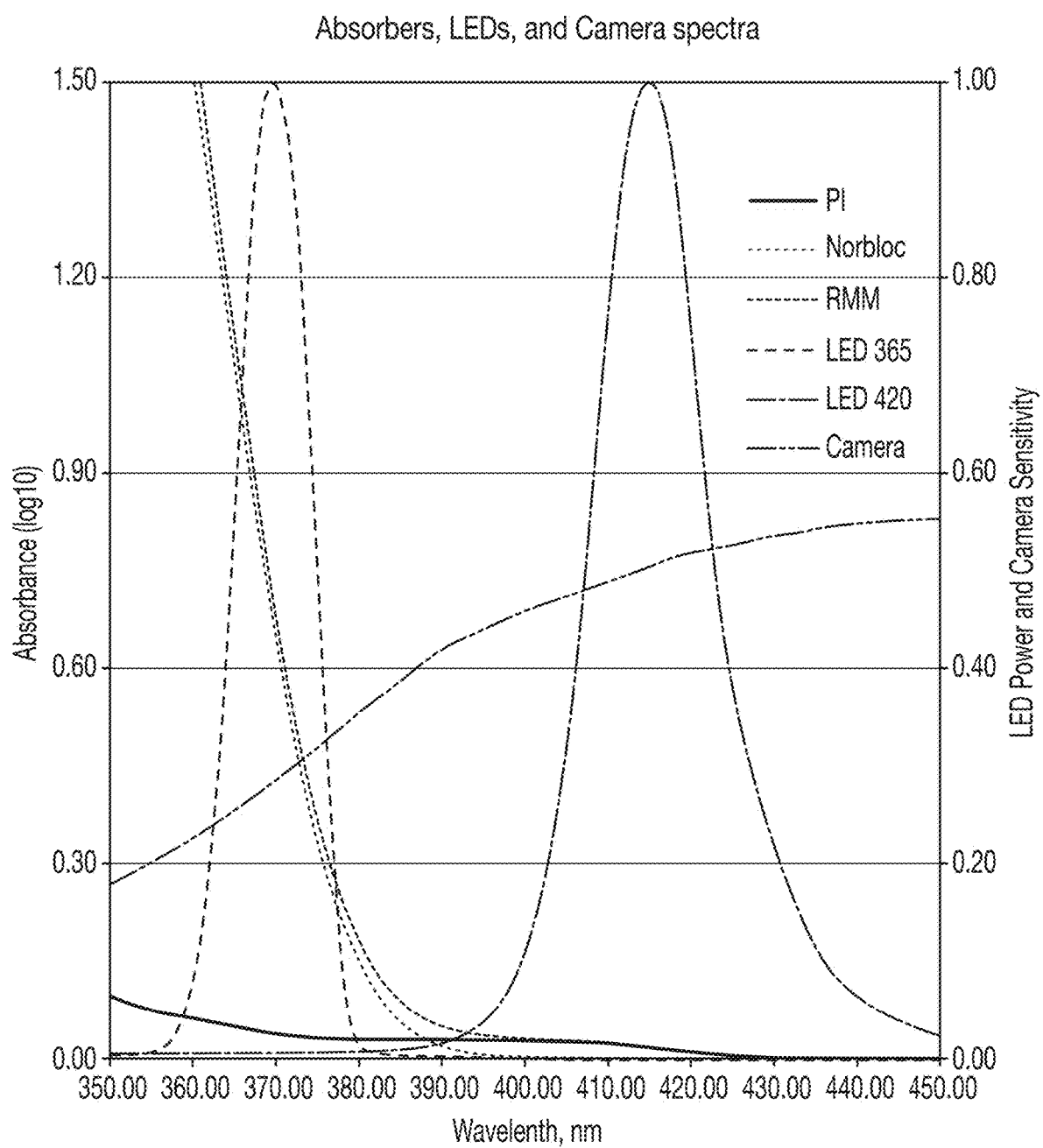
FIG. 28 is a graph showing that absorbance will vary with thickness and concentration.

Referring to FIG. 28, in one embodiment, if the light used to measure absorbance has an extended spectrum, the absorbance will vary with thickness and concentration. This relationship will be non-linear if the absorbance is not flat within the wavelengths of the illumination. The interaction between thickness and photoinitiator concentration can still be compensated for, as in the monochromatic case.

Figure 29:
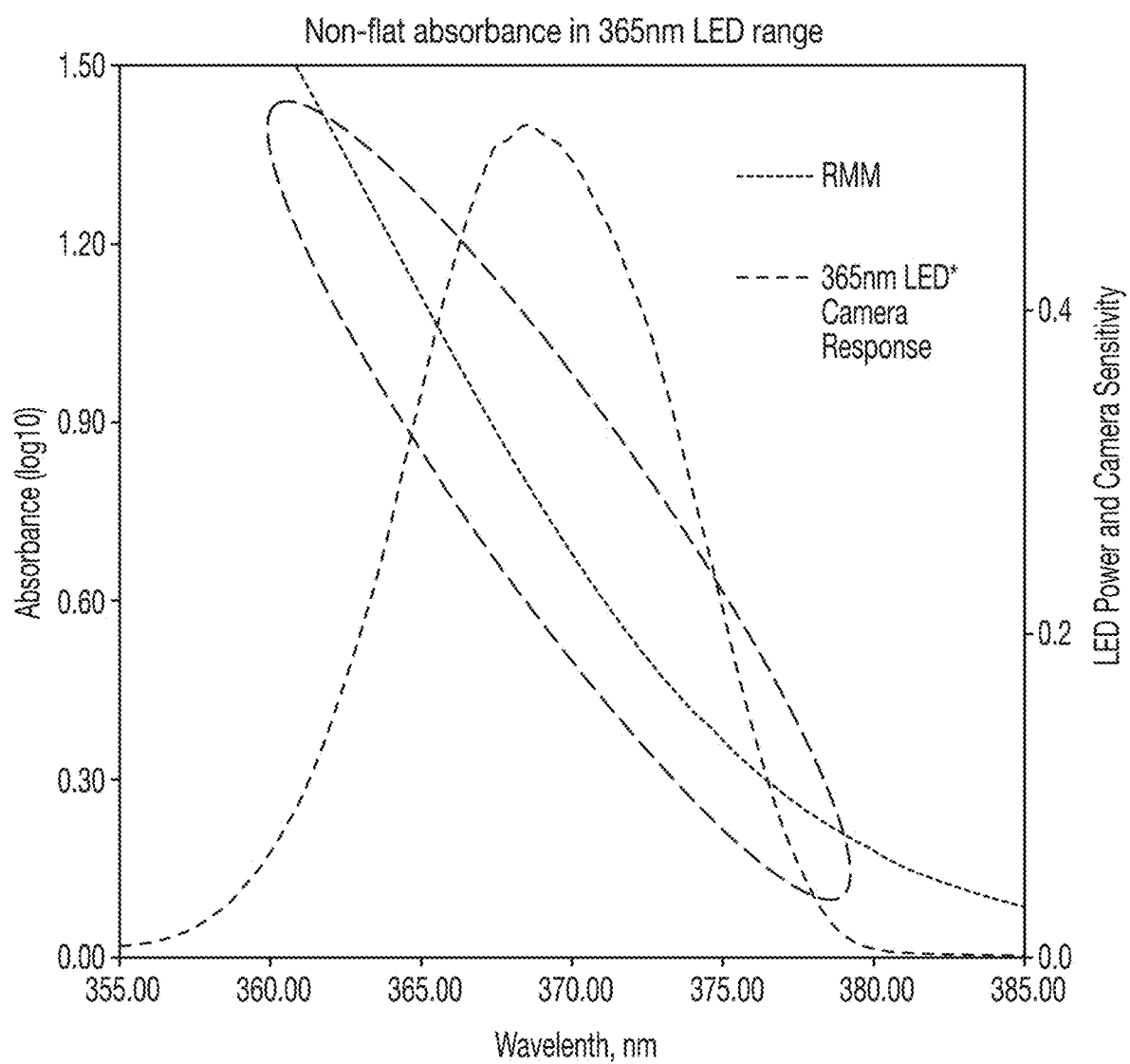
FIG. 29 is a graph showing non-flat reactive monomer mixture absorbance in the 365 nm LED range.

FIG. 29 shows non-flat absorbance of the reactive monomer mixture in the 365 nm LED range.

Figure 30:
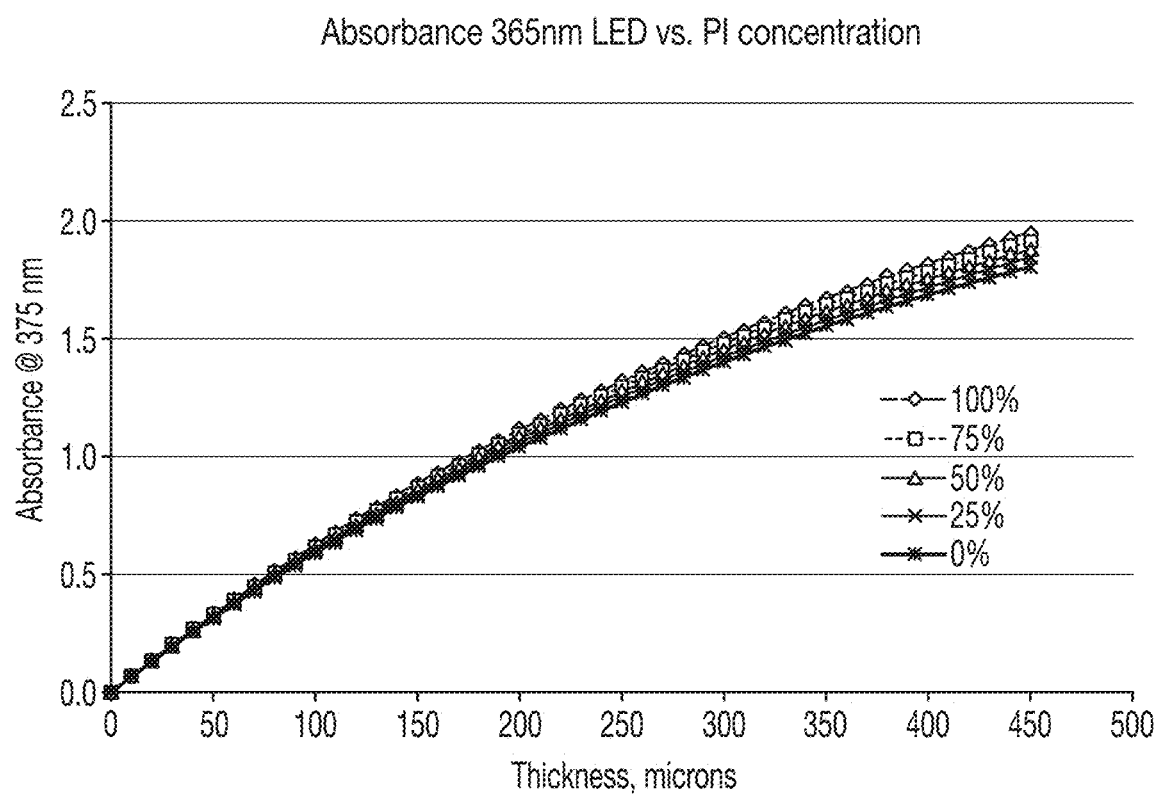
FIG. 30 is a graph showing the curvature caused by non-flat spectral absorbance in the 365 nm LED range versus photoinitiator concentration.

FIG. 30 shows the absorbance using a 365 nm LED versus the photoinitiator concentration. In FIG. 30, the curvature is caused by non-flat spectral absorbance in the 365 nm LED illumination region.

Figure 31:
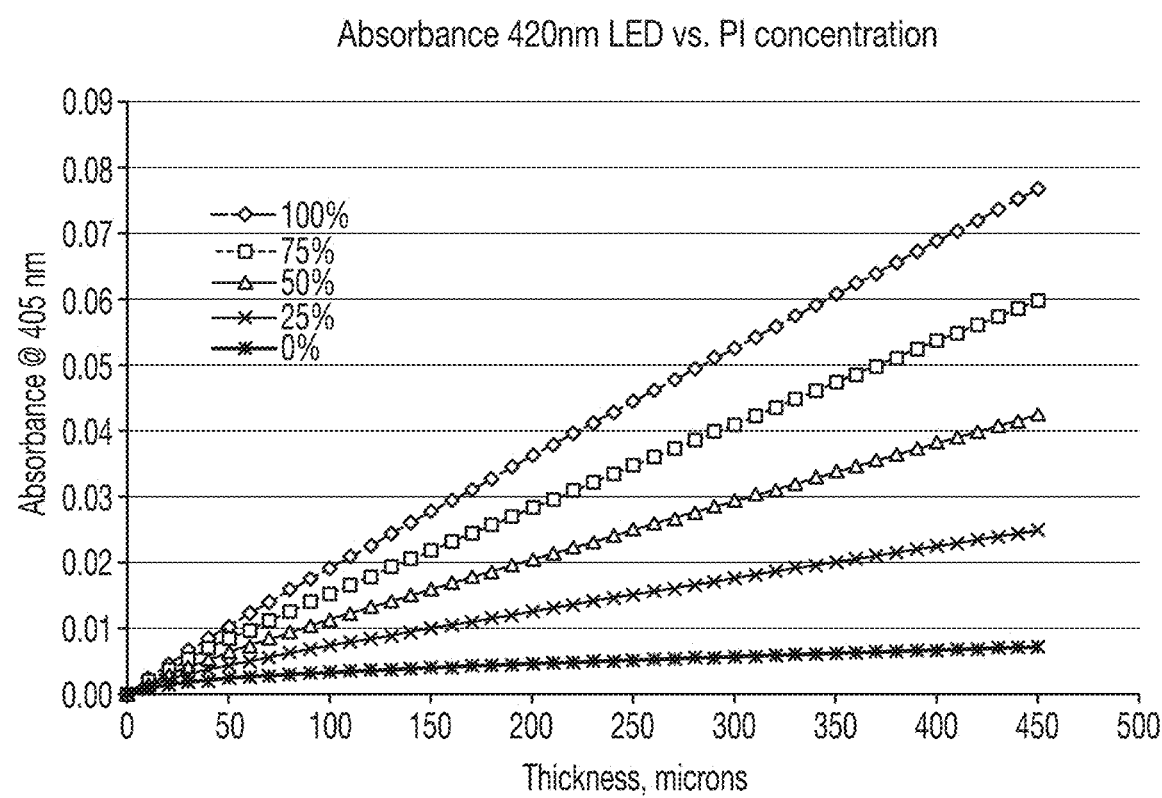
FIG. 31 is a graph showing absorbance in the 420 nm LED illumination region versus photoinitiator concentration.

FIG. 31 shows absorbance using a 420 nm LED versus photoinitiator concentration.

Figure 32:
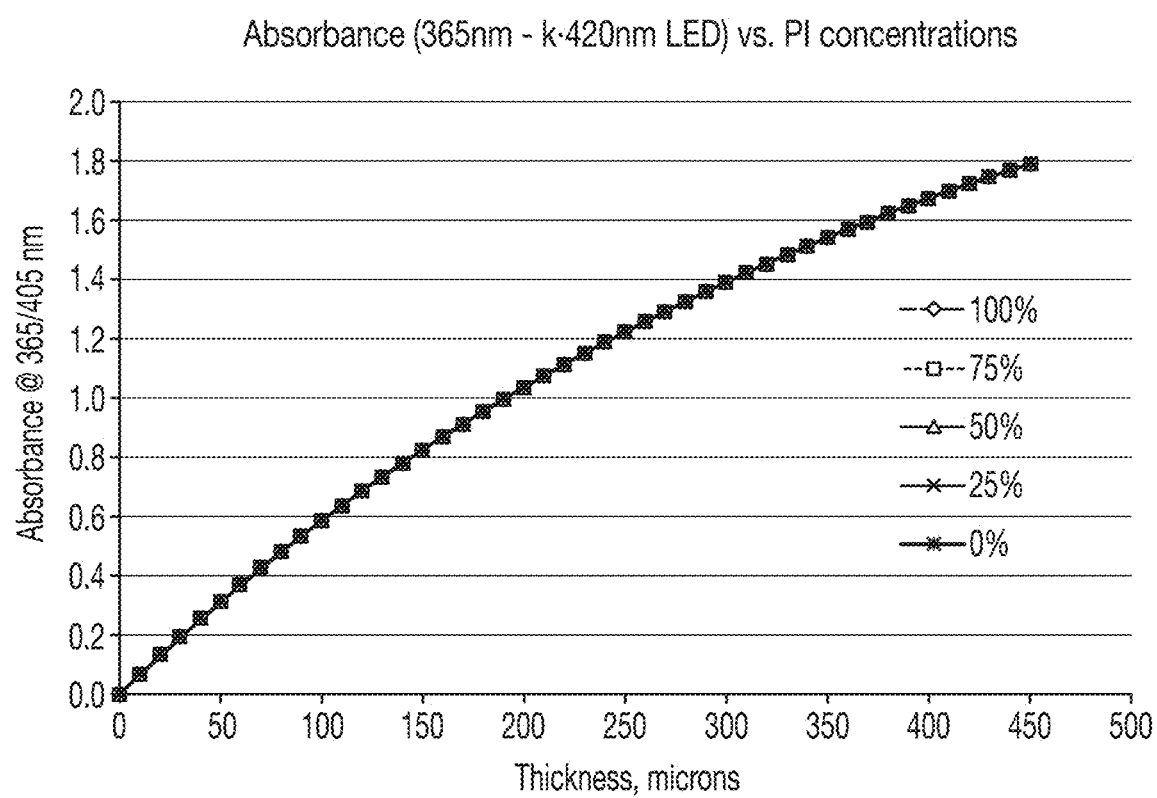
FIG. 32 is a graph showing corrected absorbance levels with photoinitiator effects removed.

FIG. 32 shows the corrected absorbance with the photoinitiator effects removed. FIG. 32 shows absorbance versus photoinitiator concentrations. While the corrected absorbance versus thickness relationship still plots as a curvature in FIG. 32, all concentrations of photoinitiator result in the same values.

Figure 33:
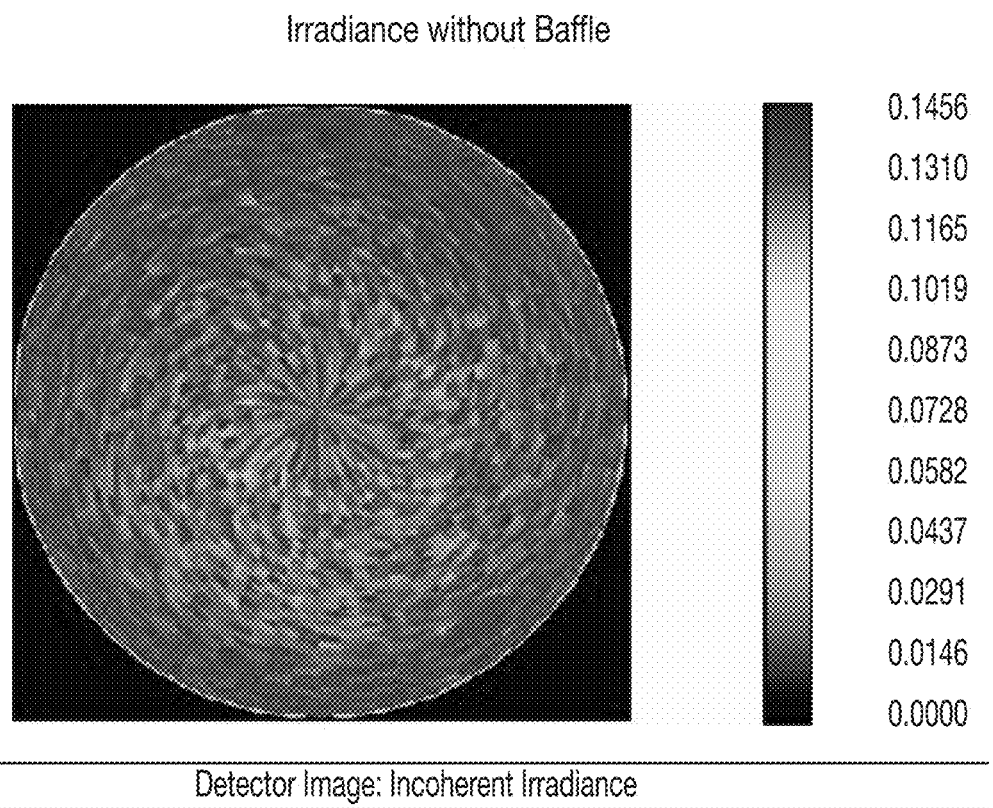
FIG. 33 shows the irradiance of a lens image without using a baffle, in accordance with one embodiment of the present invention.
Figure 34:
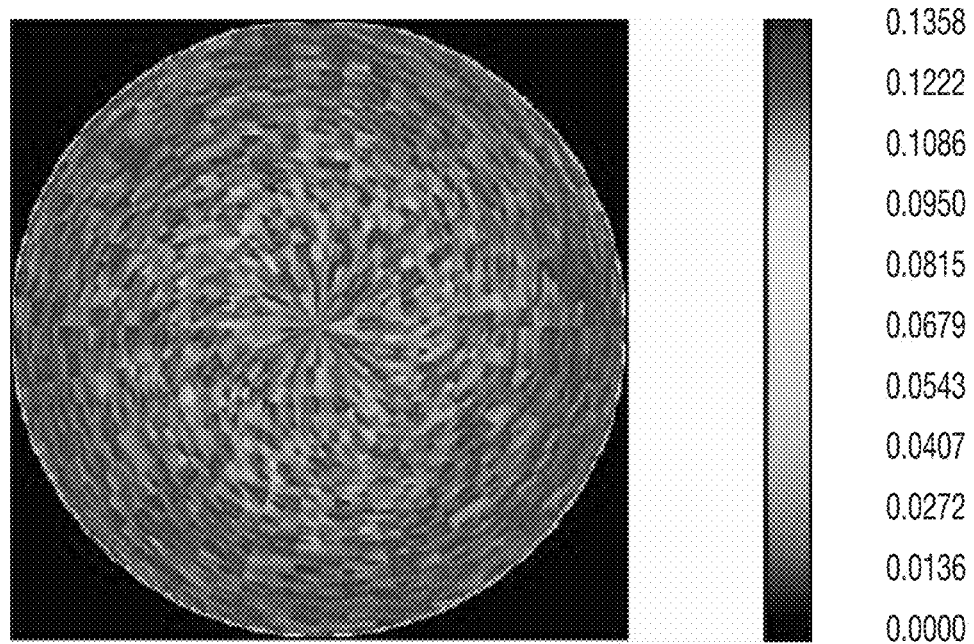
FIG. 34 shows the irradiance of a lens image when using a baffle, in accordance with one embodiment of the present invention.

FIG. 33 shows the irradiance of the image when a baffle is not utilized inside the integrating sphere. FIG. 34 shows the irradiance of the image with a baffle used inside the integrating sphere. Comparing the images shown in FIGS. 33 and 34, it becomes apparent that adding a reflective shield or baffle inside the integrating sphere improves the uniformity of the irradiance of the image. The non-uniformity with the baffle cannot be seen until the scatter fraction of the integrating sphere drops to 30% Lambertian. As used herein, Lambertian light is light that exhibits the same intensity when viewed at every angle.

Figure 35:
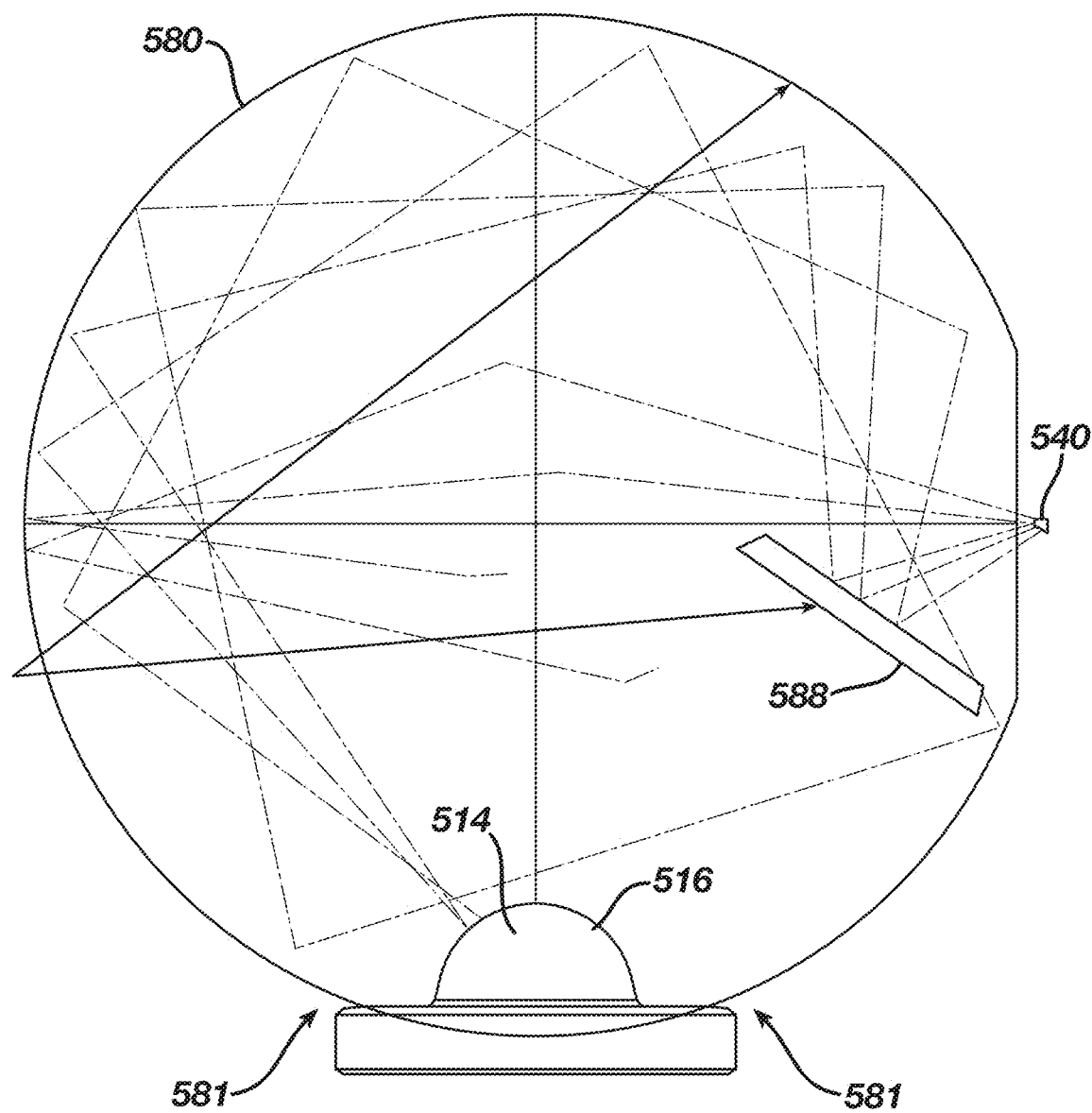
FIG. 35 shows light rays being internally reflected within an integrating sphere of an absorptive imaging system, in accordance with one embodiment of the present invention.

Referring to FIG. 35, in one embodiment, an absorptive imaging system includes an integrating sphere 580 having a baffle 588. As light rays are generated by LED 540, at least some of the light rays reflect off the baffle 588 before being internally reflected within the integrating sphere 580 and through the convexly curved surface 516 of the forming optic 514. In one embodiment, the lower portion 581 of the integrating sphere extends below the convexly curved surface 516 of the forming optic 514.

In one embodiment, the interior surface of the integrating sphere 580 absorbs about 10% of the power of the LED light and reflects about 90% of the power of the LED light. In one embodiment, the interior surface of the integrating sphere 580 scatters the reflected power at the following percentages: 90% Lambertian and about 10% Specular.

Figure 36A:
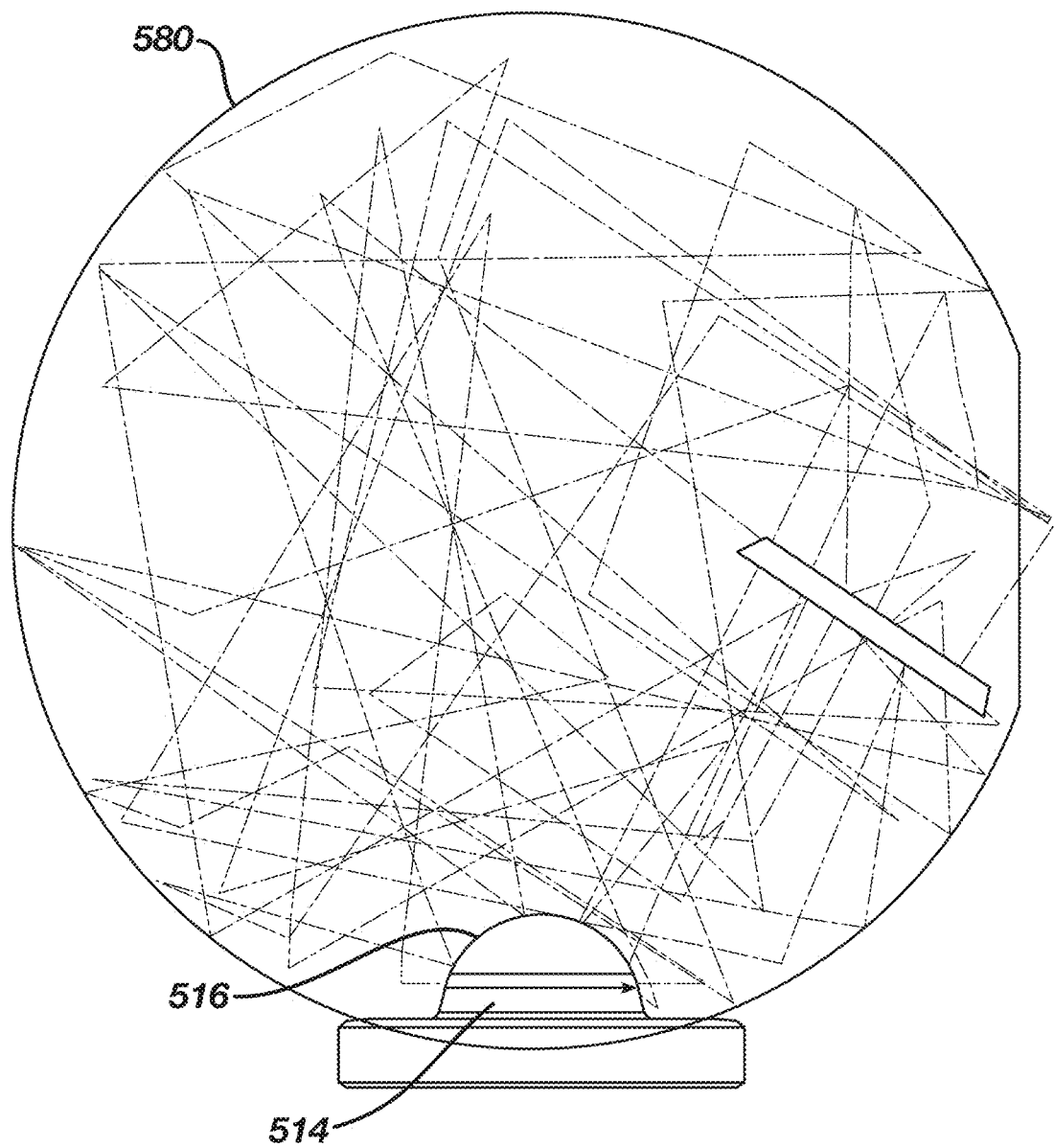
FIG. 36A shows light rays being internally reflected within an integrating sphere for illuminating a convexly curved surface of a forming optic, in accordance with one embodiment of the present invention.
Figure 36B:
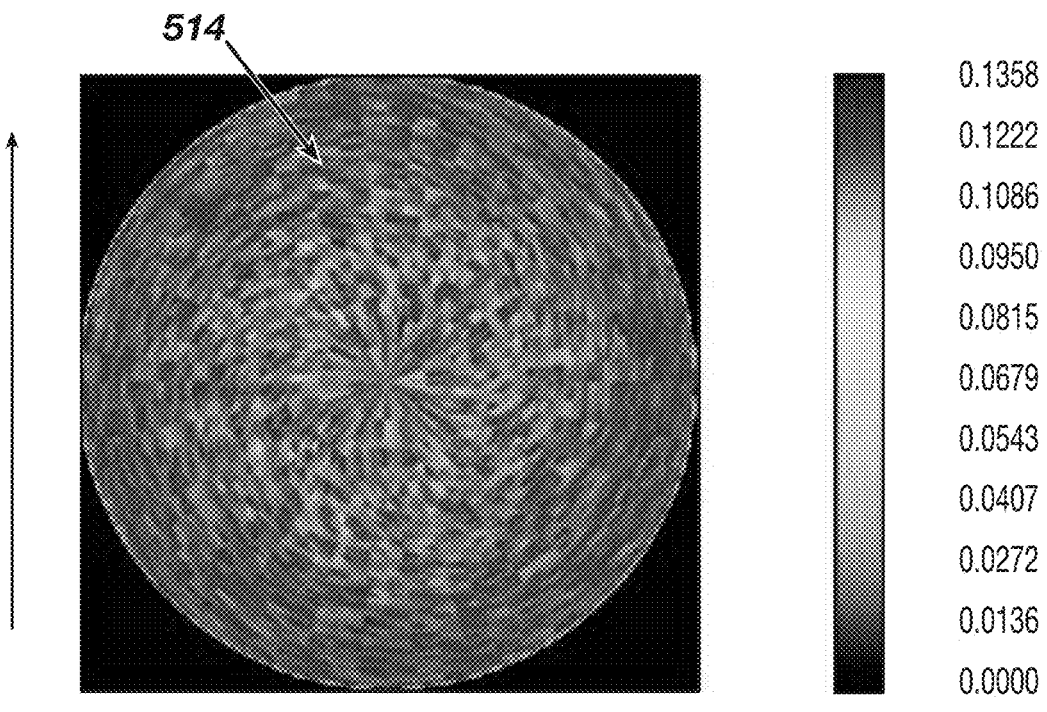
FIG. 36B shows an intensity image of the convexly curved surfaced of the forming optic shown in FIG. 36A.

FIG. 36A shows the light being internally reflected within the integrating sphere 580 for irradiating the convexly curved surface 516 of the forming optic 514. FIG. 36B shows an image plotting the irradiance on the convexly curved surface 516 of the forming optic 514.

In one embodiment, when using the absorptive imaging system having two illumination sources, only a single LED will be used at any one time for capturing an image. In one embodiment, when the LED that covers the absorptive band of the lens material is on, the LED that is absorptive neutral is off.

In one embodiment, the absorptive imaging system includes a central processing unit having a program that turns the LEDs on and off. In one embodiment, only one of the LEDs is on at any one time. In one embodiment, a single shutter may be used for covering a first one of the LEDs during a first phase and then switching to cover a second one of the LEDS during a second phase. In this embodiment, a single shutter is used to turn the LEDs on and off. In one embodiment, each LED has an individual shutter that opens and closes for turning the respective LEDs on and off. In one embodiment, there are no moving shutters for turning the LEDs on and off. In this embodiment, the absorptive imaging system includes an operating system that provides power to the LEDs and then cuts off power to the LEDs so as to switch the LEDs on and off without using moving shutters.

Figure 37:
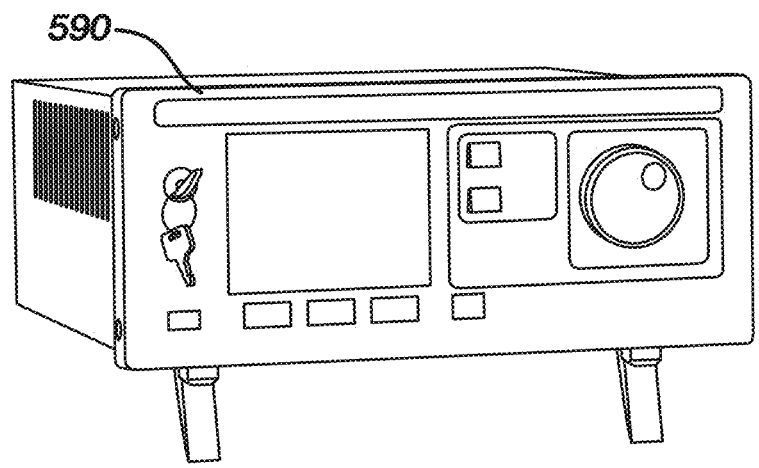
FIG. 37 shows a temperature controller for an absorptive imaging system, in accordance with one embodiment of the present invention.

Referring to FIG. 37, in one embodiment, the absorptive imaging system includes a temperature controller 590 for controlling the temperature of the cooling plate 584 (FIG. 18B) that holds the one or more LEDs.

Figure 38:
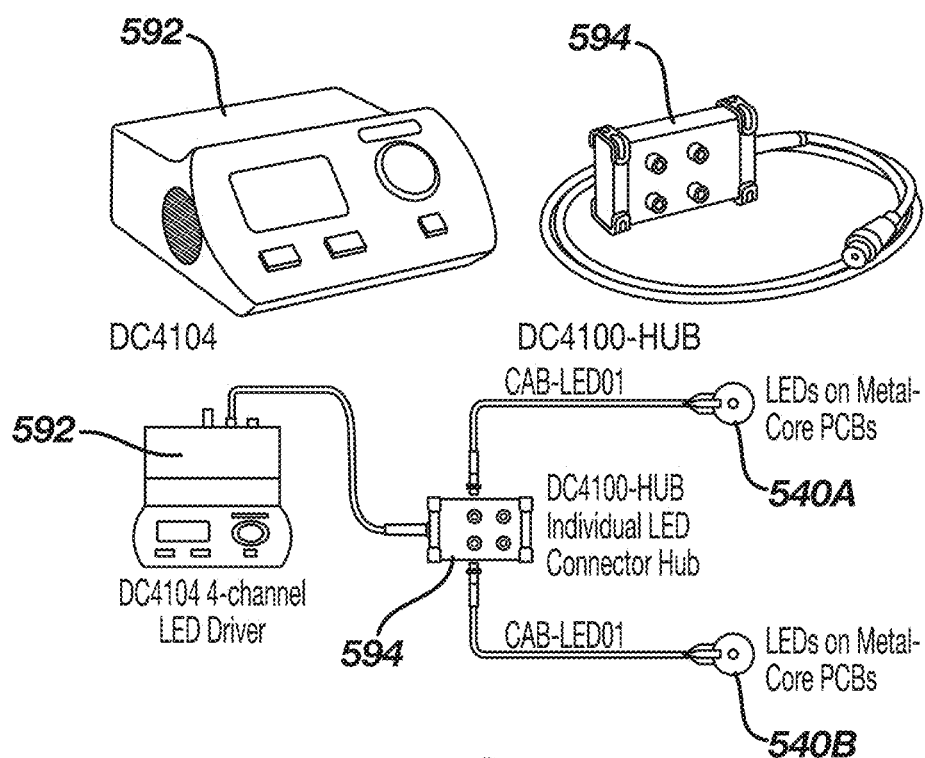
FIG. 38 shows a control system for an absorptive imaging system, in accordance with one embodiment of the present invention.

Referring to FIGS. 19 and 38, in one embodiment, the absorptive imaging system 528 includes an LED current driver 592 for the two LEDs 540A, 540B. In one embodiment, the LED current driver 592 provides custom "current steering" to the electronics. In one embodiment, the absorptive imaging system includes an operating system (e.g., a software program) to turn the LEDs 540A, 540B on and off and possibly change the current supplied to the respective LEDs. In one embodiment, the absorptive imaging system includes an LED connector hub 594 that electrically interconnects the LEDs 540A, 540B with the LED current driver 592.

In one embodiment, the LED current driver 592 is a four channel constant current controller that provides independent control for each LED 540A, 540B. Although only two LEDs are shown in FIG. 38, in other embodiments, an absorptive imaging system may have three or more individually controllable LEDs for providing light at different wavelengths. In one embodiment, the LED current driver and the associated control system may include a USB interface for automated control of the absorptive imaging system and the LEDs.

Figure 39:
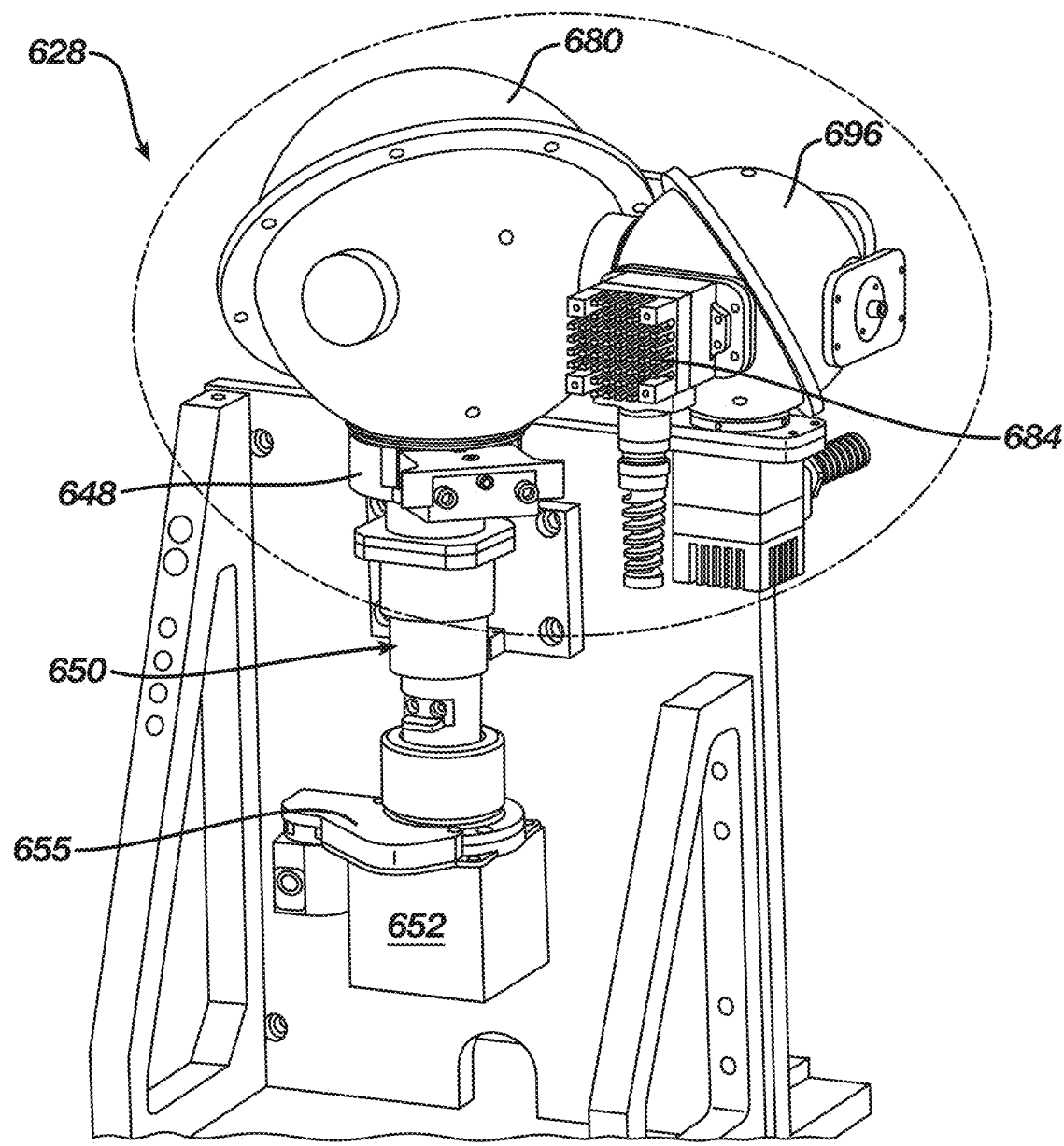
FIGS. 39-41 show an absorptive imaging system for measuring the thickness of ophthalmic lenses including an LED sphere and a forming optic sphere, in accordance with one embodiment of the present invention.

Referring to FIG. 39, in one embodiment, an absorptive imaging system 628 includes two integrating spheres 680, 696. A larger forming optic integrating sphere 680 overlies the forming optic that sits on the kinematic mount 648. A smaller LED integrating sphere 696 includes LEDs that generate light at different wavelengths to cover the absorptive band of the lens material and a band that is "absorption neutral" in the lens' spectrum. A temperature control element 684 is secured to the smaller LED sphere 696 for regulating the temperature of the LEDs to provide for consistent, uniform light.

In one embodiment, the absorptive imaging system 628 shown in FIG. 39 has many of the same elements shown and described above. In one embodiment, the absorptive imaging system 628 includes the kinematic mount 648 for securing a forming optic, a series of imaging lenses 650 for directing an image of an ophthalmic lens to a camera 652, which is designed to capture an intensity image of the ophthalmic lens. In one embodiment, the absorptive imaging system 628 includes a mechanical optical flat flipper 655 that interfaces with the light passing through the imaging lens stage 650 and the camera 652 to correct focus distance for the two spectral bands used for imaging.

Figure 40:
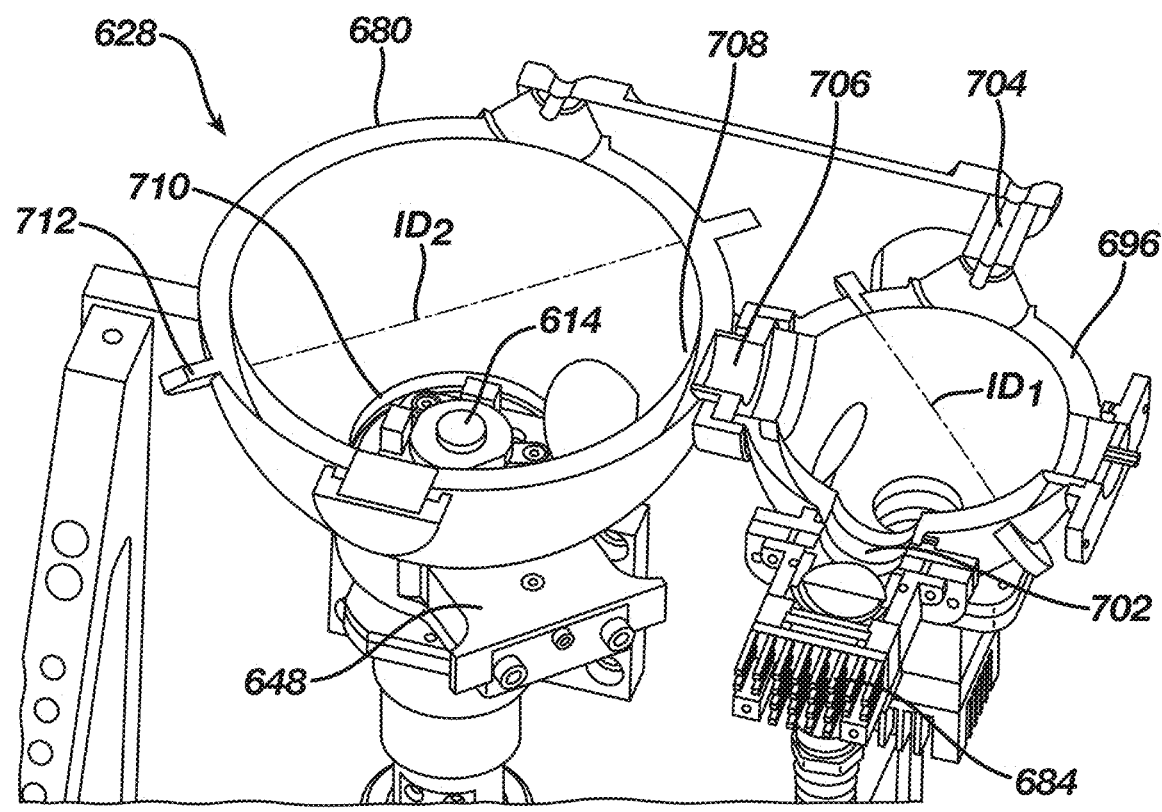

Referring to FIG. 40, in one embodiment, the LED integrating sphere 696 has an internal diameter $ID_1$ of about 3-3.5 inches and more preferably about 3.3 inches. In one embodiment, the interior surface of the LED integrating sphere is coated with a Spectralon material or another material that reflects light. As used herein a Spectralon material is a material which is designed to exhibit an almost perfect Lambertian reflectance.

In one embodiment, the LED integrating sphere 696 includes an LED input port 702 for directing the LED light into the interior of the LED integrating sphere. In one embodiment, the LED integrating sphere 696 may include a first port for inputting first light from a first LED and a second port for inputting second light from a second LED. In one embodiment, the LED integrating sphere may have a single port for inputting light from both light sources into the sphere. In one embodiment, the LED integrating sphere 696 has a spectrometer port 704 for testing the quality of the light generated by the two LEDs.

In operation, the light from the two LEDs is internally reflected within the LED integrating sphere 696 for improving the uniformity of the light (e.g., Lambertian). The light passes through an output port 706 and into an input port 708 of the forming optic integrating sphere 680, where it is further internally reflected within the forming optic sphere 680 for improving the uniformity of the light.

In one embodiment, the forming optic integrating sphere 680 has an inner diameter $ID_2$ of about 5-5.5 inches and more preferably about 5.3 inches. In one embodiment, the inner surface of the forming optic integrating sphere is coated with a Spectralon material or another material for internally reflecting light. As noted above, the forming optic integrating sphere 680 includes the light input port 708 that receives the internally reflected light from the LED integrating sphere 696. The forming optic integrating sphere 680 also desirably includes a forming optic port 710 that surrounds the forming optic 614 positioned atop the kinematic mount 648.

In one embodiment, the forming optic integrating sphere 680 includes a spectrometer port 712 that may be used for inserting a spectrometer to observe the quality of the light that is internally reflected within the forming optic integrating sphere 680.

Figure 41:
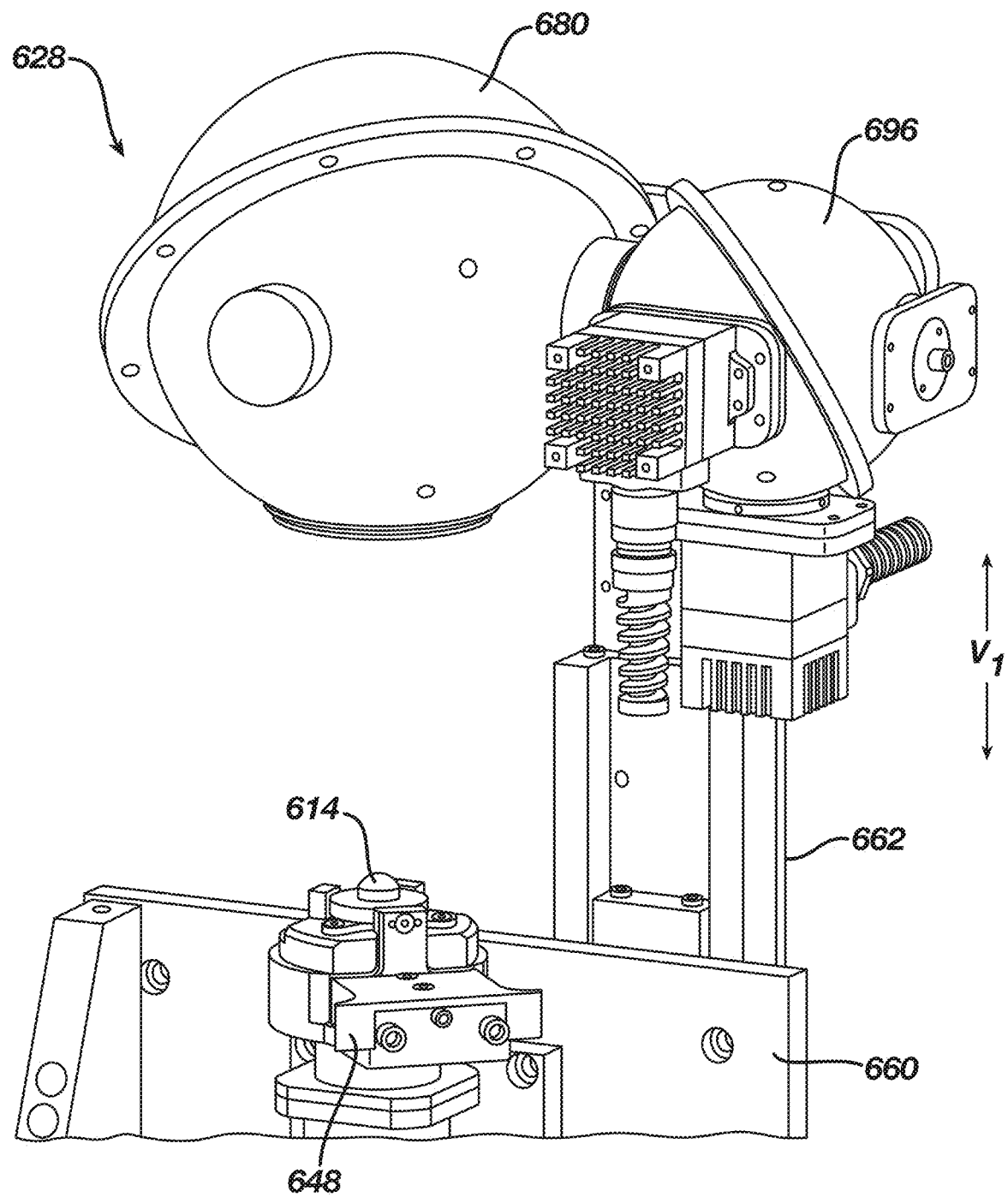

Referring to FIG. 41, in one embodiment, an absorptive imaging system 628 includes a support base 660 that is designed to support the absorptive imaging system above a substrate (e.g. a tabletop). In one embodiment, the system 628 includes a vertically extending support 662 having an upper end that secures the forming optic integrating sphere 680 and the LED integrating sphere 696. In one embodiment, the forming optic integrating sphere 680 and the LED integrating sphere 696 are adapted to slide up and down along the vertical axis designated $V_1$. In one embodiment, the forming optic integrating sphere 680 may be lifted to the position shown in FIG. 41 so that a forming optic 614 holding an ophthalmic lens may be placed atop the kinematic mount 648. In one embodiment, once the forming optic 614 is positioned atop the kinematic mount 648, the forming optic integrating sphere 680 may be lowered back to the position shown in FIG. 39 for covering the forming optic 614.

Figure 42:
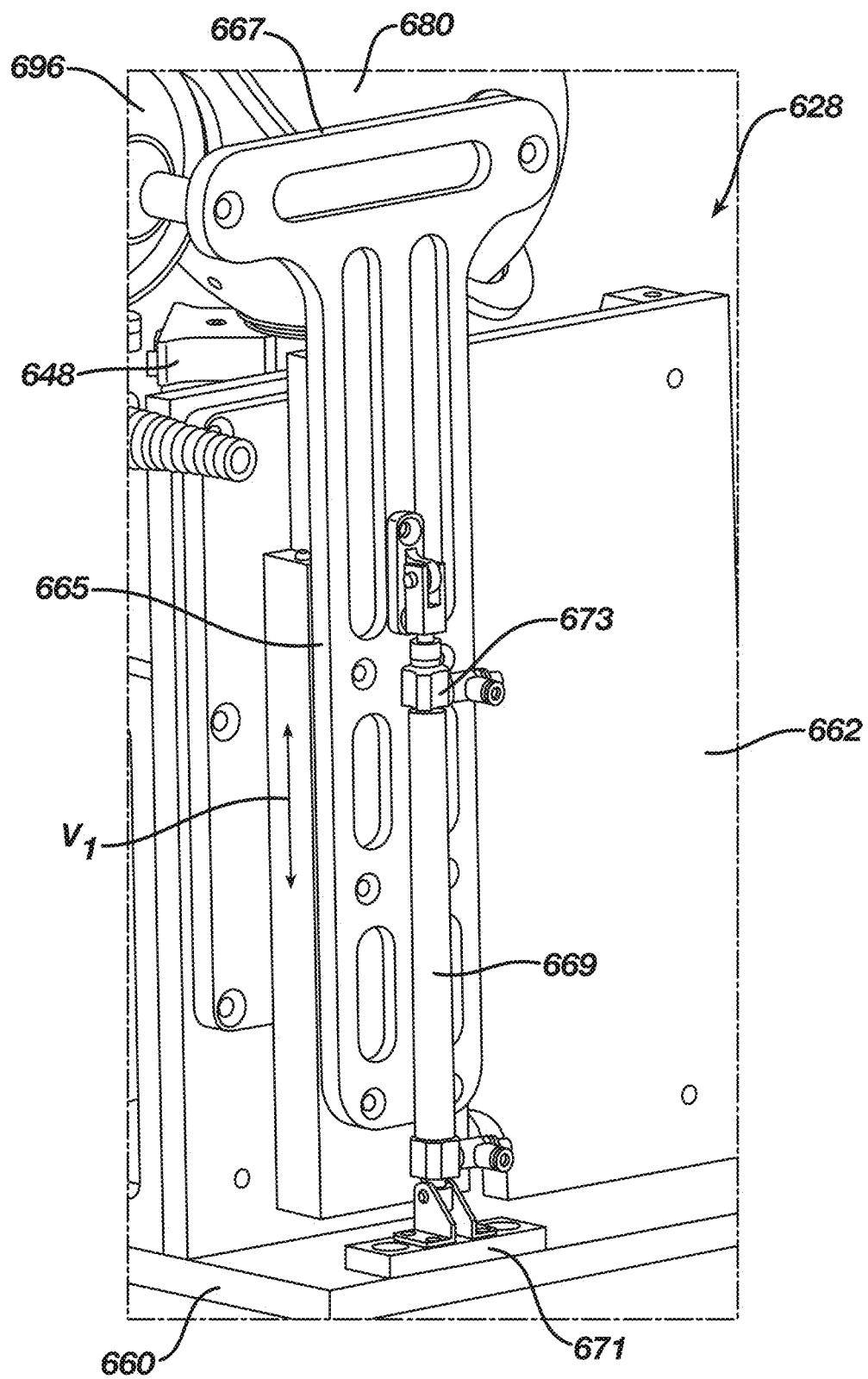
FIG. 42 shows a subassembly for lifting and lowering a unit including the LED sphere and the forming optic sphere of FIG. 39, in accordance with one embodiment of the present invention.

Referring to FIG. 42, in one embodiment, the absorptive imaging system includes a sliding elevator plate 665 that is coupled with the vertical support plate 662. The sliding elevator plate 665 has an upper end 667 that is attached to both the forming optic integrating sphere 680 and LED integrating sphere 696 for moving the two spheres up and down together. In one embodiment, an absorptive imaging system has integrating spheres that are stationary and the imaging optics/camera are moved lower for the forming optic load/unload operations.

In one embodiment, the absorptive imaging system 628 includes a pneumatic cylinder 669 having a lower end secured to the base 660 via a pneumatic cylinder base 671 and an upper end 673 that is secured to the sliding elevator plate 665. The pneumatic cylinder 669 dampens the up and down vertical movement of the sliding elevator plate 665 so that the forming optic integrating sphere 680 does not slam down onto the kinematic mount 648, which may damage the absorptive imaging system or the forming optic positioned atop the kinematic mount 648. In one embodiment, the pneumatic cylinder 669 enables the sliding elevator plate 665 to lift the forming optic integrating sphere 680 in an automated or semi-automated operation. In one embodiment, the pneumatic cylinder 669 may be replaced by or integrated with constant force springs to reduce the force required to life the forming optic sphere 680 and the LED sphere 696, and to prevent the forming optic integrating sphere 680 from slamming down onto the kinematic mount 648.

Figure 43:
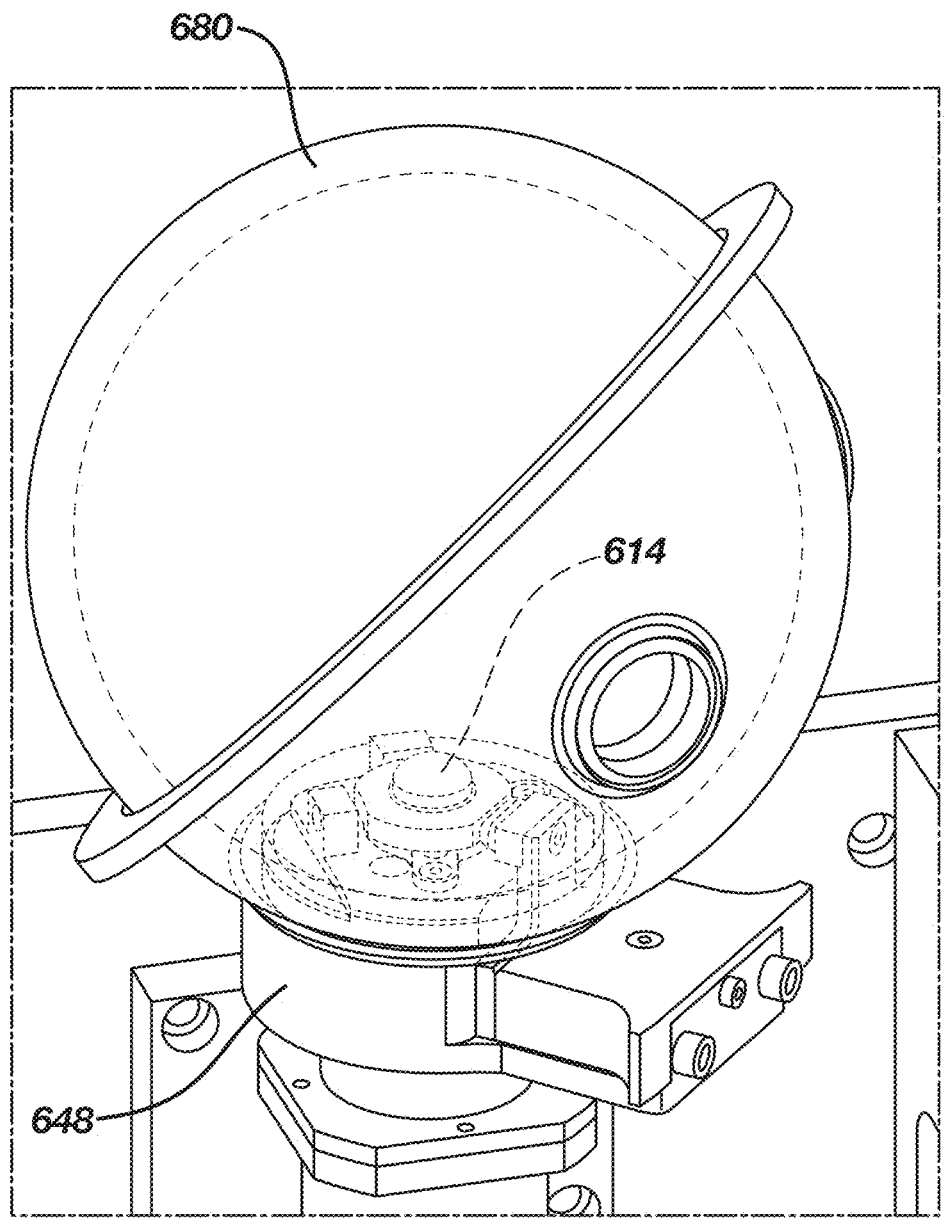
FIGS. 43, 44, 45A-45B and 46 show a kinematic mount for a forming optic, in accordance with one embodiment of the present invention.

Referring to FIG. 43, in one embodiment, the forming optic integrating sphere 680 is adapted to overlie the forming optic 614 positioned atop the kinematic mount 648. As will be described in more detail herein, the kinematic mount 648 is designed to provide a stable substrate for positioning and aligning the forming optic 614.

Figure 44:
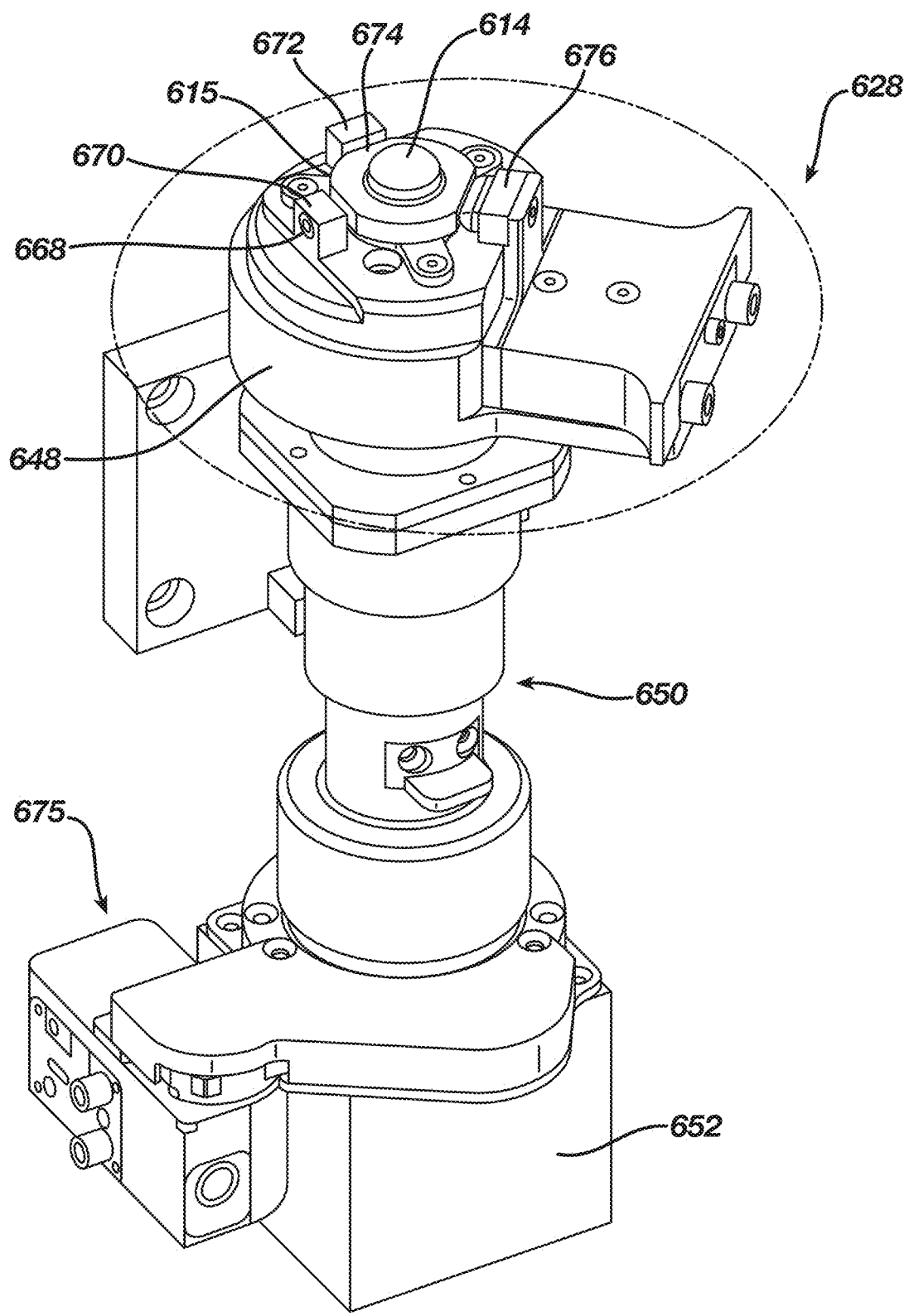

Referring to FIG. 44, in one embodiment, the kinematic mount 648 includes a first stop 668 and a second stop 672 that are adapted to engage the base 615 of the forming optic 614.

Figure 45A:
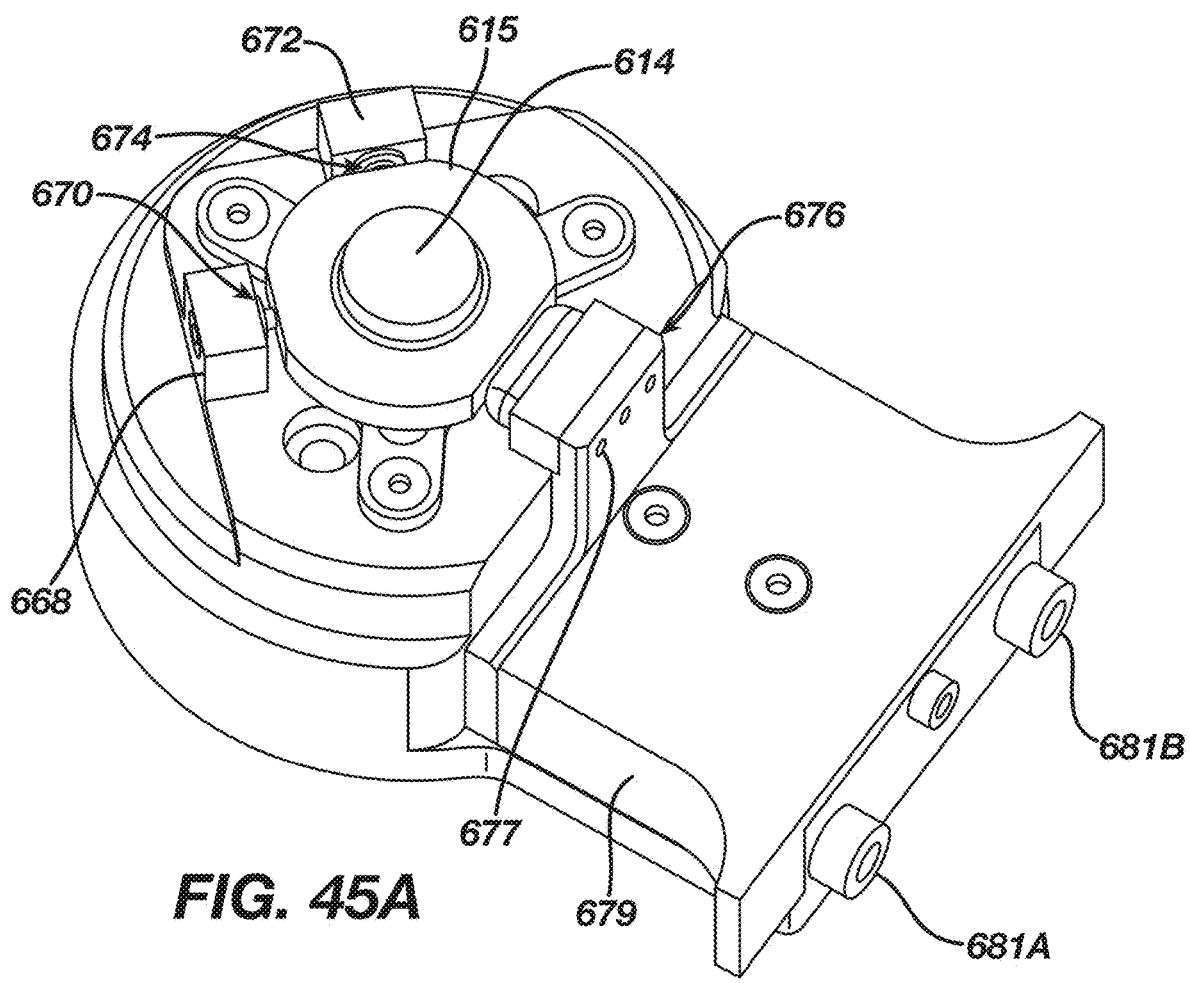
Figure 45B:
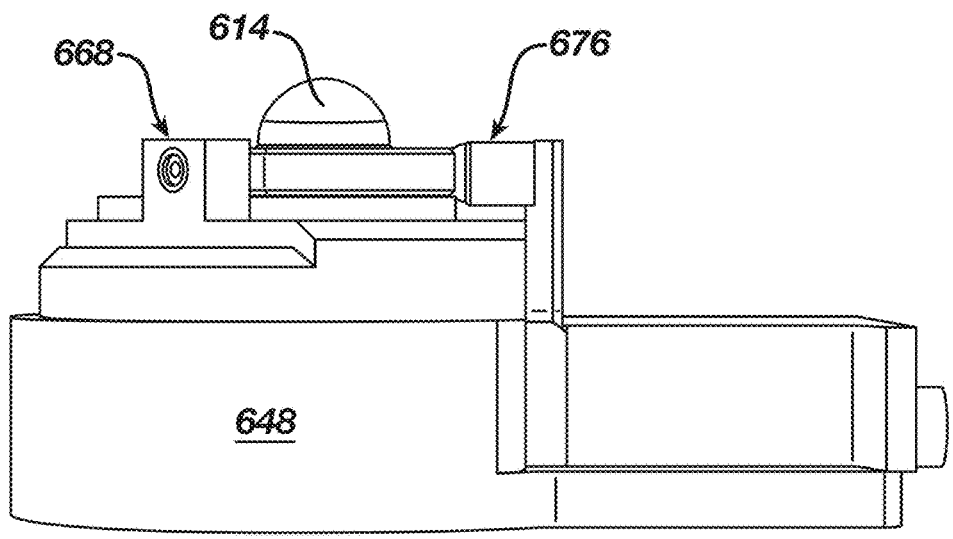

Referring to FIGS. 44, 45A and 45B, the first stop 668 includes an adjustable point 670 that enables fine x and y axis adjustment of the position of the forming optic 614. Similarly, the second stop 672 includes a second adjustable point 674 that also enables fine x and y axis adjustment of the position of the forming optic 614.

In one embodiment, the kinematic mount 648 includes a plunger 676 that opposes the first stop 668 and the second stop 672. The plunger 676 includes at least one adjustable point tip 677 for making fine x and y axis adjustments of the position of the forming optic 614. The kinematic mount 648 includes a release 679 that may be retracted when loading and unloading the forming optic 614 from the kinematic mount 648. In one embodiment, the release 679 includes rotatable adjusting elements 681A, 681B for retracting and extending the release 679.

Referring to FIG. 45B, in one embodiment, the first stop 668, the second stop 672 (FIG. 45A), and the plunger 676 have upper ends that lie below the convexly curved surface 616 of the forming optic 614. The minimized relative height of the stops 668, 672 and the plunger 676 relative to the convexly curve surface 616 avoids shadowing of the forming optic 614 and the lens within the absorptive imaging system.

Figure 46:
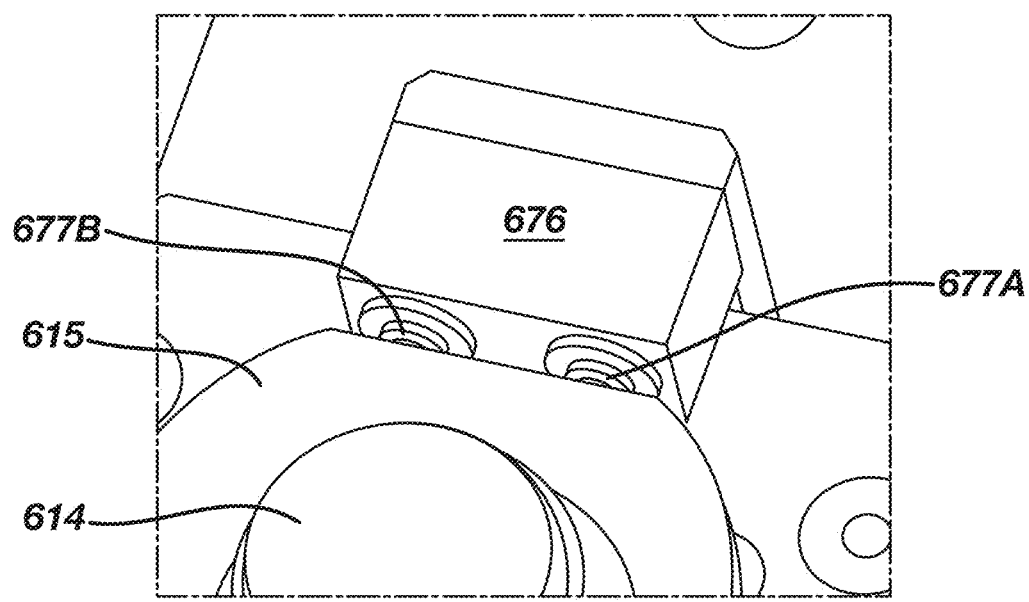

Referring to FIG. 46, in one embodiment, the plunger 676 includes first and second adjustable point tips 677A, 677B that may be adjustable for making fine x and y axis position adjustments of the forming optic 614. In one embodiment, the distal ends of the adjustable point tips 677A, 677B are adapted to abut against the outer peripheral edge of the base 615 of the forming optic 614.

Referring to FIG. 45A, in one embodiment, the base 615 of the forming optic 614 has an outer periphery including a first flat surface that opposes the adjustment pin 670 of the first stop 668, a second flat surface that opposes the adjustment pin 674 of the second stop 672, and a third flat surface that opposes the adjustment pin 677 of the plunger 676.

Figure 47:
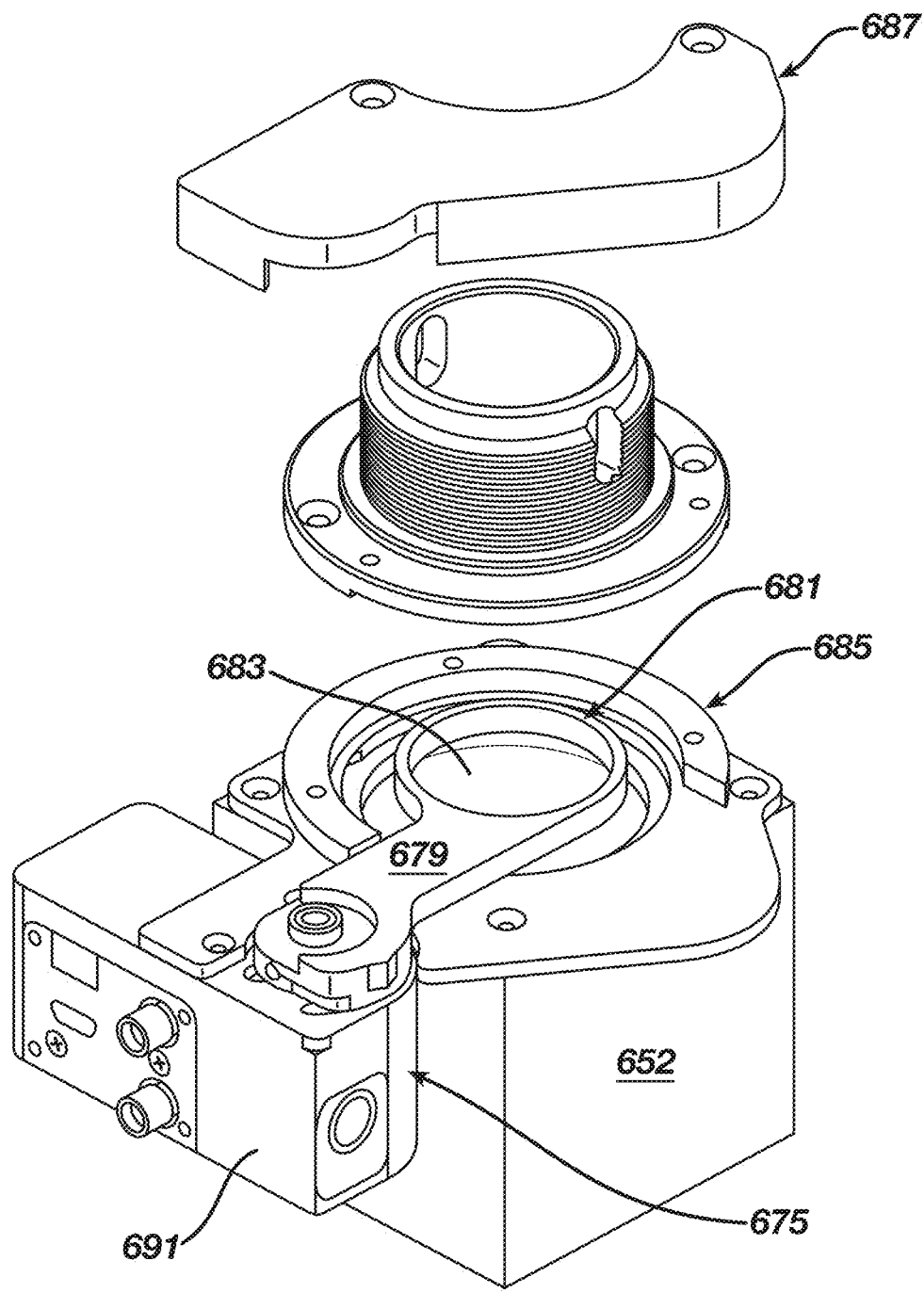
FIGS. 47 and 48A-48B show a two position actuator and a swing arm that is inserted into and withdrawn from alignment with a camera of the absorptive imaging system shown in FIG. 39, in accordance with embodiment of the present invention.

Referring to FIGS. 44 and 47, in one embodiment, the absorptive imaging system 628 includes a focal length adjusting assembly 675 located between the imaging lens section 650 and the camera 652. Referring to FIG. 47, in one embodiment, the focal length adjusting assembly 675 includes a two position actuator 691 that is adapted to move swing arm 679 between an extended position and a retracted position. In one embodiment, the distal end of the swing arm 679 has a ring-shaped opening 681 and a fused silica window 683 inserted into the ring-shaped opening 681.

In one embodiment, the focal length adjusting assembly 675 includes a bottom plate 685 that provides mount points for the camera 652 and the arm actuator 691. The focal length adjusting assembly 675 also includes a light cover 687 that is designed to prevent light entry both when the swing arm 679 is extended and withdrawn from the focal length adjusting assembly.

In one embodiment, the fused silica window 683 is inserted into or withdrawn from the focal length adjusting assembly 675 so as to adjust the focal position for the absorptive imaging system.

Figure 48A:
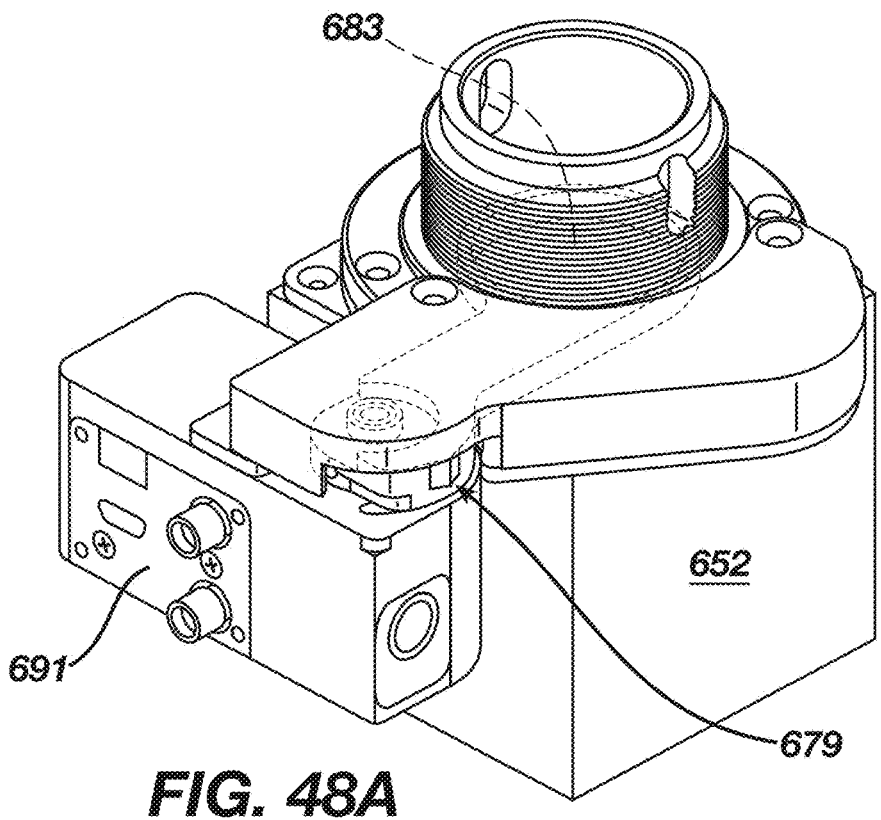
Figure 48B:
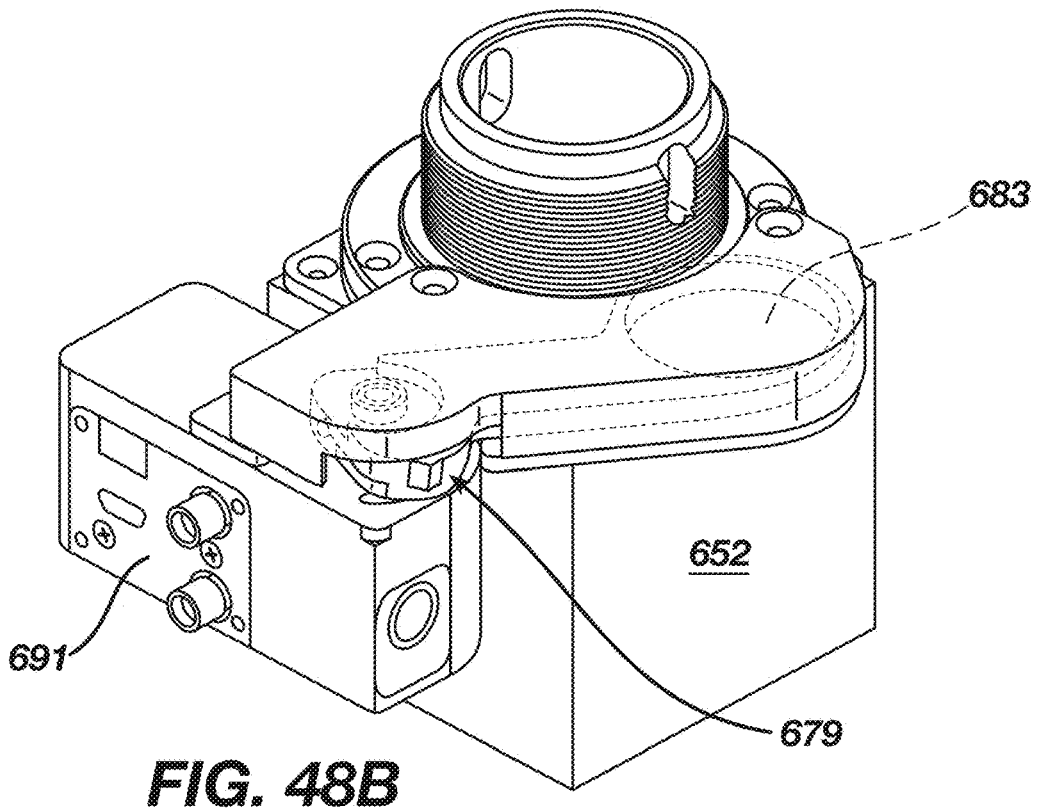

FIG. 48A shows the first swing arm position for the actuator 691 whereby the swing arm 679 is inserted into alignment with the camera 652 so that the fused silica window 683 is aligned with the camera 652. In FIG. 48B, the actuator 691 has withdrawn the swing arm 679 from the focal length adjusting assembly 675 so that the fused silica window 683 is not in alignment with the camera 652.

In one embodiment, the swing arm 679 is inserted into alignment with the camera 652 (FIG. 48A) when a first illumination source having a first wavelength is being utilized and the swing arm 679 is retracted as shown in FIG. 48B when a second illumination source having a second wavelength is utilized. The focal length adjusting assembly is used to accommodate for the two different focal lengths of the light that may be generated by the two different light sources.

Figure 49:
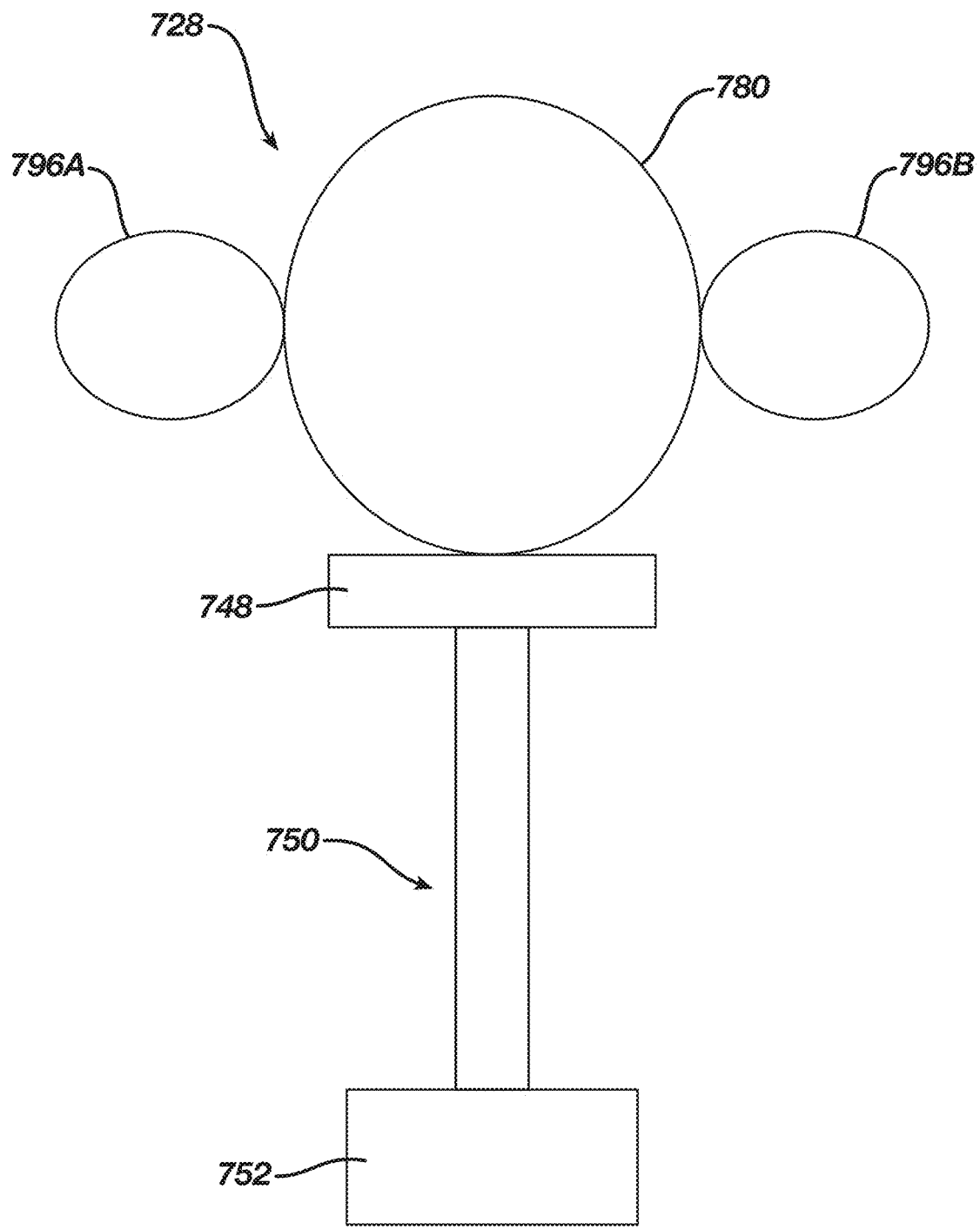
FIG. 49 shows an absorptive imaging system having two LED integrating spheres and a forming optic integrating sphere, in accordance with one embodiment of the present invention.

Referring to FIG. 49, in one embodiment, an absorptive imaging system 728 includes two LED integrating spheres 796A and 796B that pass light into a forming optic integrating sphere 780. In one embodiment, a first LED integrating sphere 796A contains a first illumination source that generates light that covers the absorptive band of an ophthalmic lens, and a second LED integrating sphere 796B contains a second illumination source that generates visible light that covers photoinitiator band of the ophthalmic lens. The absorptive imaging system 728 includes a kinematic mount 748 that receives a forming optic and a lens, a lens set 750 for generating an intensity image, and a camera 752 for capturing the intensity image. By using two separate wavelengths or wavelength bands, the effects of the varying photoinitiator or the optical effects may be removed through calculation.

Figure 50:
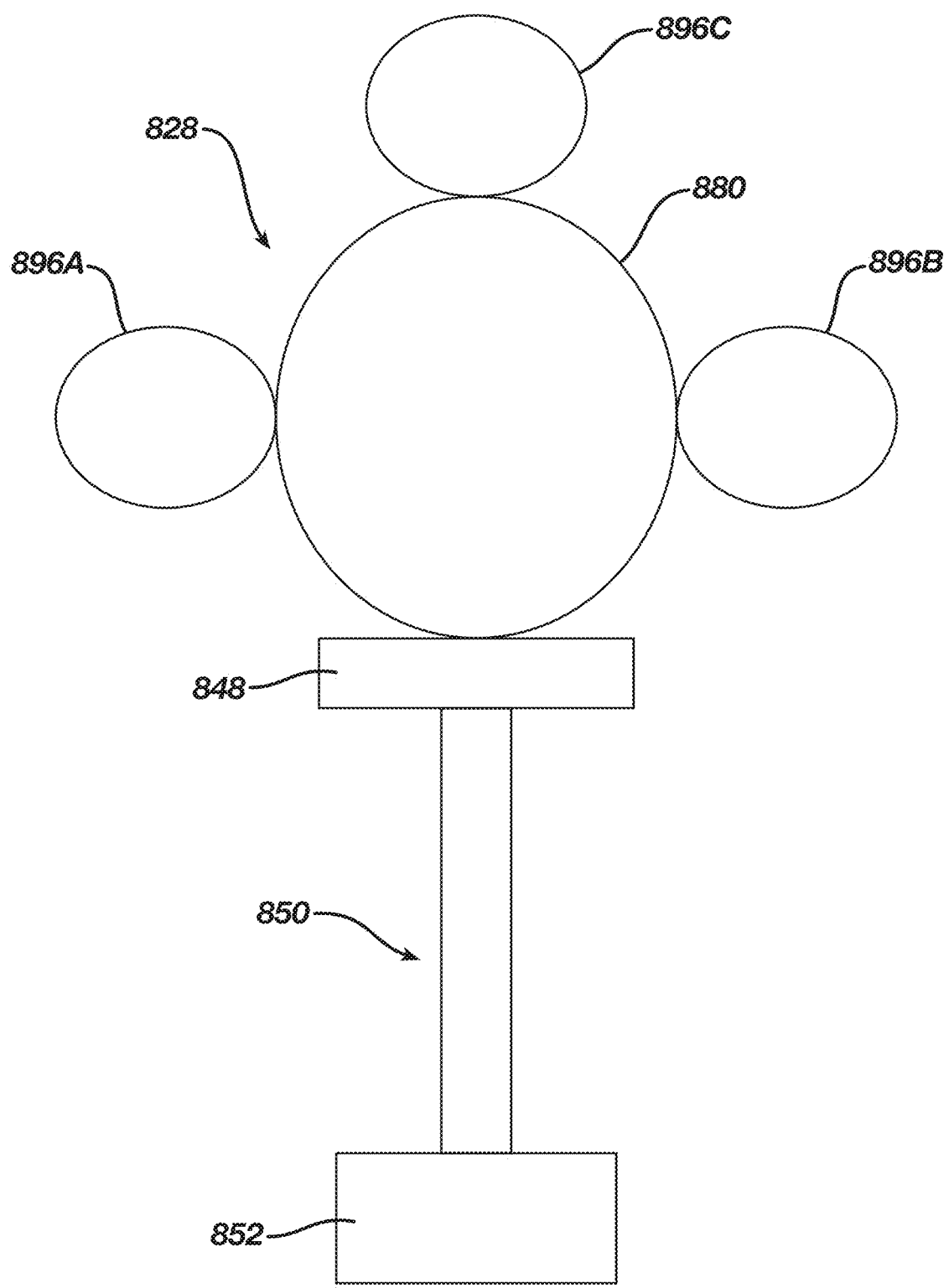
FIG. 50 shows an absorptive imaging system having three LED integrating spheres and a forming optic integrating sphere, in accordance with one embodiment of the present invention.

Referring to FIG. 50, in one embodiment, an absorptive imaging system 828 includes three LED integrating spheres 896A, 896B, and 896C that pass light into a forming optic integrating sphere 880. In one embodiment, a first LED integrating sphere 896A contains a first illumination source that generates light that covers the absorptive band of an ophthalmic lens, a second LED integrating sphere 896B contains a second illumination source that generates visible light that covers an "absorption neutral" band of the ophthalmic lens, and a third LED integrating sphere 896C contains a third illumination source that isolates the effects due to bleaching of the photoinitiator material present in the lens. The absorptive imaging system 828 includes a kinemtaic mount 848 that receives a forming optic and a lens being measured, a lens set 850 for generating an intensity image, and a camera 852 for capturing the intensity image. The absorptive imaging system uses formulas and mathmatics to remove the optical power effects and the bleaching effects to more accurately determine lens thickness based solely upon intensity variations due to the absorptive properties of the lens material.

While the foregoing is directed to embodiments of the present invention, other and further embodiments of the invention may be devised without departing from the basic scope thereof, which is only limited by the scope of the claims that follow. For example, the present invention contemplates that any of the features shown in any of the embodiments described herein, or incorporated by reference herein, may be incorporated with any of the features shown in any of the other embodiments described herein, or incorporated by reference herein, and still fall within the scope of the present invention.

What is claimed is:

1. A method of measuring the thickness of an ophthalmic lens comprising:
   forming an ophthalmic lens over a convexly curved surface of a forming optic, wherein said ophthalmic lens comprises a light absorptive component;
   with said ophthalmic lens remaining over said convexly curved surface of said forming optic, measuring the thickness of said ophthalmic lens using information about said light absorptive component of said ophthalmic lens and an intensity reference value associated with said forming optic, wherein the measuring the thickness step comprises passing ultraviolet light having a wavelength through said ophthalmic lens and said forming optic, wherein said light absorptive component of said ophthalmic lens absorbs some of said ultraviolet light passing through said ophthalmic lens;
   providing a light source that generates said ultraviolet light having the wavelength;
   wherein the measuring the thickness step comprises using said ultraviolet light passing through said ophthalmic lens and said forming optic, which is not absorbed by said light absorptive component of said ophthalmic lens, to generate an image having pixel intensity data.

2. The method as claimed in claim 1, wherein the forming said ophthalmic lens step comprises:
   juxtaposing said forming optic with a reactive monomer mixture comprising said light absorptive component;
   immersing said convexly curved surface of said forming optic into said reactive monomer mixture;
   polymerizing said reactive monomer mixture in contact with said convexly curved surface of said forming optic.

3. The method as claimed in claim 2, wherein said forming optic is inverted during the polymerizing step and is upright during the calculating the thickness step.

4. The method as claimed in claim 1, wherein said ultraviolet light has a wavelength of 365 nm.

5. The method as claimed in claim 1, wherein said image having said pixel intensity data comprises a digital image that corresponds to a shape of said ophthalmic lens.

6. The method as claimed in claim 5, wherein the calculating the thickness step further comprises using information about the wavelength of said ultraviolet light passing through said ophthalmic lens and said forming optic, said light absorptive component of said ophthalmic lens, the intensity reference value associated with said forming optic, and said pixel intensity data to calculate a thickness profile for said ophthalmic lens.

7. The method as claimed in claim 6, further comprising:
   providing a digital image capturing device downstream from said forming optic for capturing said digital image;
   providing one or more optical lenses between said forming optic and said digital image capturing device for focusing said ultraviolet light onto said digital image capturing device.

8. The method as claimed in claim 4, further comprising:
   passing second light through said ophthalmic lens and said forming optic, said second light having a second wavelength that is different than said ultraviolet light and that is not absorbed by said light absorptive component of said ophthalmic lens;
   after passing said second light through said ophthalmic lens and said forming optic, directing said second light to generate a second image for said ophthalmic lens, said second image having second pixel intensity data that corresponds to intensity changes due to refractive effects when said second light passes through said ophthalmic lens;
   isolating said second pixel intensity data from first pixel intensity data used to measure thickness due to said light absorptive component.

9. The method as claimed in claim 8, wherein said second pixel intensity data further comprises intensity changes due to the effects of non-uniform illumination.

10. The method as claimed in claim 9, wherein said second pixel intensity data further comprises intensity changes due to the effects of a combination of h refractive effects and the effects of non-uniform illumination.

11. The method as claimed in claim 8, further comprising:
    disposing said ultraviolet light in a first integrating sphere;

disposing said second light in a second integrating sphere that is separate from said first integrating sphere; and disposing said forming optic in a forming optic integrating sphere that is separate from said first and second integrating spheres.

12. The method as claimed in claim 8, wherein said ophthalmic lens comprises a photoinitiator that is bleached by light passing through said ophthalmic lens, the method further comprising;

passing third light through said ophthalmic lens, said third light having a third wavelength that is absorbed by said photoinitiator and that is not absorbed by said light absorptive component of said ophthalmic lens;

after passing said third light through said ophthalmic lens, directing said third light to generate a third image for said ophthalmic lens, said third image having third pixel intensity data that corresponds to the effects of bleaching of said photoinitiator;

isolating said third pixel intensity data from said first pixel intensity data used to calculate thickness due to said light absorptive component.

13. The method as claimed in claim 12, further comprising:

disposing said ultraviolet light in a first integrating sphere;

disposing said second light in a second integrating sphere that is spaced from said first integrating sphere;

disposing said third light in a third integrating sphere that is spaced from said first and second integrating spheres; and disposing said forming optic in a forming optic integrating sphere that is spaced from said first, second, and third integrating spheres.

14. The method as claimed in claim 13, wherein said ultraviolet light is absorbed by said light absorptive component and said photoinitiator, said second light is absorbed by neither said light absorptive component nor said photoinitiator, and said third light is absorbed by said photoinitiator and is not absorbed by said light absorptive component.

15. The method as claimed in claim 13, wherein said second light is a second LED that generates light having a second wavelength of about 455 nm, and said third light is a third LED that generates light having a third wavelength of about 420 nm, the method further comprising programming a control system to automatically activate only one of said first, second and third LEDs at any one time.

16. A method of measuring the thickness of an ophthalmic lens comprising:

providing an ophthalmic lens having a light absorptive component and a photoinitiator;

using a first LED for generating a first light having a first wavelength that is absorbed by said light absorptive component and said photoinitiator;

using a second LED for generating a second light having a second wavelength that is different than said first wavelength and that is neither absorbed by said light absorptive component nor said photoinitator;

using a third LED for generating a third light having a third wavelength that is different than said first and second wavelengths, that is not absorbed by said light absorptive component, and that is absorbed by said photoinitiator;

calculating a thickness profile for said ophthalmic lens by passing said first, second and third lights through said ophthalmic lens to isolate light absorption due to the presence of refractive effects and said photoinitiator in said ophthalmic lens from light absorption due to the presence of said light absorptive component in said ophthalmic lens.

17. The method as claimed in claim 16, further comprising providing control electronics for activating and deactivating said first, second and third LEDs so that said first, second and third lights are passed through said ophthalmic lens at different times.

18. The method as claimed in claim 16, further comprising:

after passing said first light through said ophthalmic lens, directing said first light through a set of imaging lenses to generate a first image for said ophthalmic lens, said first image having first pixel intensity data that corresponds to the shape of said ophthalmic lens;

after passing said second light through said ophthalmic lens, directing said second light through said set of imaging lenses to generate a second image for said ophthalmic lens, said second image having second pixel intensity data that corresponds to intensity changes due to refractive effects, non-uniform illumination effects, and a combination of the refractive effects and the non-uniform illumination effects when said second light passes through said ophthalmic lens;

after passing said third light through said ophthalmic lens, directing said third light through said set of imaging lenses to generate a third image for said ophthalmic lens, said third image having third pixel intensity data that corresponds to the effects of bleaching of said photoinitiator.

19. A method of measuring the thickness of an ophthalmic lens comprising:

forming an ophthalmic lens over a convexly curved surface of a forming optic, wherein said ophthalmic lens comprises a light absorptive component;

with said ophthalmic lens remaining over said convexly curved surface of said forming optic, measuring the thickness of said ophthalmic lens using information about said light absorptive component of said ophthalmic lens and an intensity reference value associated with said forming optic, wherein the measuring the thickness step comprises passing ultraviolet light having a wavelength of 365 nm through said ophthalmic lens and said forming optic, wherein said light absorptive component of said ophthalmic lens absorbs some of said ultraviolet light passing through said ophthalmic lens;

passing second light through said ophthalmic lens and said forming optic, said second light having a second wavelength that is different than said ultraviolet light and that is not absorbed by said light absorptive component of said ophthalmic lens;

after passing said second light through said ophthalmic lens and said forming optic, directing said second light to generate a second image for said ophthalmic lens, said second image having second pixel intensity data that corresponds to intensity changes due to refractive effects when said second light passes through said ophthalmic lens;

isolating said second pixel intensity data from first pixel intensity data used to measure thickness due to said light absorptive component.

\* \* \* \* \*